United States Patent
Shi et al.

(10) Patent No.: US 7,245,628 B2
(45) Date of Patent: Jul. 17, 2007

(54) ALLOCATION OF UPSTREAM BANDWIDTH IN AN ETHERNET PASSIVE OPTICAL NETWORK

(76) Inventors: Haixing Shi, 2815 Forbes Ave., Santa Clara, CA (US) 95051; Ying He, 1861 Mark Twain St., Palo Alto, CA (US) 94303

( * ) Notice: Subject to any disclaimer, the term of this patent is extended or adjusted under 35 U.S.C. 154(b) by 1000 days.

(21) Appl. No.: 10/192,835

(22) Filed: Jul. 9, 2002

(65) Prior Publication Data

US 2003/0179769 A1  Sep. 25, 2003

Related U.S. Application Data

(60) Provisional application No. 60/304,346, filed on Jul. 10, 2001, provisional application No. 60/304,322, filed on Jul. 10, 2001.

(51) Int. Cl.
*H04J 3/16* (2006.01)
(52) U.S. Cl. ............................................. 370/437
(58) Field of Classification Search ................ 370/229, 370/230, 431–435, 437, 442–445, 458–462
See application file for complete search history.

(56) References Cited

U.S. PATENT DOCUMENTS

| | | | | |
|---|---|---|---|---|
| 4,727,536 A | * | 2/1988 | Reeves et al. | 370/468 |
| 5,351,240 A | * | 9/1994 | Highsmith | 370/461 |
| 5,930,262 A | * | 7/1999 | Sierens et al. | 370/442 |
| 6,091,440 A | * | 7/2000 | Kokkinen | 725/149 |
| 6,463,040 B1 | * | 10/2002 | Dutta | 370/280 |
| 6,498,667 B1 | * | 12/2002 | Masucci et al. | 398/98 |
| 6,657,983 B1 | * | 12/2003 | Surazski et al. | 370/337 |
| 6,690,892 B1 | * | 2/2004 | Effenberger | 398/168 |
| 6,704,932 B1 | * | 3/2004 | Matsunaga et al. | 725/126 |
| 6,920,149 B2 | * | 7/2005 | Robledo et al. | 370/458 |

\* cited by examiner

*Primary Examiner*—Dmitry Levitan
(74) *Attorney, Agent, or Firm*—Jonathan W. Hallman; MacPherson Kwok Chen & Heid LLP

(57) ABSTRACT

A passive optical network (PON) in accordance with the invention uses a superframe having a number of subframes arranged in a two-dimensional array, wherein for normal data transfer subframes are allocated to each optical network unit (ONU) column by column, left to right, and within each column subframes are allocated from top to the bottom. Initially, for ranging, at least two subframes are allocated to an ONU, adjacent to a diagonal of the superframe (which may go from the top left corner of the superframe to the bottom right corner, or alternatively from the top right corner to the bottom left corner). In some embodiments, instead of allocating subframes column by column, the subframes are evenly spaced apart from one another, and conflicts with a previous allocation are resolved by adjustment, and optionally an evaluation function may be used to find an optimal allocation.

11 Claims, 36 Drawing Sheets

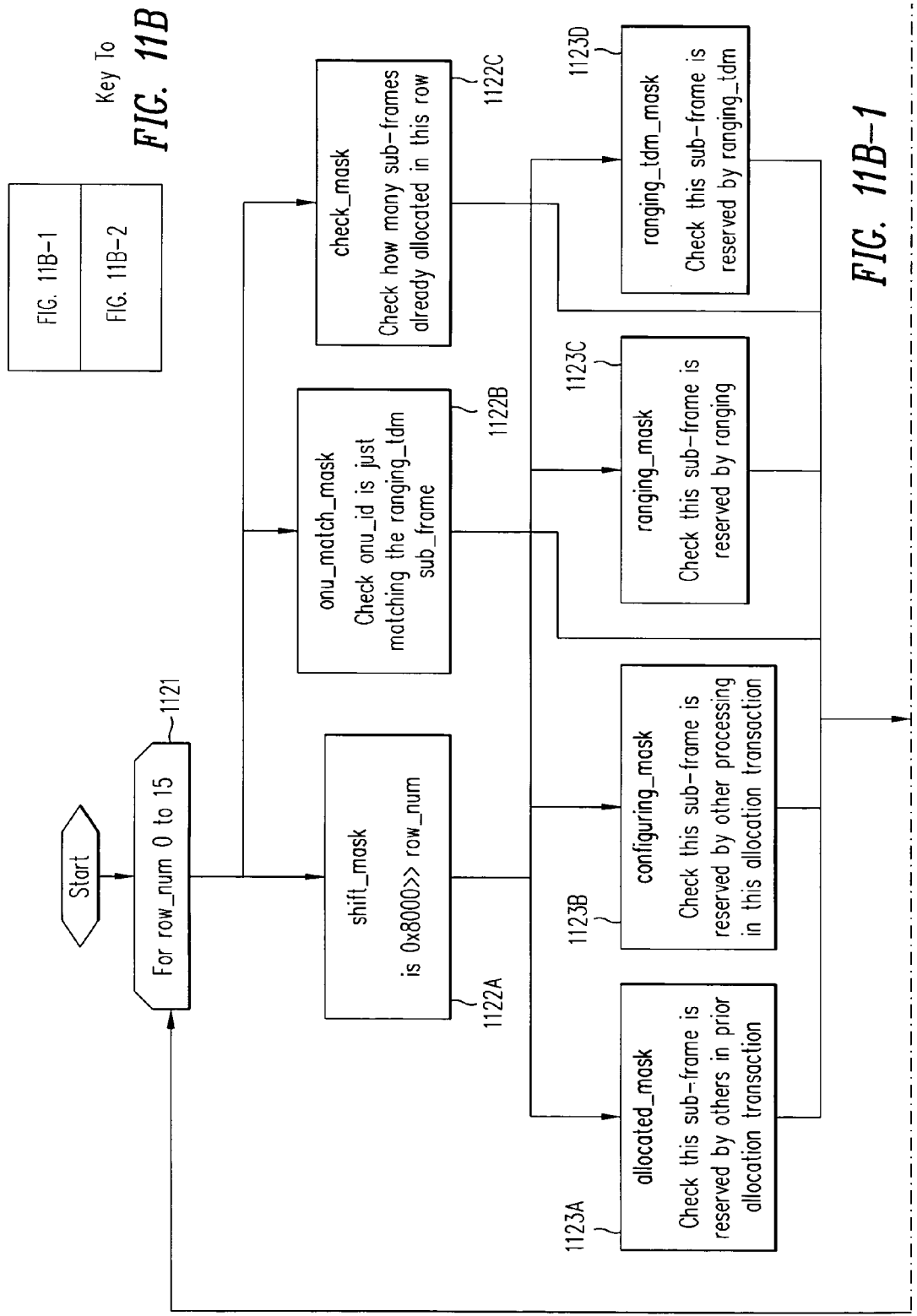

ALLOCATION OF UPSTREAM BANDWIDTH IN AN ETHERNET PASSIVE OPTICAL NETWORK

CROSS-REFERENCE TO RELATED APPLICATIONS

This application is a continuation of and claims priority to the following U.S. Patent Applications that were filed as provisional applications.

U.S. patent application Ser. No. 60/304,346 entitled "Bandwidth allocation algorithm in an EPON system", filed on Jul. 10, 2001 by Haixing Shi, confirmation no. 6135; and U.S. patent application Ser. No. 60/304,322 entitled "Apparatus for bandwidth allocation in EPON to minimize delay and jitter variation", filed on Jul. 10, 2001, by Ying He, Jack Zhang, Charlie Hou and Hok Lau, confirmation no. 9998.

This application is also related to and incorporates by reference herein in its entirety a concurrently filed, commonly owned U.S. Patent Application entitled "Ethernet Passive Optical Network with Framing Structure for Native Ethernet Traffic and Time Division Multiplexed Traffic Having Original Timing" filed by Jian Song et al, Attorney Docket No. SAL003 US.

Each of these three patent applications is incorporated by reference herein in its entirety.

BACKGROUND OF THE INVENTION

In a passive optical network (PON), a number of optical network units (ONUs) are placed in a corresponding number of offices or homes, and are coupled by passive devices to a single optical line terminal (OLT), that may be placed, for example, in a central office of a telephony service provider. Such a passive optical network (PON) may be configured as a single medium that is shared among multiple optical network units (ONUs). The optical line terminal (OLT) may communicate (in the downstream direction) with the multiple optical network units (ONUs) by broadcasting Ethernet packets, as illustrated in FIG. 1A. Each optical network unit (ONU) extracts packets addressed to itself based on the media-access-control (MAC) address in the normal manner.

Transmission of the Ethernet packets (in the upstream direction) from multiple optical network units (ONUs) to the optical line terminal (OLT) must be coordinated, to avoid collisions (e.g. in case transmissions by two or more optical network units (ONUs) overlap partially) on the shared medium. In some prior art systems, each optical network unit (ONU) is allocated an identical fraction of the total bandwidth (in a time-division-multiplexed channel), and the optical network units (ONUs) synchronize their transmissions to avoid collisions. For example, as noted in an article entitled "Design and Analysis of an Access Network based on PON Technology" by Glen Kramer and Biswanath Mukheijee each of N (e.g. 16) optical network units (ONUs) is assigned a time slot, and each optical network unit (ONU) may transmit any number of packets that may fit within the allocated time slot, as illustrated in FIG. 1B. If a packet cannot be completely transmitted within a current time slot, it is transmitted in the next slot Although there are no collisions and no packet fragmentation, such a fixed round-robin slot allocation cannot handle bursty traffic situations.

A dynamic scheme that reduces the timeslot size when there is no data would allow the excess bandwidth to be used by other ONUs, as noted in an article entitled "Interleaved Polling with Adaptive Cycle Time (IPACT): A Dynamic Bandwidth Distribution Scheme in an Optical Access Network" by Glen Kramer, Biswanath Mukherjee and Gerry Pesavento. As noted therein, if the OLT is to make an accurate timeslot assignment it should know exactly how many bytes are waiting in a given ONU. One approach could be to relieve the OLT from timeslot assignment altogether and leave it to ONUs. In such a scheme, every ONU, before sending its data, will send a special message announcing how many bytes it is about to send. The ONU that is scheduled next (say, in round-robin fashion) will monitor the transmission of the previous ONU and will time its transmission such that it arrives to the OLT right after the transmission from the previous ONU.

Another approach is to perform simple hub-polling wherein the OLT polls each ONU as to the amount of bandwidth needed by the ONU (which may be the same as its current queue length). However, as noted in the just-described article, simple hub polling has a disadvantage of increasing the polling cycle due to accumulation of walk times (switchover times). In access networks, this problem is even more pronounced than in LANs, as the propagation delays in the access network are much higher. For example, in a PON with 16 ONUs each having 200 μs round-trip delay (ONU and OLT are 20 km apart) the accumulated walk time is 3.2 ms. This is how much time would be wasted in every cycle in the hub polling.

The just-described article proposes an interleaved polling approach where the next ONU is polled before the transmission from the previous one has arrived. This scheme provides statistical multiplexing for ONUs and results in efficient upstream channel utilization. A three ONU example is described as follows in reference to FIGS. 2A–2D. Let us imagine that at some moment of time t0 the OLT knows exactly how many bytes are waiting in each ONUs buffer and the Round-Trip Time (RTT) to each ONU. The OLT keeps this data in a polling table shown in FIG. 2A. At time t0, the OLT sends a control message (Grant) to ONU1, allowing it to send 6000 bytes (see FIG. 2A). Since, in the downstream direction, the OLT broadcasts data to all ONUs, the Grant should contain the ID of the destination ONU, as well as the size of the granted window (in bytes). Upon receiving the Grant from the OLT, ONU1 starts sending its data up to the size of the granted window (FIG. 2B). In our example—up to 6000 bytes. At the same time, the ONU keeps receiving new data packets from its user. At the end of its transmission window, ONU1 will generate its own control message (Request). The Request sent by ONU1 tells the OLT how many bytes were in ONU1's buffer at the moment when the Request was generated. In our case there were 550 bytes.

Even before the OLT received a reply from ONU1, it knows when the last bit of ONU1's transmission will arrive. This is how the OLT calculates this: (a) the first bit will arrive exactly after the RTT time. The RTT in our calculation includes the actual round-trip time, Grant processing time, Request generating time, and a preamble for the OLT to perform bit- and byte-alignment on received data, i.e., it is exactly the time interval between sending a Grant to an ONU and receiving data from the same ONU. (b) since the OLT knows how many bytes (or bits) it has authorized ONU1 to send, it knows when the last bit from ONU1 will arrive. Then, knowing RTT for ONU2, the OLT can schedule a Grant to ONU2 such that first bit from ONU2 will arrive with a small guard interval after the last bit from ONU1 (FIG. 2B). The guard intervals provide protection for fluctuations of round-trip time and control message processing time of various ONUs. Additionally, the OLT receiver needs some time to readjust its sensitivity due to the fact that signals from different ONUs may have different power levels because ONUs are located at different distances from the OLT (far-near problem).

After some time, the data from ONU1 arrives. At the end of the transmission from ONU1, there is a new Request that contains information of how many bytes were in ONU1's buffer just prior to the Request transmission. The OLT will use this information to update its polling table (see FIG. 2C). By keeping track of times when Grants are sent out and data is received, the OLT constantly updates the RTT entries for the corresponding ONUs Similarly, the OLT can calculate the time when the last bit from ONU2 will arrive. Hence, it will know when to send the Grant to ONU3 so that its data is tailed to the end of ONU2's data. After some more time, the data from ONU2 will arrive. The OLT will again update its table, this time the entry for the ONU2 (see FIG. 2D).

If an ONU emptied its buffer completely, it will report 0 bytes back to the OLT. Correspondingly, in the next cycle the ONU will be granted 0 bytes, i.e., it will be allowed to send a new request, but no data. Note that the OLT's receive channel is almost 100% utilized (Requests and guard times consume a small amount of bandwidth). Idle ONUs (without data to send) are not given transmission windows. That leads to a shortened cycle time, which in turns results in more frequent polling of active ONUs. As it is clear from the description above, there is no need to synchronize the ONUs to a common reference clock (as traditionally done in TDMA schemes). Every ONU executes the same procedure driven by the Grant messages received from the OLT. The entire scheduling and bandwidth allocation algorithm is located in the OLT.

U.S. Pat. No. 6,324,184 granted to Hou, et al. on Nov. 27, 2001 (that is incorporated by reference herein in its entirety) discloses a method and apparatus for dynamically allocating bandwidth among a number of subscriber units in an upstream channel of a communication network, such as a multichannel hybrid fiber coax (HFC) cable television system. Specifically, U.S. Pat. No. 6,324,184 illustrates, in FIG. 3 a time division multiple access (TDMA) frame structure used therein. A transport stream, shown generally at 300, includes first, second, and third superframes, denoted by reference numerals 310, 350 and 380, respectively. Each superframe is shown as being comprised of a number $N_F$ of frames, although the number of frames need not be the same in each superframe on different channels. In particular, the first superframe 310 includes frames 320, 330 . . . 340, the second superframe 350 includes frames 360, 362 . . . 364, and the third superframe 380 includes frames 390, 392 . . . 394. Furthermore, each frame is shown including a number $N_s$ of slots, although the number of slots need not be the same in each frame. For example, the first frame 320 of superframe 310 includes slots 322, 324, 326 and 328. Moreover, the size of each superframe, frame or slot may vary.

U.S. Pat. No. 5,930,262 granted to Sierens, et al. on Jul. 27, 1999 (that is also incorporated by reference herein in its entirety) discloses a method for TDMA management, in which a central station is enabled to transmit downstream frames to the terminal stations to allow the terminal stations to transfer upstream frames to the central station in time slots assigned thereto by way of access grant information included in the downstream frames. The downstream frame is a superframe having a matrix structure with rows and columns, and a first portion and a second portion of the matrix structure is an overhead portion and an information portion respectively. The overhead portion includes the access grant information and the size of the overhead portion is flexibly adaptable. The central station and the terminal stations are adapted to send and to interpret the superframe.

U.S. Pat. No. 5,930,262 states that the first byte of such a frame is a predetermined synchronization byte S. Bytes 2 to 188 can be used for user data, followed by 16 bytes for error correcting code. Using the frame as a basic block (row), a superframe is constructed of 8 consecutive frames. The superframe is divided in columns containing dedicated blocks. The column containing the first byte of every frame contains a synchronization byte S as mentioned earlier. The next 8 columns form a TDMA Control Block TCB which contains 1 bit for superframe synchronization S', a second bit for specifying a counter C for slot synchronization of the TDMA and per row maximum 4 Transmit Enable Addresses TEA1–TEA4 for specification of the terminal station allowed to send information in a corresponding timeslot of the upstream channel.

According to U.S. Pat. No. 5,930,262, the TEAs listed in the downstream frame indicate which terminal station may upon the consecutive zero crossing of its counter transmit an upstream burst. If 4 upstream bursts have to start during a specific downstream frame, then 4 TEAs will be required in the corresponding row of the TCB part of the downstream frame. If only 3 upstream bursts have to start, the fourth TEA is assigned a zero value by the central station. Typically, a row of the TCB controls the burst starting transmission during the next frame. It cannot control transmission during the current frame, since some latency is required for processing the TEA in the terminal station. It should be noted that use could be made of special code TEAs as a result of which any terminal station would be allowed to transfer upstream information, thereby realizing a combination of TDMA and of the Aloha or contention principle. Acknowledgements could then be broadcast in operation and maintenance messages.

See also a presentation entitled "Ethernet PON (EPON) TDMA Interface in PHY Layer and other considerations" by J. C. Kuo and Glen Kramer, IEEE 802.3 Ethernet in the First Mile (EFM) Study Group, Portland, Oreg., March 2001.

SUMMARY OF THE IVENTION

A passive optical network (PON) uses a superframe having a number of frames that are sequentially transmitted (i.e. one after another) with each frame having a number of subframes that are also sequentially transmitted, wherein an optical line terminal (OLT) in accordance with the invention allocates to each optical network unit (ONU), for upstream transmission of information, a number of subframes that are deliberately spaced apart from one another so that subframes are allocated throughout a superframe as evenly as possible. Distancing of subframes allocated to the same optical network unit (ONU) in accordance with the invention provides lower variation in delay and/or jitter during upstream transmission by the individual optical network units (ONUs), as compared to, for example, allocation to an optical network unit (ONU) of a number of subframes that are sequentially transmitted one after another. Moreover, such non-sequential subframe allocation eliminates the need for an optical network unit (ONU) to have to wait for the duration of multiple frames after a transmission and before it can transmit again, thereby to eliminate the related delay variation and/or jitter variation.

Each superframe may be viewed as having a number of frames, with each frame having a number of subframes that form a row of a two-dimensional array, wherein the optical line terminal (OLT) receives the superframe one frame (i.e. one row) after another. In some embodiments, subframes in each superframe are allocated to an optical network unit (ONU) column by column, left to right, and within each column subframes are allocated from top to bottom. Such a systematic allocation of non-adjacent subframes to an optical network unit (ONU) avoids fragmentation of the superframe if a reverse procedure is followed for deallocation (e.g. if deallocation is also done column by column from right to left, and within each column from bottom to top).

In some embodiments, subframes in each superframe are allocated to an optical network unit such that the subframes are approximately (or even precisely if possible) evenly spaced apart from one another, regardless of the location of the frame boundary. Specifically, an evaluation function that identifies how evenly the subframes are spaced apart is used in some embodiments to select one of two or more ways in which subframes of a superframe can be allocated to optical network units(ONUs) of a passive optical network (PON). For example, a temporary map of slot allocations to be made in the superframe may be prepared and evaluated using such an evaluation function. Certain embodiments allocate a bit map for each ONU and use a conflict resolution mechanism to resolve conflicts by systematically trying out and evaluating a number of sub-optimal allocations, and/or making adjustments to preallocated bitmaps for the ONUs.

When subframes are to be used (at least partially) for a purpose other than upstream transmission of information, e.g. for ranging, then the above-described non-sequential allocation of subframes need not be followed. Specifically, for ranging, a number of sequential subframes may be allocated to the same ONU, depending on the duration of each subframe and the delay time. For example, two subframes in the same row, located at or near a diagonal of the above-discussed superframe are allocated for ranging in one embodiment wherein each subframe is transmitted in 125 microseconds and there is a constant delay time of 200 microseconds. In some embodiments, the diagonal is located between the top left corner and the bottom right corner of the superframe, so that two time slots at the beginning of the first row are allocated to a first ONU and two time slots at the end of the last row are allocated to a last ONU.

DETAILED DESCRIPTION

Figure 1A:
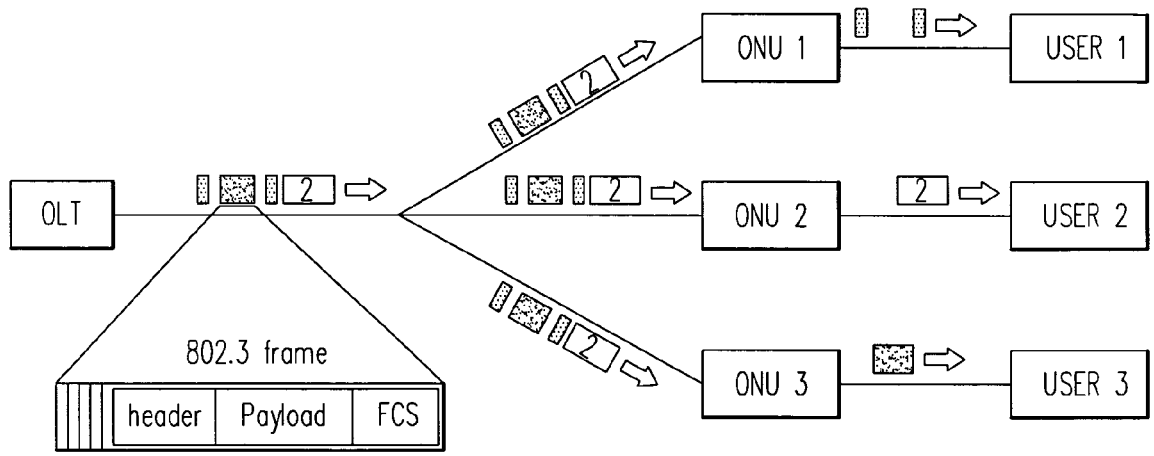
FIGS. 1A and 1B illustrate, in conceptual views, transfer of information in a downstream direction and in an upstream direction respectively in an Ethernet Passive Optical Network of the prior art.
Figure 1B:
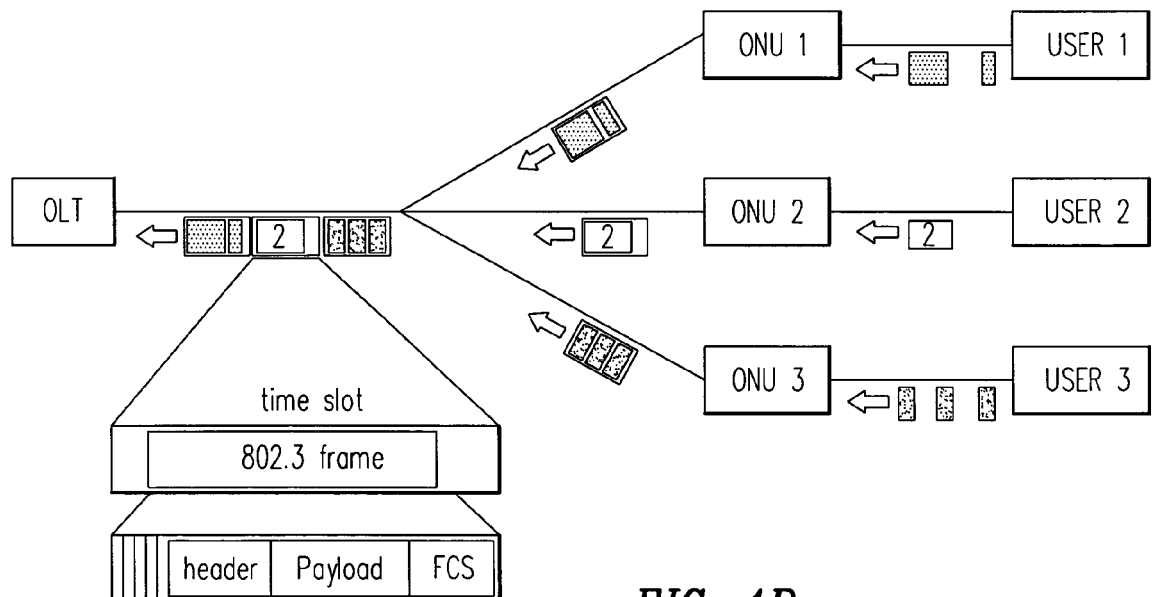
Figure 2A:
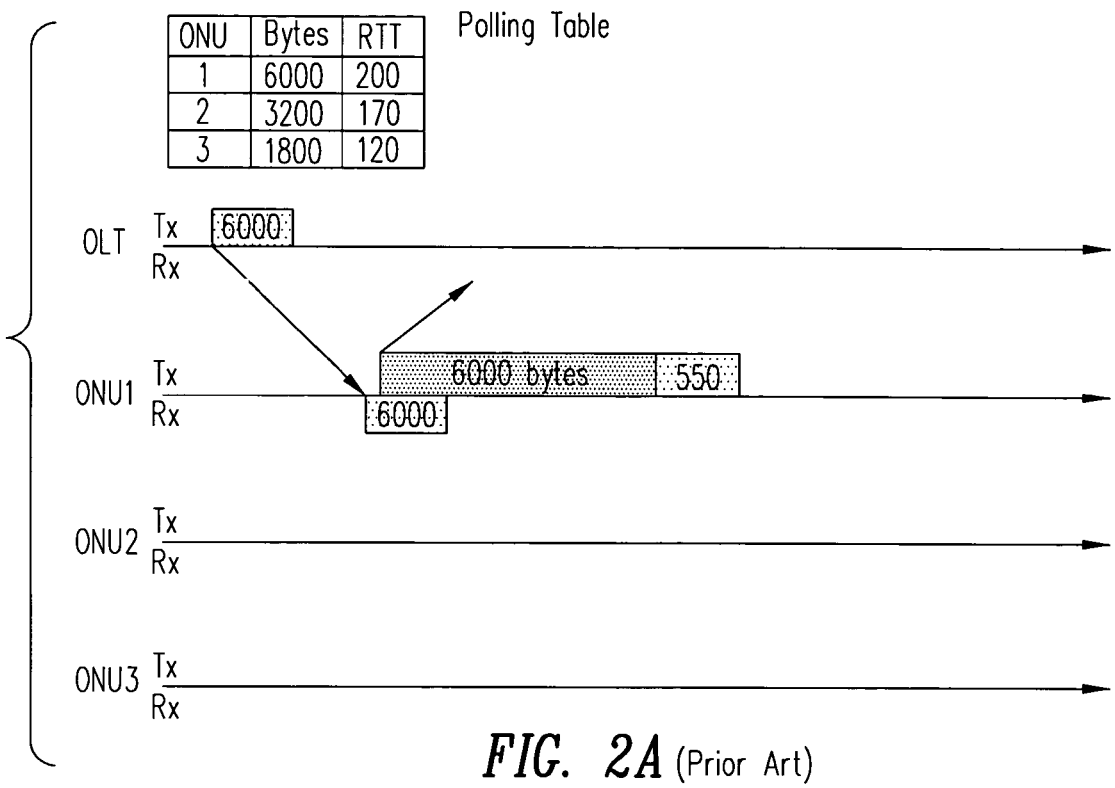
FIGS. 2A–2D illustrate, in conceptual views, statistical multiplexing of the upstream bandwidth by a prior art interleaved polling approach where a next ONU is polled before the transmission from the previous ONU has arrived.
Figure 2B:
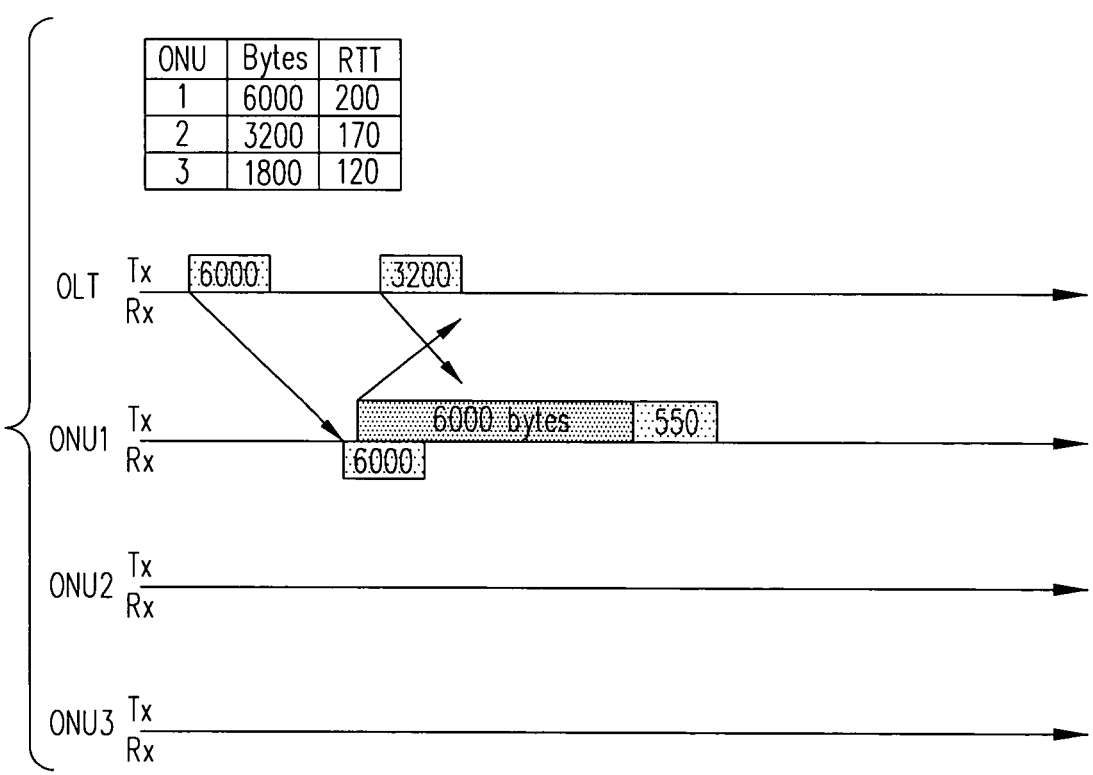
Figure 2C:
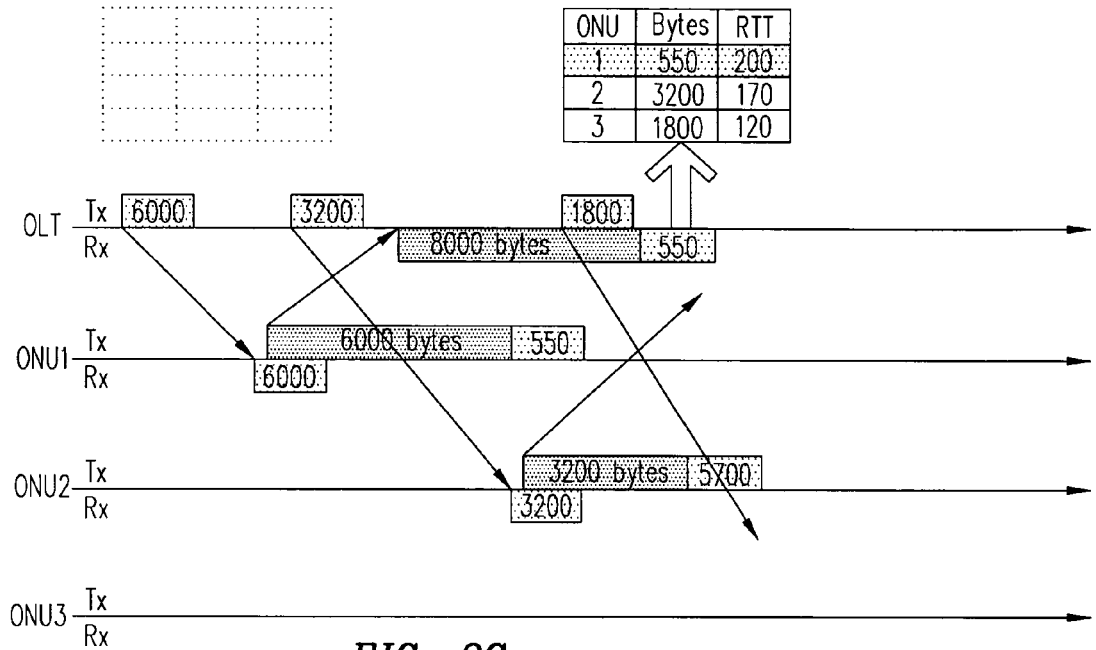
Figure 2D:
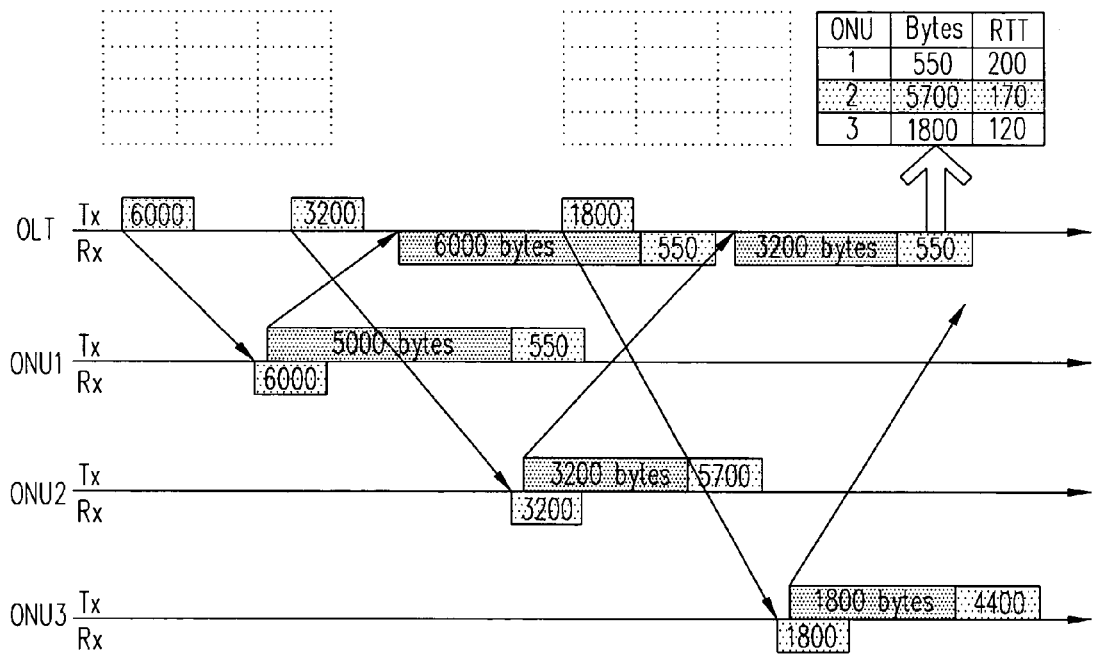
Figure 3:
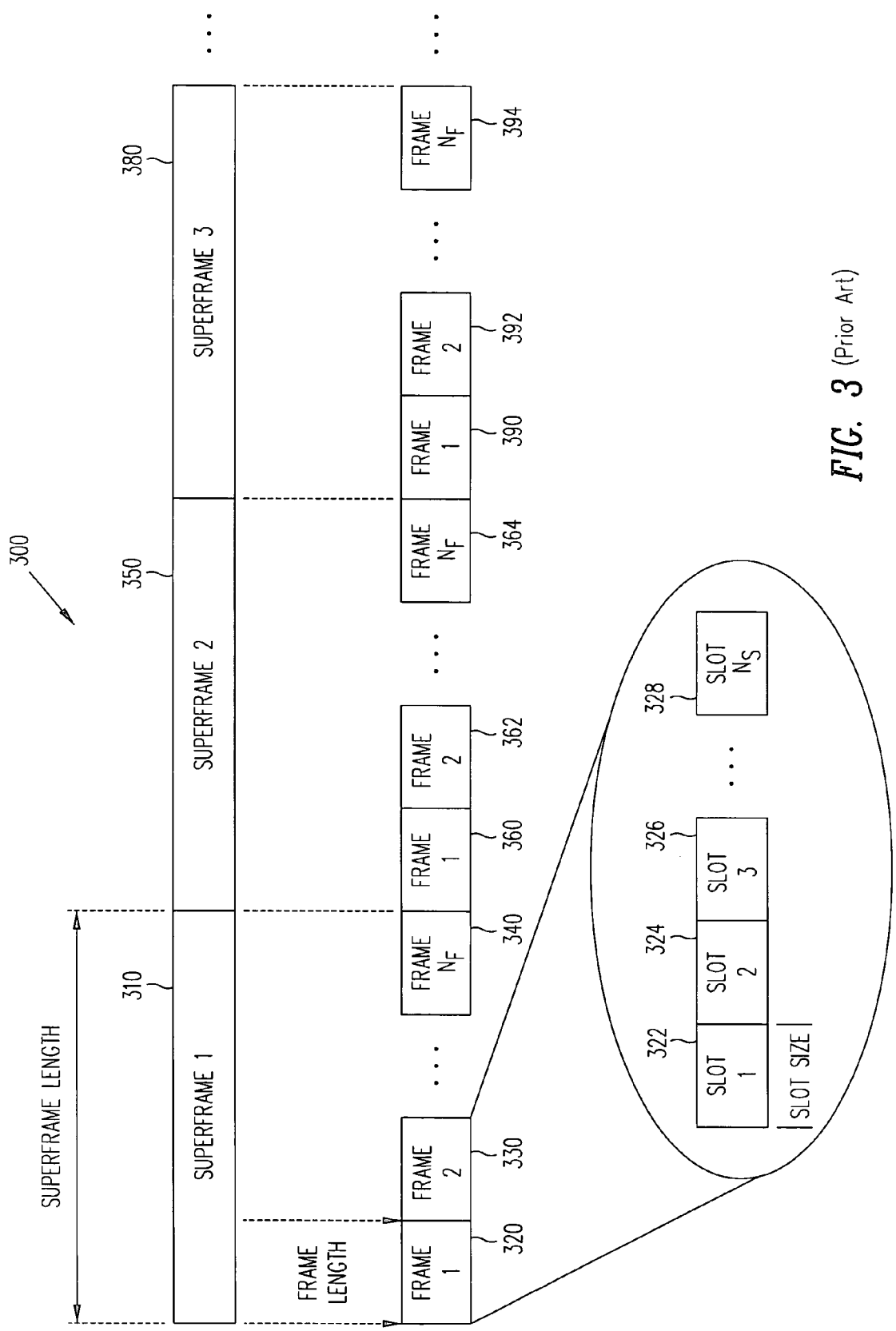
FIG. 3 illustrates a time division multiple access (TDMA) frame structure used in the prior art for dynamically allocating bandwidth among a number of subscriber units in an upstream channel of a communication network, such as a multichannel hybrid fiber coax (HFC) cable television system.
Figure 4A:
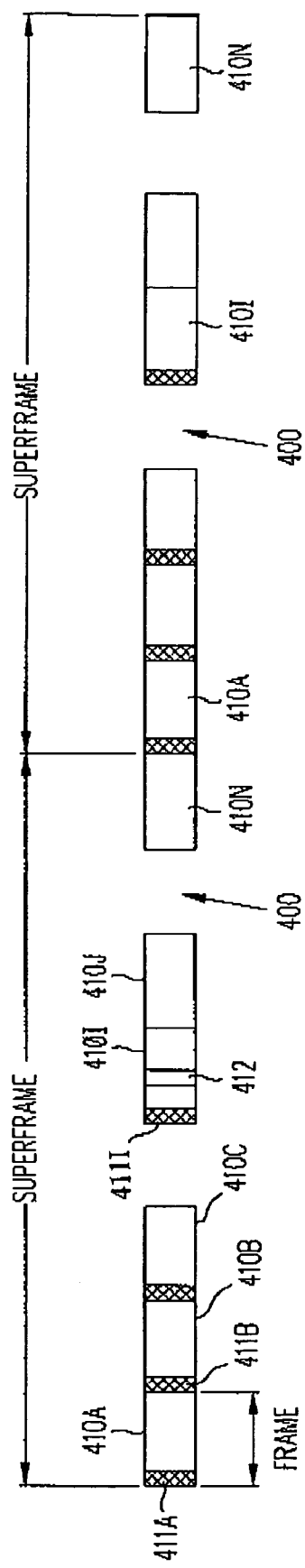
FIG. 4A illustrates allocation of slots in each of a number of different frames to the same ONU in accordance with the invention.

A number of optical network units (ONUs) communicate with an optical line terminal (OLT) in a passive optical network (PON) in accordance with the invention by transmitting upstream signals in a superframe 400 (FIG. 4A). A similar superframe may be used by the OLT in communicating in the downstream direction with the ONUs. Each of the ONUs and the OLT are equipped with hardware of the type well known in the art for implementing a PON. The PON is implemented with an optical branching/coupling element between the ONUs and the OLT. The optical branching/coupling element is a passive device that does not need an electric source. The OLT is connected to the optical branching/coupling element through a single optical fiber (or a double optical fiber for redundancy). Each of the ONUs is connected to the optical branching/coupling element through an exclusive optical fiber.

Each of the ONUs and OLT may contain a central processing unit (CPU) that controls operation of a media access control (MAC) logic, and these two logics may be included in a single integrated circuit (IC) chip, such as Motorola's MPC860TZP50., which provides Fast Ethernet, RS 232 and 10BaseT interfaces. The ONUs and OLT may also include a network processor chip (such as nP3400 available from Applied Micro Circuits Corporation, 6290 Sequence Drive, San Diego, Calif. 92121-4358) that process Ethernet packets. Also included may be a MAC chip (such as a custom-built ASIC or FPGA) that provides access to the passive optical network (PON).

Each ONU and the OLT further include memory (in the form of, for example ROM or RAM) as well as an optical transceiver for bidirectional use with a single fiber. Although any kind of optical transceiver may be used in a PON of the type described herein, one implementation operates at a speed of 1.25 Gbps using a transceiver that transmits at wavelength 1.3 micrometer and receives at wavelength 1.5 micrometer in an integrated manner by employing a Planar Lightware Circuit (PLC), and operating instantaneously from the first bit of a burst by use of a feed-forward circuit employing a read only memory (ROM).

The specific hardware that may be used in an ONU or an OLT is not a critical aspect of the invention, and any hardware well known in the art may be used. Methods of the type described below are typically implemented in the above-described MAC chip that provides access to PON, although they may be alternatively implemented in software that is loaded into and executed by a central processing unit (CPU) that is separate from but coupled to the just-described MAC for PON. Note that any PON MAC can be used in the manner described herein.

Referring to FIG. 4A, superframe 400 has a number of frames 410A–410N (wherein $A \leq 1 \leq N$, N being the total number of frames in the superframe) that are sequentially transmitted (i.e. one after another), with each frame 410I having a number of subframes (in time slots) that are also sequentially transmitted within the frame. Each frame 410I has an identical number of time slots 412 as any other frame 410J.

Figure 5:
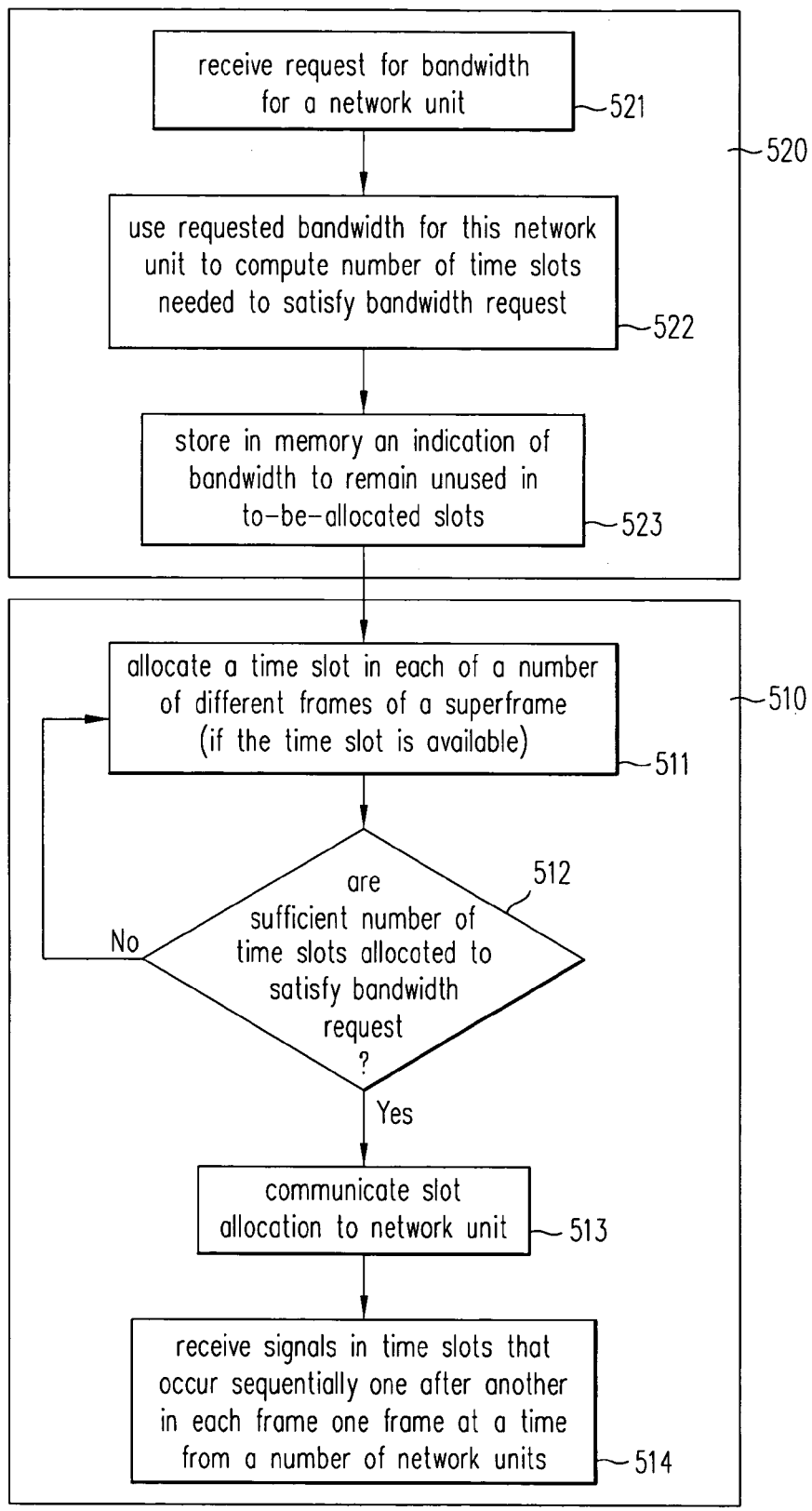
FIG. 5 illustrates, in a flow chart, acts performed in accordance with the invention to allocate slots in different frames.

In accordance with the invention, on receiving a request from a network unit for allocation of bandwidth, a number of time slots, each time slot in a different frame of superframe 400 are allocated by the optical line terminal (OLT) to the same network unit, as per act 511 in FIG. 5. In the example illustrated in FIG. 4A, time slots 411A–411I that are located near the beginning of each frame 410I (e.g. a slot which is the very first slot in each frame) are allocated to the network unit. In the just-described example, if the very first time slot of a frame is already allocated (e.g. for ranging or for use by another ONU), another time slot, such as the second time slot or the third time slot in the frame may be allocated.

Note that the just-described allocation of time slots in different frames of a superframe is possible only when the allocation requires fewer time slots than the number of frames in a superframe, and if there is at least one free time slot available in each frame. In such a case, certain embodiments in accordance with the invention ensure that each sub-frame that is allocated is located in a different frame. One example is where an ONU needs 12 time slots and the superframe has total of 16 frames, and in such a case the 12 time slots may be allocated, one time slot per frame, in a total of 12 frames. Note however, that in such embodiments, only one sub-frame per frame cannot be allocated if the request requires more time slots than the number of frames in a superframe.

In several embodiments, the bandwidth allocation request is for transmission of asynchronous data, e.g. Ethernet data packets that are transmitted by each network unit (e.g. ONU) only in the time slots that are allocated to it. The above-described allocation of time slots that are separated from one another (e.g. by almost the duration of a frame) to the same optical network unit (ONU) in certain embodiments of the invention provides lower variation in delay during upstream transmission by the individual optical network units (ONUs), as compared to, for example, allocation of the entire requested bandwidth in a group of contiguous time slots in a single frame. Allocation of time slots that are scattered across a superframe in accordance with the invention eliminates the need for an optical network unit (ONU) to have to wait for a long time (e.g. the duration of multiple frames) after a long transmission before it can transmit again. Instead, each optical network unit in accordance with the invention takes turns at transmitting short bursts, and normally each optical network unit gets multiple opportunities to transmit in each superframe. Therefore each optical network unit maintains smaller buffers for holding the asynchronous data traffic as compared to an implementation wherein a number of contiguous time slots (i.e. time slots that are adjacent to one another) are allocated to each network unit.

Returning to FIG. 5, if the number of time slots that have been allocated in accordance with act 511 are sufficient to satisfy the bandwidth request i.e. N or fewer time slots are required (as per act 512 in FIG. 5), then the optical line terminal (OLT) communicates the slot allocation (as per act 513) to the optical network unit (ONU) and the ONU starts to use the allocated time slots to transmit information to the OLT, and the OLT in turn starts to receive information from the ONU in the normal manner (as per act 514 in FIG. 5). The slot allocation may be communicated to the ONUs in a link-level message e.g. in a fixed-length bit pattern that is included in an overhead portion of a subframe, e.g. in a header subframe (HSF) that is located along a diagonal of a superframe as discussed below in reference to FIG. 6.

Figure 4B:
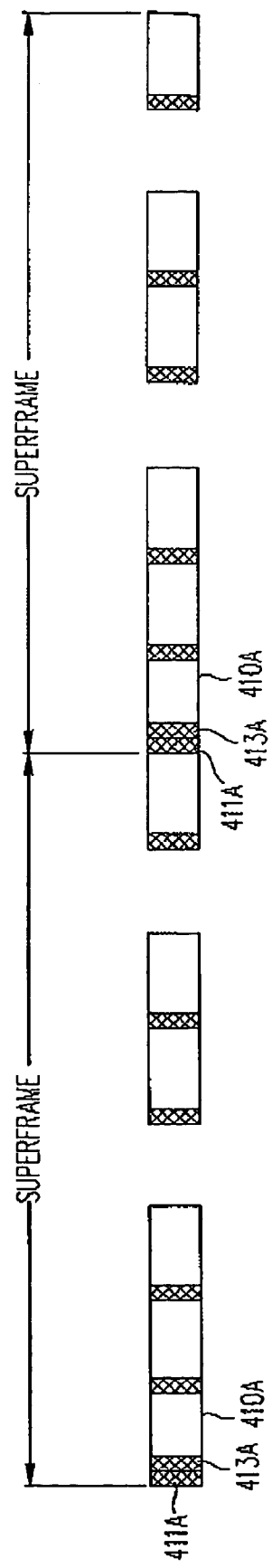
FIG. 4B illustrates allocation of slots similar to the allocation in FIG. 4A in another embodiment, except that a larger amount of bandwidth is allocated in FIG. 4B.

On the other hand, if in act 512 (FIG. 5) the optical line terminal (OLT) finds that more time slots are required to provide the requested bandwidth, the above-described act 511 is repeated. Therefore, additional time slots are allocated, again from different frames in accordance with the invention, rather than contiguously in a single frame. In one example illustrated in FIG. 4B, only one additional time slot is required, and time slot 413A is shown as being allocated. Note that in such a case, multiple time slots in the same frame, e.g. two time slots 411A and 413A in first frame 410A are allocated to the same network unit. Moreover, as illustrated in FIG. 4B, during such repeated allocation, two or more time slots (in this example time slots 411A and 413A) that are allocated in the same frame, may be located adjacent to one another (i.e. occurring sequentially one after another without an intervening time slot).

Note that acts 511–514 of method 510 discussed above can be performed in accordance with the invention regardless of the preceding acts, such as acts 521–523 that may be performed in some embodiments. In such embodiments, the optical line terminal (OLT) first receives a request for bandwidth from an optical network unit (GNU) as per act 521 in FIG. 5, and computes the number of time slots needed to provide the requested amount of bandwidth as per act 522. In doing so, the optical line terminal (OLT) takes into account any bandwidth that was overallocated to an optical network unit (ONU).

Specifically, the granularity of bandwidth provided by time slots is larger than the granularity of the bandwidth requests, and when a bandwidth request requires more than F-1 time slots but less than F time slots, F time slots are allocated, and the overallocated (unused) bandwidth in the last time slot is noted in memory as per act 523 in FIG. 5. Such overallocated bandwidth is taken into account when allocating bandwidth (as per act 522) for a next request from the same optical network unit (ONU). Furthermore, in some embodiments, when deallocating bandwidth, a time slot that is only partially used is deallocated first, thereby to make the entire time slot available for allocation to another optical network unit (ONU). Moreover, in such embodiments, the deallocation may be performed in a manner that is reverse to the manner of allocation.

Note that the just-described accounting of overallocated bandwidth in allocating time slots for the next bandwidth request, and in deallocating the time slots, need not be performed in some embodiments. For example, time slots may be chosen to have the same granularity as the granularity of bandwidth requests, in certain embodiments.

Each superframe 600 (FIG. 6) in accordance with the invention may be viewed as having subframes 411A–411N arranged along a row of a two-dimensional array that represents a frame 410I wherein the optical line terminal (OLT) receives the superframe one row at a time. The concept of a frame as a unit of superframe 600 is better illustrated by frame 410J in FIG. 6 which is shown without the subframes contained therein.

In certain embodiments, subframes for data transfer (e.g. Ethernet packets) are allocated to each optical network unit (ONU) column by column e.g. in columns 601 and 602 (FIG. 6) from left to right, and within each of columns 601 and 602 subframes are allocated from top to bottom as illustrated by arrows 601A and 602A. In the example illustrated in FIG. 6, the bandwidth request requires allocation of 19 time slots which are allocated by visiting two adjacent columns 601 and 602 one after another as illustrated by arrows 601A and 602A.

Note that in the just-described example, it was assumed that the two time slots at the bottom of column 601 are allocated to other ONUs for ranging (whether or not such other ONUs are currently operational in the PON), and are therefore not counted towards the current request. The need for allocation of two time slots for ranging arises in one embodiment wherein each subframe is transmitted in 125 microseconds and there is a constant delay time of 200 microseconds. The downstream and upstream frame structures are aligned in this embodiment with a fixed time difference of the duration of exactly two (2) subframes, i.e. 250 microseconds.

Figure 6:
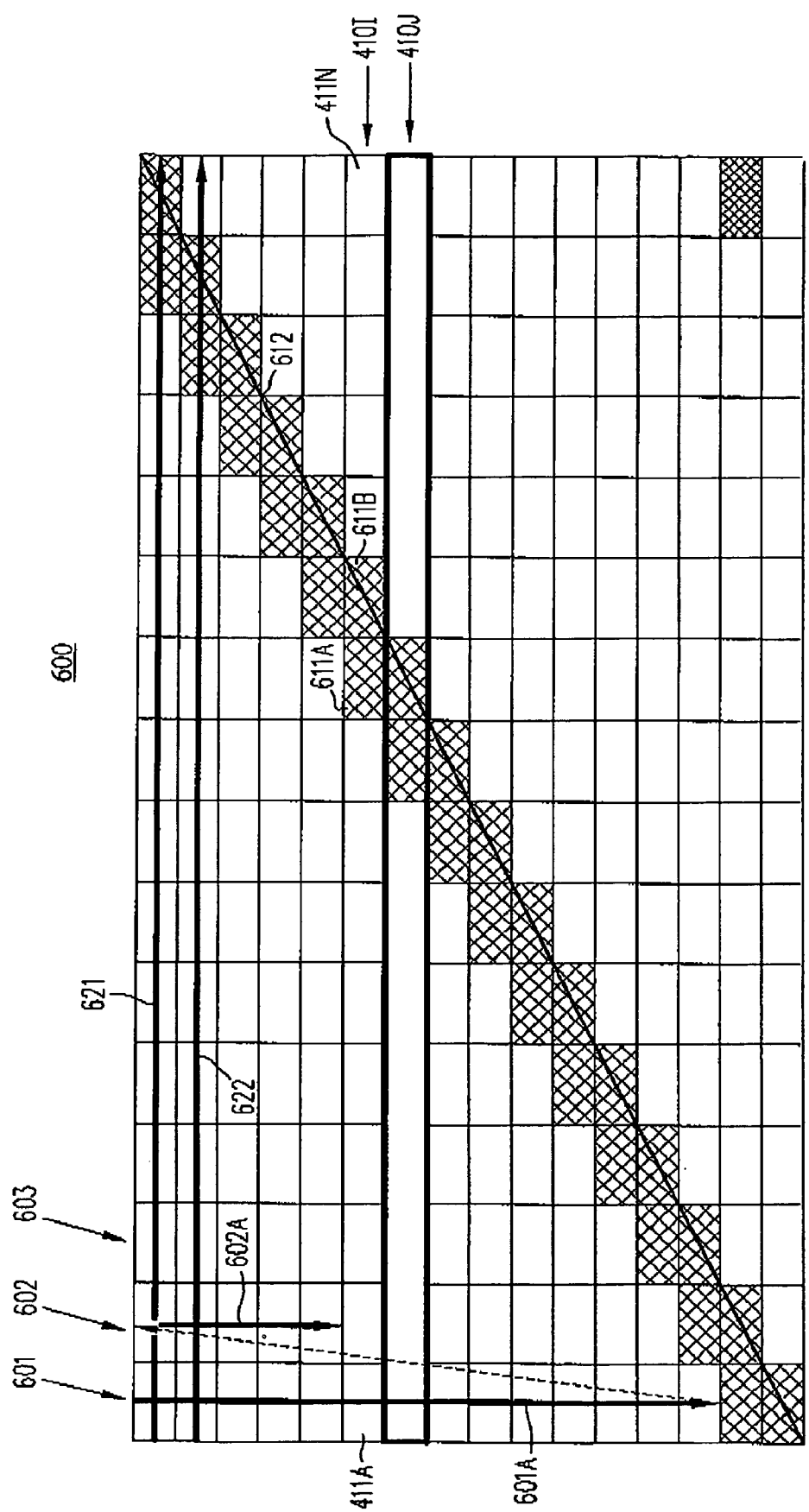
FIG. 6 illustrates, in a two-dimensional array structure of a superframe in some embodiments wherein slots are allocated for data one column at a time from left to right, and slots adjacent to a diagonal are allocated for ranging.

As discussed elsewhere herein, if one of the two time slots (e.g. the bottom-most time slot in column 601) is preallocated to the current ONU (e.g. ONU1) then this time slot may be counted towards the bandwidth allocation, and if only 19 time slots are required, then only 4 time slots are allocated in column 602 (instead of 5 time slots as shown in FIG. 6). Moreover, although certain time slots are described herein as being used for ranging in some embodiments, in other embodiments ranging may be performed out of band, i.e. on a different wavelength that is dedicated to carrying control information. Therefore, in such other embodiments, allocation of the time slots to provide the requested bandwidth proceeds as described herein (e.g. from top to bottom on column 601) without regard to ranging.

In several embodiments, an effort is made to allocate at least one subframe in each frame (i.e. one slot per row in FIG. 6), so as to reduce the delay variation in data transmission when using the allocated time slots. In such an embodiment, the subframes may be deallocated (for use by an ONU) in the reverse manner, e.g. column by column from the right-most allocated column (e.g. column 602) to the left-most allocated column (e.g. column 601), and within each column the subframes may be deallocated from bottom to top, reverse to the arrows 601 and 602. Note that arrows 621 and 622 indicate the order in which subframes are transmitted (left to right in each row, starting with a top row and ending with the bottom row). Therefore, in certain embodiments, the order of allocation (and deallocation) of subframes to an ONU is orthogonal to the order in which subframes are actually transmitted.

When subframes are to be used (at least partially) for a purpose other than data transfer, e.g. ranging, then the above-described non-sequential allocation of subframes need not be followed. Specifically, for ranging, at least two sequential subframes, such as subframes 611A and 611B in the same row 410I (FIG. 6) are allocated to the same ONU, and the allocation remains fixed during normal operation (and for this reason such subframes are considered "preallocated"). In the example illustrated in FIG. 6, two subframes 611A and 611B in the same row 410I, and located at or near a diagonal 612 of superframe 600, may be preallocated for ranging. In this example, the time slots that are preallocated for ranging may be identified as [I, N–I], wherein N (e.g. 15) is the number of rows and columns in the superframe that are labeled starting with 0. For example, in FIG. 6, the left-most column 601 is labeled with 0, and column 602 is labeled with 1 and so on until the right-most column which is labeled with 15, and the top-most row is labeled with 0, and the bottom-most row is labeled with 15, and therefore time slot in column 0, row 15 (i.e. the left-most bottom time slot in the superframe) is allocated for ranging.

In addition, each time slot that precedes the just-described time slot is also allocated for ranging in some embodiments. Note that such sub-frames that are initially preallocated to an ONU for ranging are later used for data transmission once the ONU has been ranged. Note that in the example illustrated in FIG. 6, each frame (in horizontal direction) consists of N sub-frames (e.g. 16 subframes) and each superframe consists of N frames. So one superframe has N*N subframes. The data (e.g. TDM and Ethernet packets) is transmitted in bursts that are carried in the subframes. In one example, the transmission data rate at system side (i.e. in the OLT) is 1 Gbps. After 8B/10B encoding, the transmission line rate becomes 1.25 Gbps. Each subframe has a length of T microseconds (e.g. 125 microseconds) and carries 1000*T bits.

Note that bandwidth for TDM may be preallocated in a predetermined number of time slots. For example, in one particular embodiment, TDM bandwidths for different ONUs are preassigned in a row-oriented fashion, with each ONU_1 receiving all time slots in column 1. In such an embodiment, Ethernet packet bandwidth for each ONU may be allocated in any subframe in the entire superframe unless the subframe is already allocated to another ONU for Ethernet data. Note that within each subframe there can be multiple bursts of Ethernet data, although to improve bandwidth efficiency Ethernet frames may be regrouped (without idles and inter-packet gaps) into a single burst that fits within a single subframe. Moreover, in some embodiments, the same ONU transmits all the data in a time slot, i.e. the TDM data as well as Ethernet data, whereas in other embodiments different ONUs may transmit in the same time slot. Furthermore, in some embodiments, each time slot may be dedicated for only one type of data, e.g. TDM data or Ethernet data and in such a case an allocation method of the type described herein skips over the TDM time slots.

Figure 9:
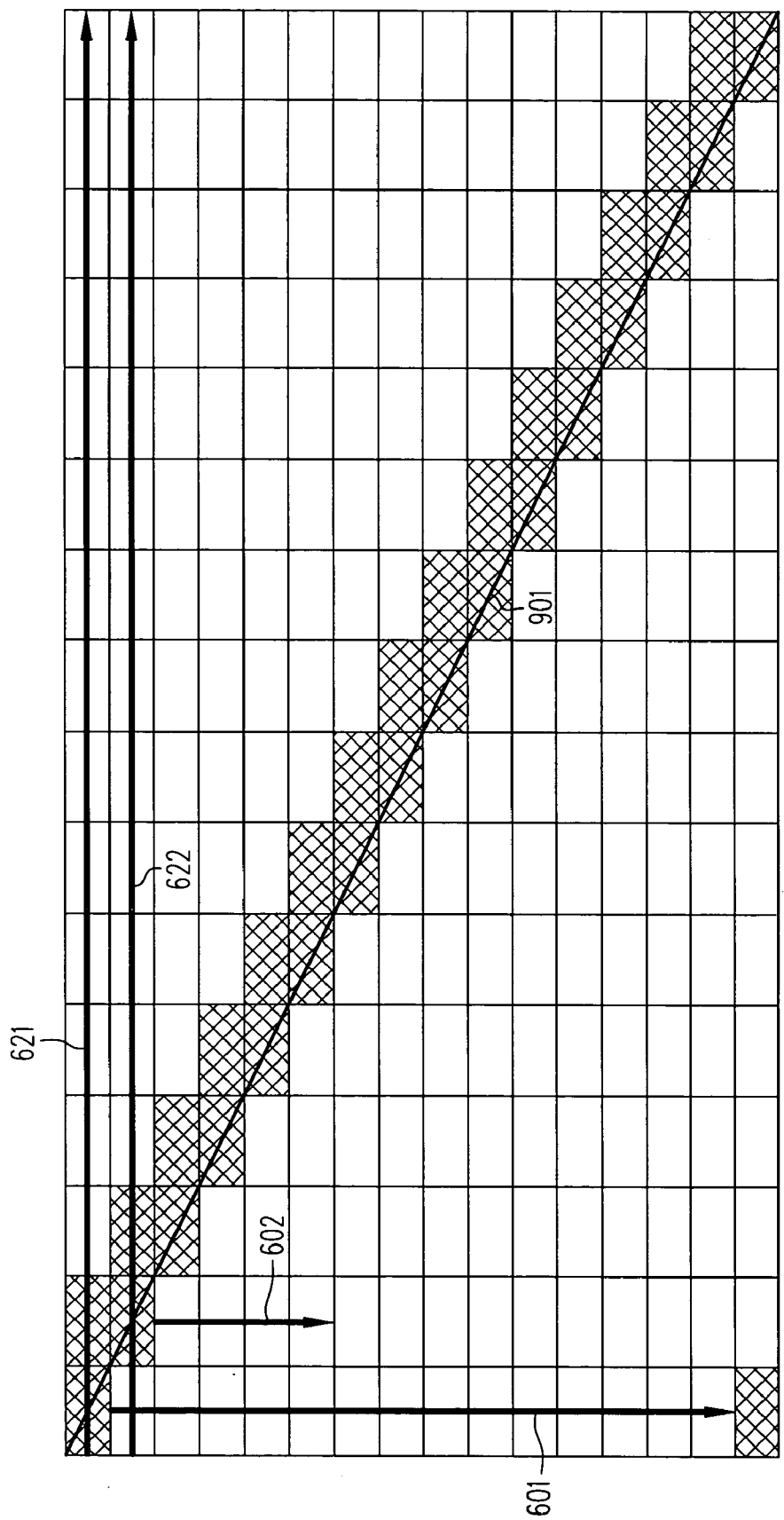
FIG. 9 illustrates, in a two-dimensional array structure of a superframe in various embodiments of the type illustrated in FIG. 6 except that slots are allocated for ranging adjacent to a diagonal that is located between the top left corner and the bottom right corner.

Depending on the embodiment, a diagonal (that is used to select the ranging time slots) may be between the top right corner and the bottom left corner of the superframe as illustrated by diagonal 612 in FIG. 6, or alternatively between the top left corner and the bottom right corner as illustrated in FIG. 9 (discussed below), e.g. time slots which are labeled as [I, I] wherein $0 \leq I \leq 15$. The subframes in time slots that are preallocated for ranging are also referred to as "ranging subframes" or as "header subframes" abbreviated as HSF. Note that in addition to ranging, such subframes may carry other control information, such as a fixed-length overhead bit pattern that may be used to indicate, for example, a bitmap that represents allocation of slots for bursts by each ONU. In addition, in certain embodiments, such subframes also carry one or more streams of time-division-multiplexed (TDM) data, such as traditional telephony voice traffic (e.g. in the form of T1/E1 defined in SONET/SDH). Depending on the embodiment, an allocation scheme of the type described herein can be used to also allocate time slots in response to bandwidth requests for TDM traffic.

Note that the just-described bitmap is only transmitted in the downstream direction, from the OLT to the ONUs. In the upstream direction, each ONU transmits to the OLT other information, such as bandwidth requirement and queue length which are used by the OLT in dynamically granting more bandwidth, and in some embodiments the reconfiguration of the bandwidth allocation is done not a superframe-by-superframe basis but over the duration of transmission of a number of superframes, e.g. over several milliseconds (whereas, each superframe is transmitted in 125 microseconds).

Figure 7:
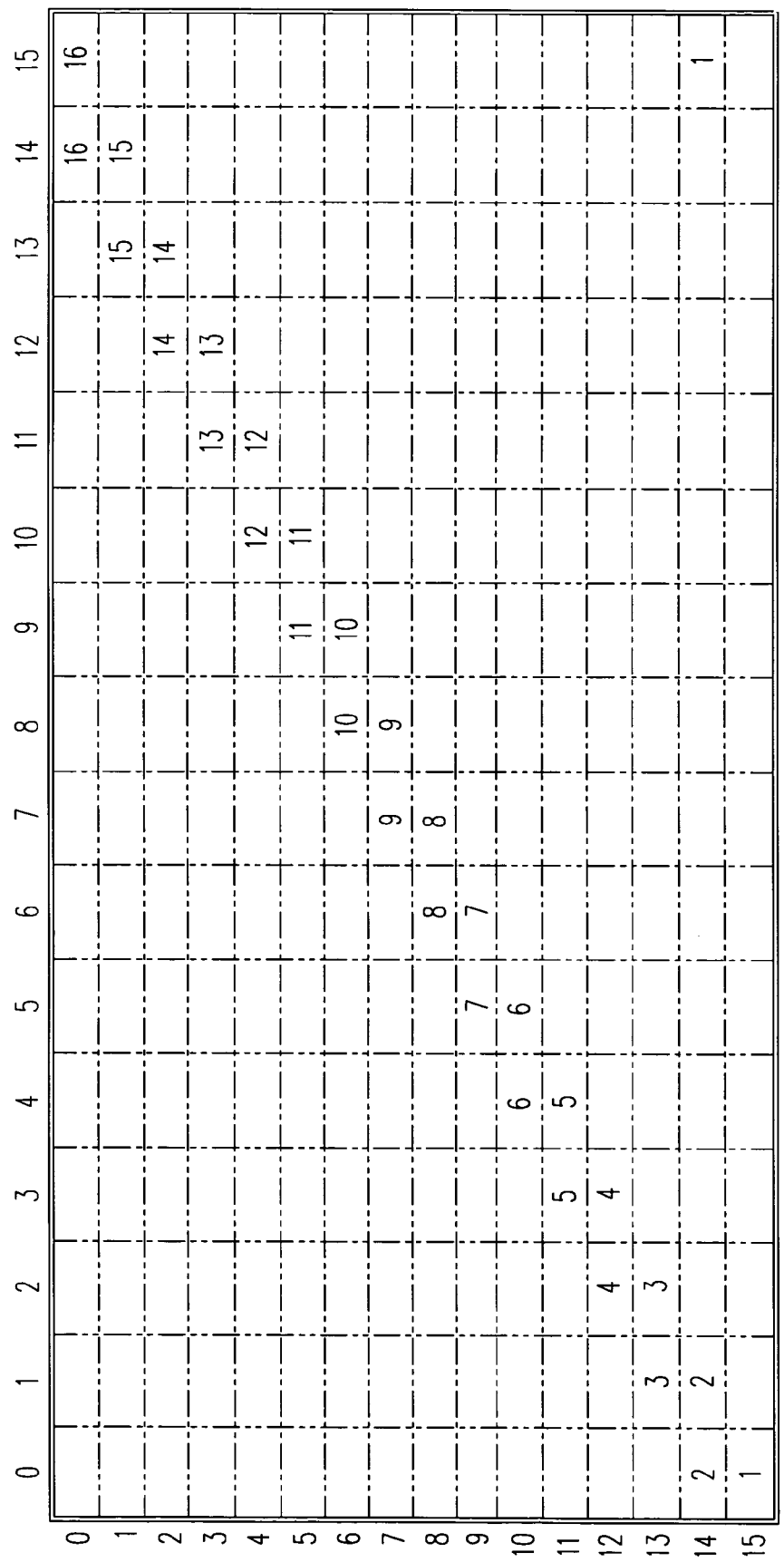
FIG. 7 illustrates allocation of ranging slots at certain locations to specific ONUs in certain embodiments of the invention.

In one specific embodiment, two subframes at the end of the first frame, namely in columns 14 and 15 in row 0 of FIG. 7 are allocated for use by ONU 16. In the next row 1, there is no subframe allocated in column 15, and instead two subframes in columns 13 and 14 are allocated to ONU15. In this manner, subframes along the diagonal are allocated until row 14 in which the subframes in column 0 and column 1 are allocated to ONU 2. Finally, in row 15, ONU1 is allocated one subframe in column 0 and another subframe in the previous frame's column 15. Note that for ONU1, the allocation of subframes for ranging has wrapped around the boundary between column 0 and column 15. In FIG. 7, all ranging sub-frames are allocated to all 16 ONUs that are used in this exemplary passive optical network (PON).

If there were more ONUs that need to be allocated ranging subframes, then such allocation can continue along the diagonal in the opposite direction (i.e. from the bottom right corner of the superframe to the top left corner). Alternatively, as noted elsewhere, two ONUs can share the same two subframes in a row for ranging, if they use the two subframes in alternate superframes. When using such a scheme, twice as many ONUs as the number of rows in a superframe can be accommodated.

Figure 8:
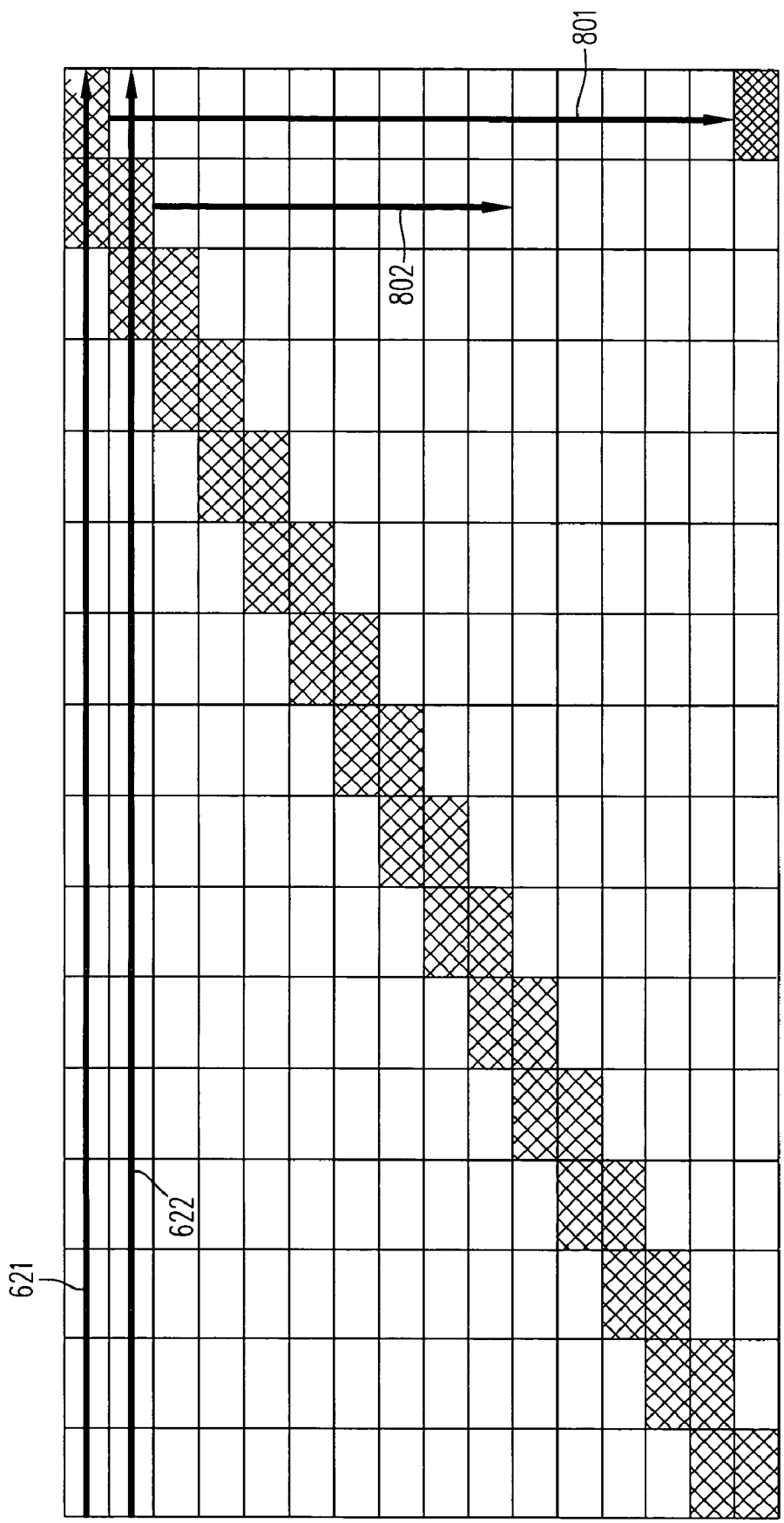
FIG. 8 illustrates a two-dimensional array structure of a superframe in additional embodiments of the type illustrated in FIG. 6 except that slots are allocated for data one column at a time from right to left.
Figure 10:
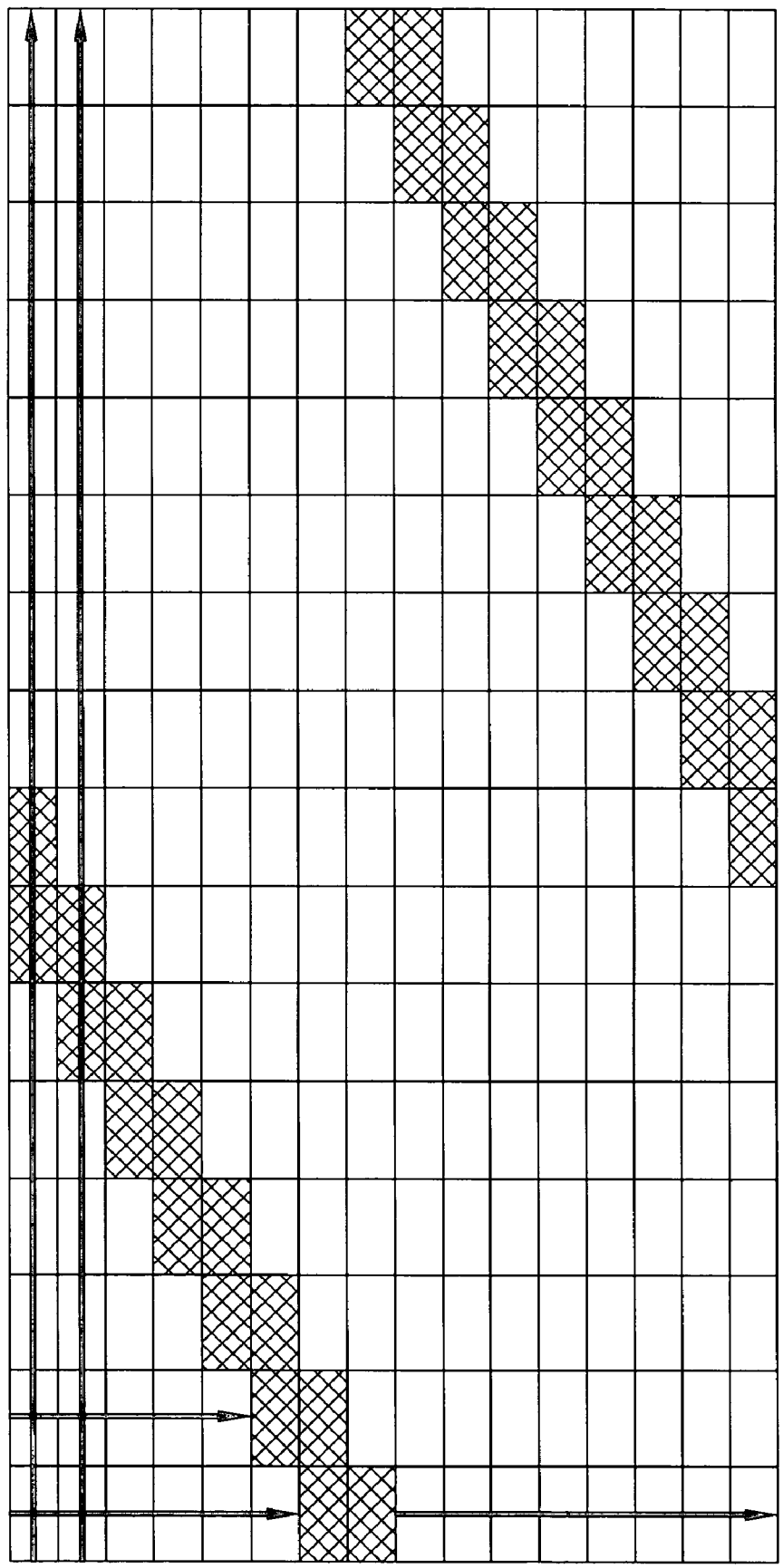
FIG. 10 illustrates, in a two-dimensional array structure of a superframe, various embodiments of the type illustrated in FIG. 6 except that slots are allocated for ranging adjacent to two lines parallel to the diagonal of FIG. 9.

Although in some embodiments, subframes are allocated along columns from left to right as illustrated by arrows 601 and 602 in FIG. 6, in other embodiments subframes can be allocated from right to left as illustrated by arrows 801 and 802 in FIG. 8. Furthermore, although in some embodiments, ranging subframes are allocated along a diagonal between the bottom left and top right corners, in other embodiments, ranging subframes may be allocated along a diagonal 901 between the bottom right and top left corners as illustrated in FIG. 9. Also, instead of allocating ranging subframes along a diagonal, certain embodiments may allocate ranging subframes along two parallel lines in a diagonal direction as illustrated in FIG. 10.

Certain embodiments of the invention may be implemented as illustrated in flow charts 11A–11E that are described in the following.

```
getPonBw (refer to FIG. 11A)
/************************/
  FUNC: getPonBw
/************************/
Initialize configuring_up_bw[];
/* Check ranging available bw */
IF ranging_related_bw_avail_to_onu[] < request bw
    ranging_related_bw_avail_to_onu[] = 0
    adjust request bw
ELSE
    adjust ranging_related_bw_avail_to_onu[];
    return success;
ENDIF
/* Check partial available bw */
IF partial_bw_available_to_onu[] > 0
    IF partial_bw_available_to_onu[] < request bw
        partial_bw_available_to_onu[] = 0
        adjust request bw
    ELSE
        ajust partial_bw_available_to_onu[]
        return success;
    ENDIF
    /* Note: above pseudo-code is not illustrated in FIG. 11A */
```

Figure 11A:
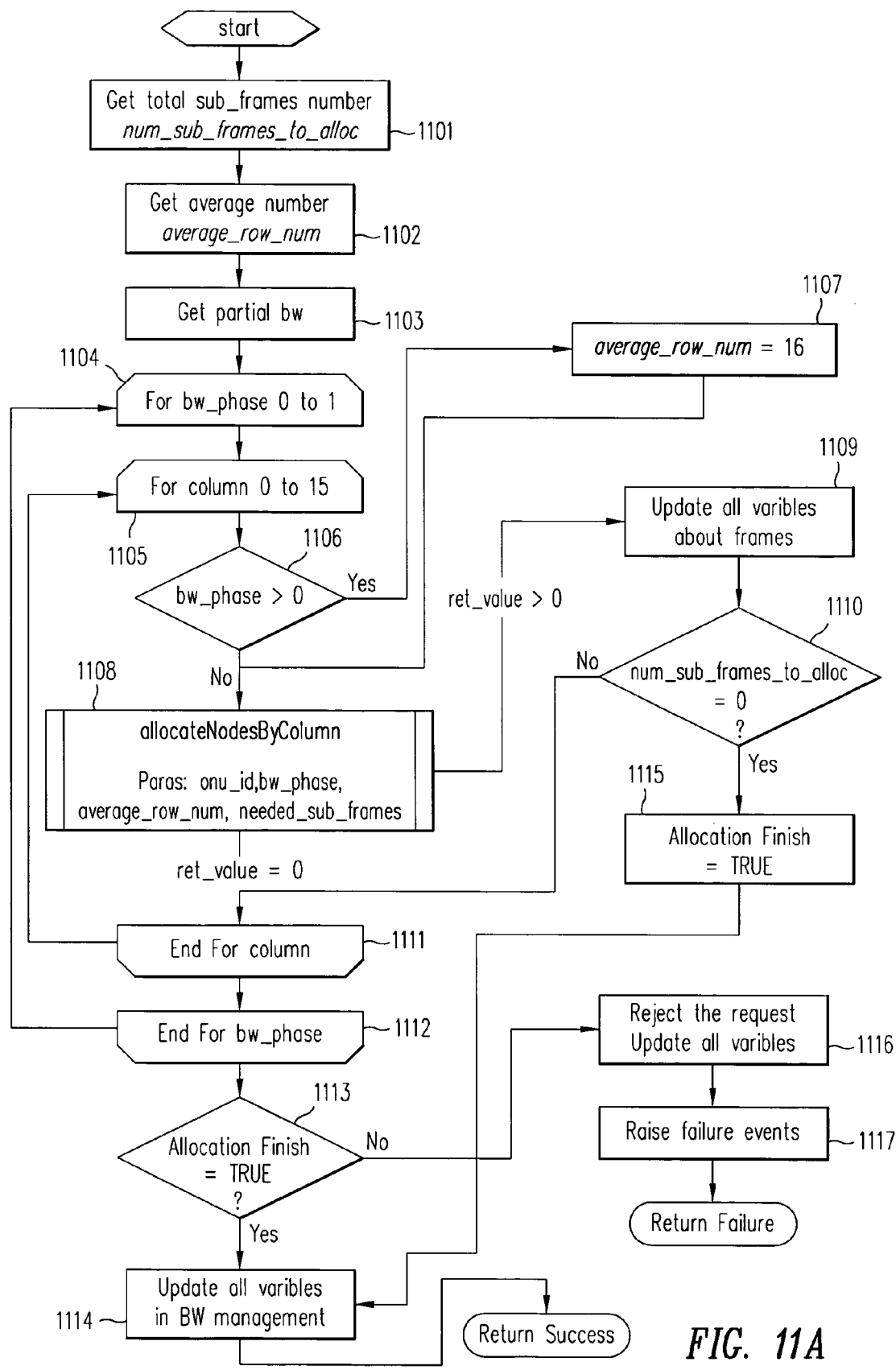
FIGS. 11A–11E illustrate, in flow charts, acts performed in one embodiment to implement a method for allocation and deallocation of bandwidth in one specific embodiment.
Figures 2, 11B:
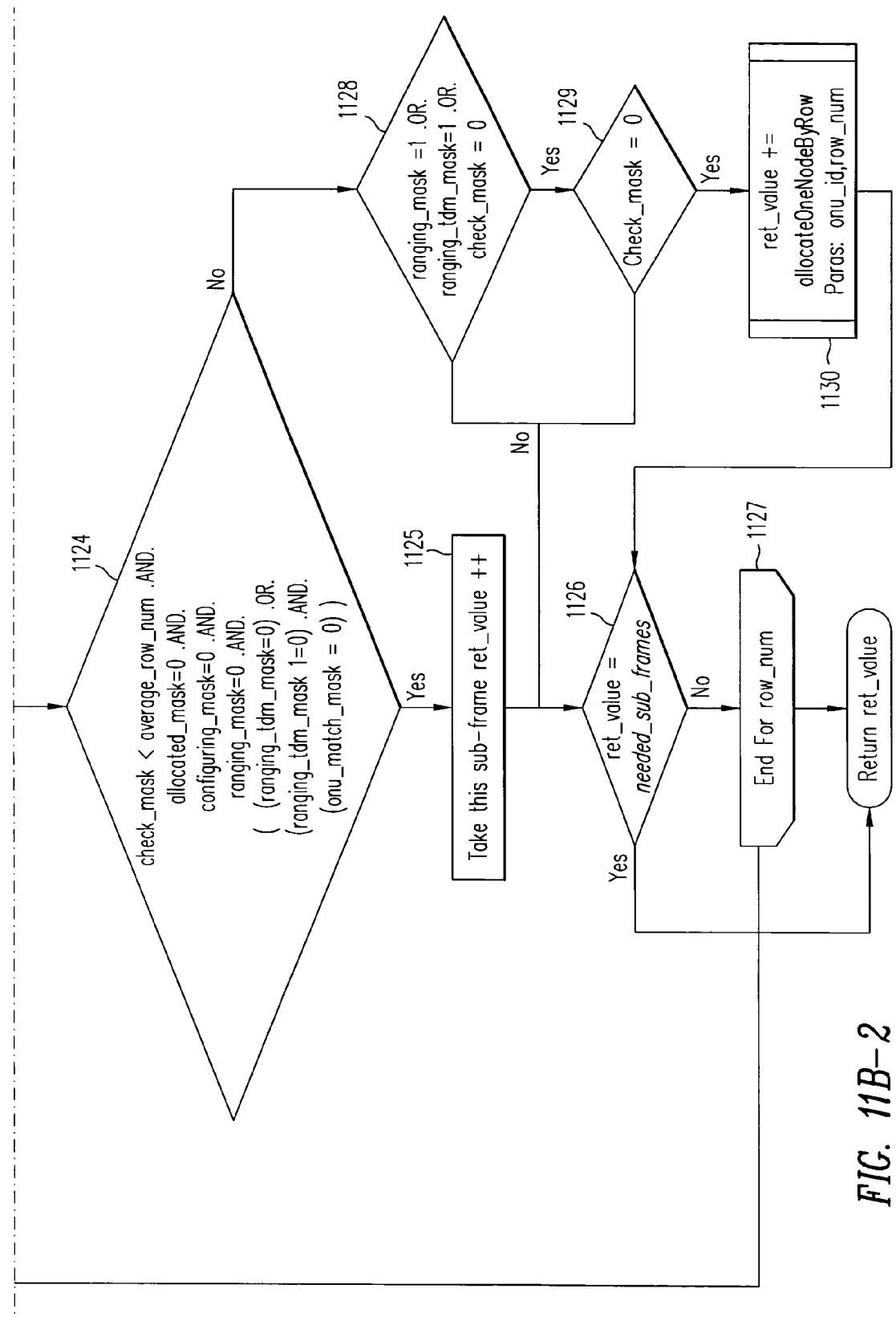
Figure 11C:
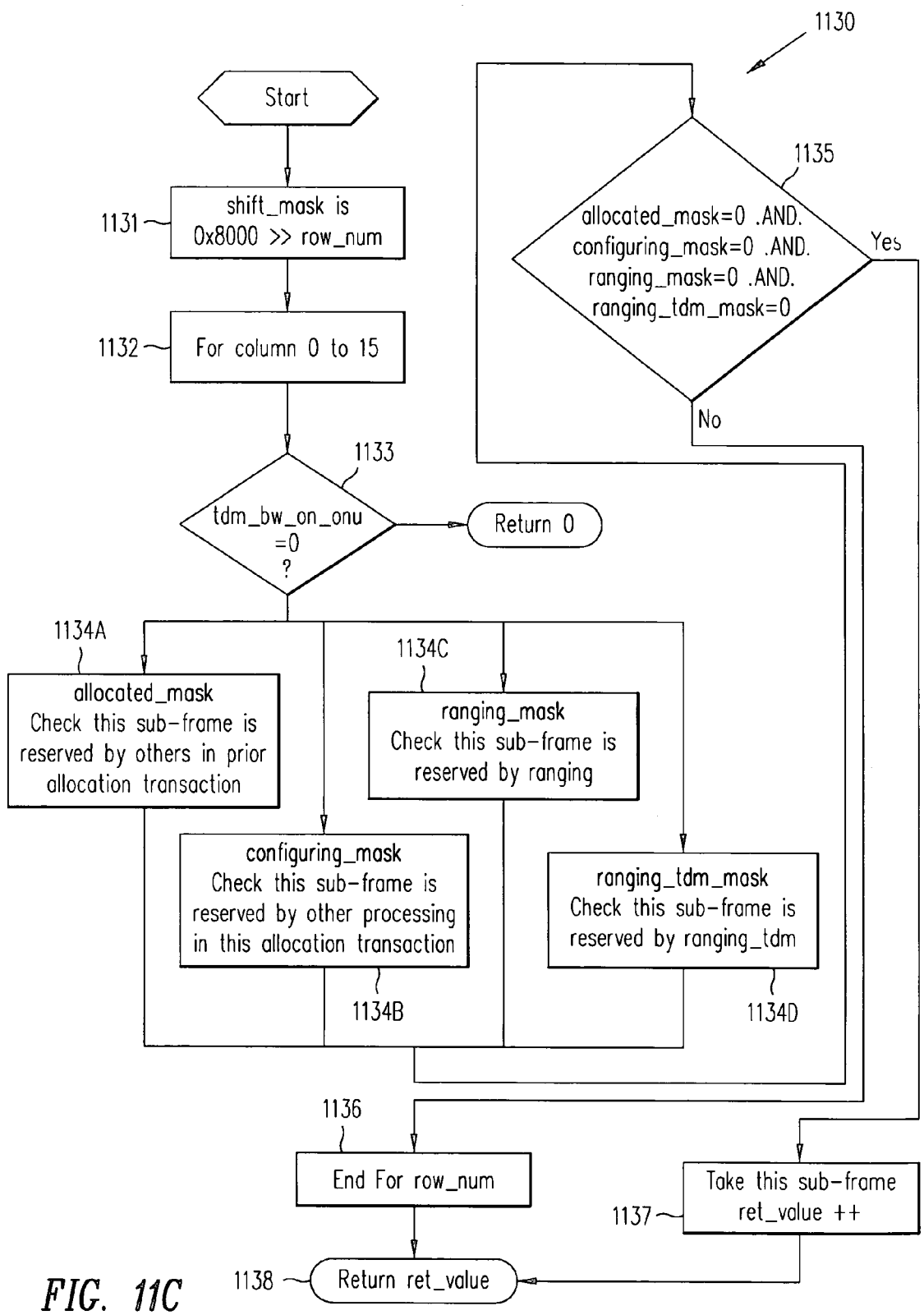

```
        /* Check -- is there TDM column for this ONU */
        /* Searching available sub-frame column by column, refer to FIG. 11A */
        Get the total sub-frames number (as illustrated in act 1101 in FIG. 11A)
        Get the average number for each row = total sub-frames number / 16
        (as illustrated in act 1102 in FIG. 11A)
        Save partial bw into partial_bw_used_by_onu[]
                (as illustrated in act 1103 in FIG. 11A)
        FOR bw_phase = 0 to 1 (as illustrated in act 1104 in FIG. 11A)
        /* 0 means strict searching, 1 means no strict searching */
        /* "Strict" means in 1st time, we must try to allocate one sub-frame for each row */
        /* after we pass strict allocation for all rows, we can allocate by no strict searching. */
            FOR column = 0 to 15 (as illustrated in act 1105 in FIG. 11A)
                IF bw_phase > 0 average_row_num = 16 (see FIG. 11A, act 1107)
                nums = allocateNodesByColumn (see FIG. 11A, act 1108)
                            /* refer to FIG. 11B for details*/
                update num_sub_frames_to_alloc, num_sub_frames_allocated with nums
                            (as illustrated in act 1109 in FIG. 11A)
                IF num_sub_frames_to_alloc = 0
                            (as illustrated in act 1110 in FIG. 11A)
                    EXIT with done = TRUE;
                            (as illustrated in act 1115 in FIG. 11A)
                ENDIF
            ENDFOR (as illustrated in act 1111 in FIG. 11A)
        ENDFOR (as illustrated in act 1112 in FIG. 11A)
        IF done = FALSE  (as illustrated in act 1103 in FIG. 11A)
            Reject the request, restore all changed variables
                        (as illustrated in act 1116 in FIG. 11A)
            Raise failure events
                        (as illustrated in act 1117 in FIG. 11A)
            return failure
        ELSE
            Update all varibles in BW management
                        (as illustrated in act 1114 in FIG. 11A)
            return success
        ENDIF
allocateNodesByColumn (refer to FIG. 11B)
/************************************/
 FUNC: allocateNodesByColumn
/************************************/
FOR row from 0 to 15         (as illustrated in act 1121 in FIG. 11B)
    Get shift_mask           (as illustrated in act 1122A in FIG. 11B)
    Get onu_match_mask, check onu_id is just matching the ranging_tdm sub_frame
                        (as illustrated in act 1122B in FIG. 11B)
    Get check_mask, to get how many sub-frames already allocated in this row
                        (as illustrated in act 1122C in FIG. 11B)
    Get allocated_mask, to check the sub-frame is reserved by others in prior allocation
                        (as illustrated in act 1123A in FIG. 11B)
    Get configuing_mask, to check the sub-frame is reserved by other processing
                        (as illustrated in act 1123B in FIG. 11B)
    Get ranging_mask, to check the sub-frame is reserved by ranging
                        (as illustrated in act 1123C in FIG. 11B)
    Get ranging_tdm_mask, to check the sub-frame is reserved by ranging_tdm
                        (as illustrated in act 1123D in FIG. 11B)
    IF (check_mask < average_row_num .AND.
        allocated_mask = 0 .AND.
        configuring_mask = 0 .AND.
        ranging_mask = 0 .AND.
        ( (ranging_tdm_mask = 0).OR. (ranging_tdm_mask != 0 .AND.
onu_match_mask = 0) ))        (as illustrated in act 1124 in FIG. 11B)
        It passes all validation, take this sub-frame, ret_value ++
                        (as illustrated in act 1125 in FIG. 11B)
    ELSE IF (ranging_mask = 1 .OR. ranging_tdm_mask = 1 .OR. check_mask = 0)
                        (as illustrated in act 1128 in FIG. 11B)
        /* Try to allocate at least one sub-frame for each row */
        IF check_mask = 0    (as illustrated in act 1129 in FIG. 11B)
            allocateOneNodeByRow /* refer to next section for details*/
                        (as illustrated in act 1130 in FIG. 11B)
        ENDIF
    ENDIF
    IF ret_value reach the needed_sub_frames (as illustrated in act 1126 in FIG. 11B)
        return ret_value
    ENDIF
ENDFOR                          (as illustrated in act 1127 in FIG. 11B)
allocateOneNodeByRow (refer to FIG. 11C)
/************************************/
 FUNC: allocateOneNodeByRow
/************************************/
Get shift_mask for later usage(see FIG. 11C, act 1131)
```

Figure 11D:
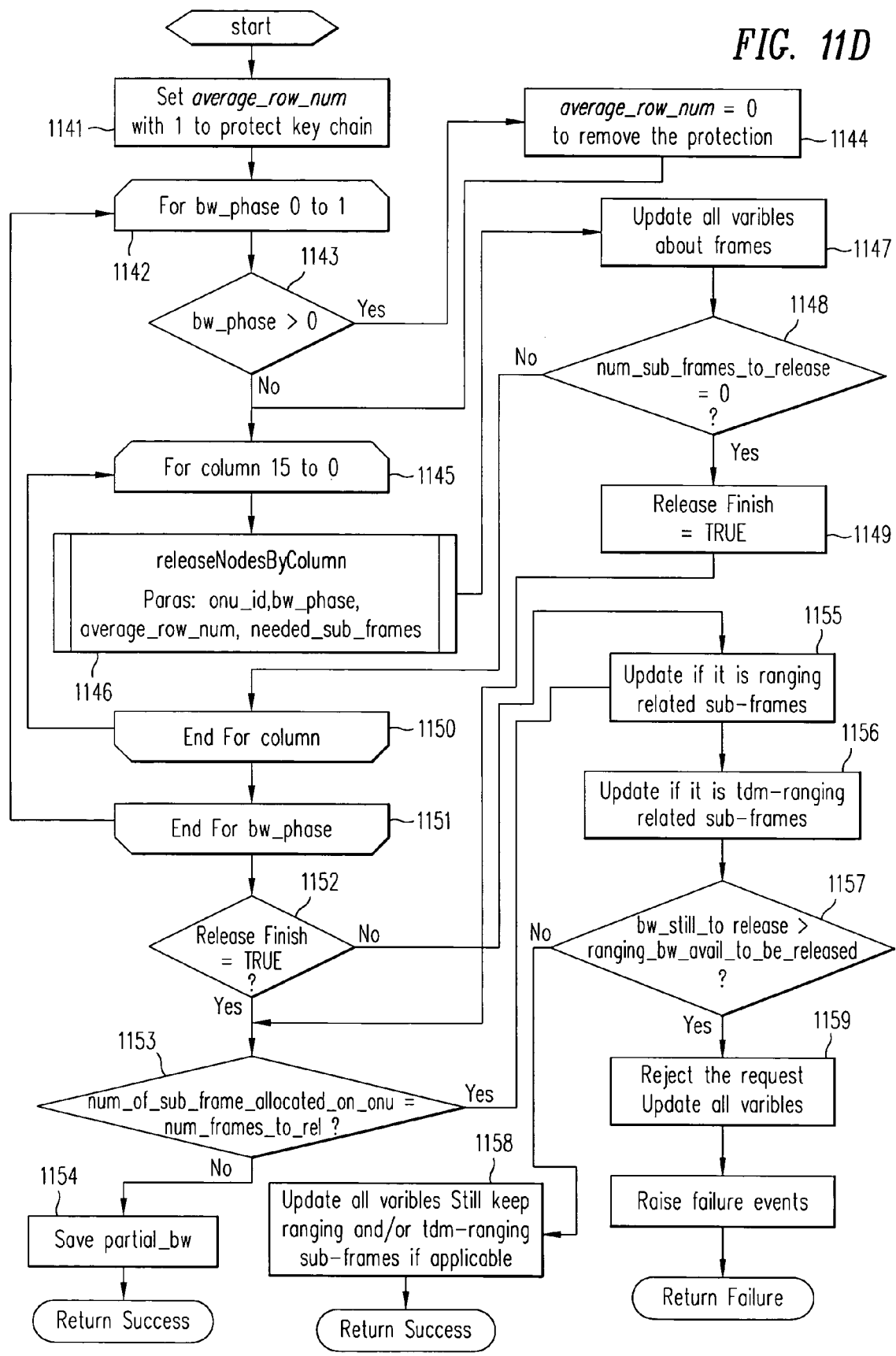

```
     FOR column 0 to 15 (see FIG. 11C, act 1132)
          IF it is tdm column (see FIG. 11C, act 1133)
                    Return 0
          ELSE
                    Get allocated_mask, to check the sub-frame is reserved by others in prior
allocation (see FIG. 11C, act 1134A)
                    Get configuring_mask, to check the sub-frame is reserved by other processing
(see FIG. 11C, act 1134B)
                    Get ranging_mask, to check the sub-frame is reserved by ranging (see FIG. 11C,
act 1134C)
                    Get ranging_tdm_mask, to check the sub-frame is reserved by ranging_tdm (see
FIG. 11C, act 1134D)
          ENDIF
          IF (allocated_mask = 0 .AND.
                configuring_mask = 0 .AND.
                ranging_mask = 0 .AND.
                ranging_tdm_mask = 0) (see FIG. 11C, act 1135)
                It passes all validation, take this sub-frame, ret_value ++ (see FIG. 11C, act
1137)
                    Return ret_value (see FIG. 11C, act 1138)
          ENDIF
     ENDFOR (see FIG. 11C, act 1136)
     Return ret_value (see FIG. 11C, act 1138)
     Bandwidth Release
     relPonBw (refer to FIG. 11D)
     /************************/
       FUNC: relPonBw
     /************************/
     IF partial_bw_used_by_onu > 0
          IF partial_bw_used_by_onu >= bw_to_release
               Adjust partial_bw
               Return Success
          ELSE
               Adjust bw_to_release
               Update the frames variables
          ENDIF
     ENDIF
     /* Check is there TDM column for this ONU */
     /* Searching available sub-frame for release column by column, refer to FIG. 11D */
     Set average_row_num = 1 to protect the key chain for specific ONU bandwidth (see
FIG. 11D, act 1141)
          FOR bw_phase = 0 to 1 /* 0 means strict searching, 1 means no strict searching */
(see FIG. 11D, act 1142)
               IF bw_phase = 1 (see FIG. 11D, act 1143)
                    change average_row_num = 0 /* no strict searhing */ (see FIG. 11D, act
1144)
               ENDIF
               FOR column = 15 to 0 (see FIG. 11D, act 1145)
                         nums = releaseNodesByColumn /* refer to next section for details*/ (see
FIG. 11D, act 1146)
                         update num_sub_frames_to_release with nums (see FIG. 11D, act 1147)
                              IF num_sub_frames_to_release = 0 (see FIG. 11D, act 1148)
                                   EXIT with done = TRUE; (see FIG. 11D, act 1149)
                              ENDIF
               ENDFOR (see FIG. 11D, act 1150)
          ENDFOR (see FIG. 11D, act 1151)
          IF done = FALSE .OR. num_of_sub_frame_allocated_on_onu =
already_release_num (see FIG. 11D, act 1153)
               Check if we release bw related to ranging sub-frames (see FIG. 11D, act 1155)
               Check if we release bw related to tdm-ranging sub-frames (see FIG. 11D, act
1156)
               IF (bw_still_to release > ranging_bw_avail_to_be_released) (see FIG. 11D, act
1157)
                    Reject the request, restore all changed variables (see FIG. 11D, act 1159)
                    Raise events
                    return failure
               ELSE
                    Update all varibles in BW management (see FIG. 11D, act 1158)
                    Note still keep the ranging and/or tdm-ranging sub-frame if applicable
                    return success
               ENDIF
          ENDIF
```

Figures 1, 11E:
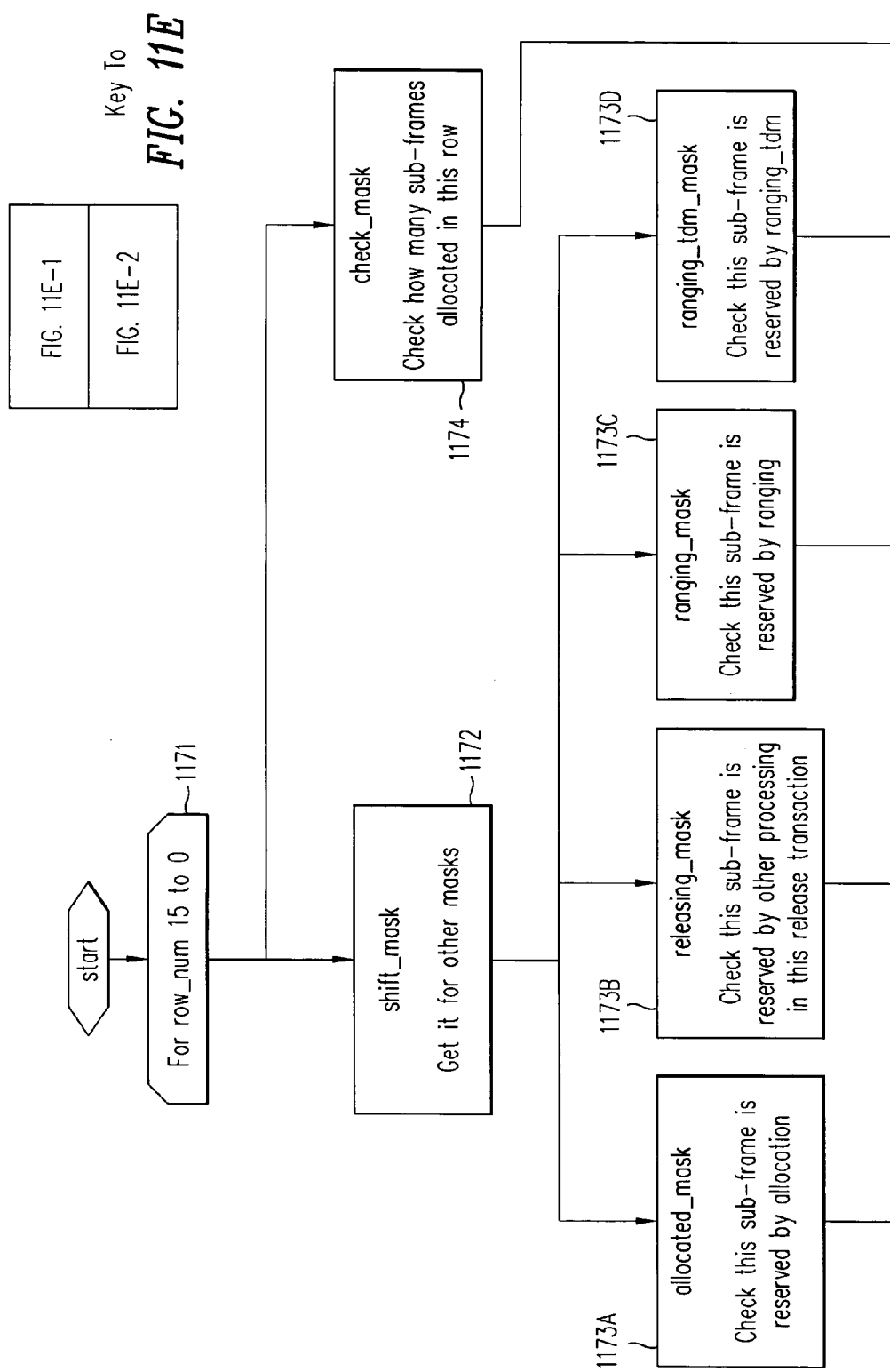
Figures 2, 11E:
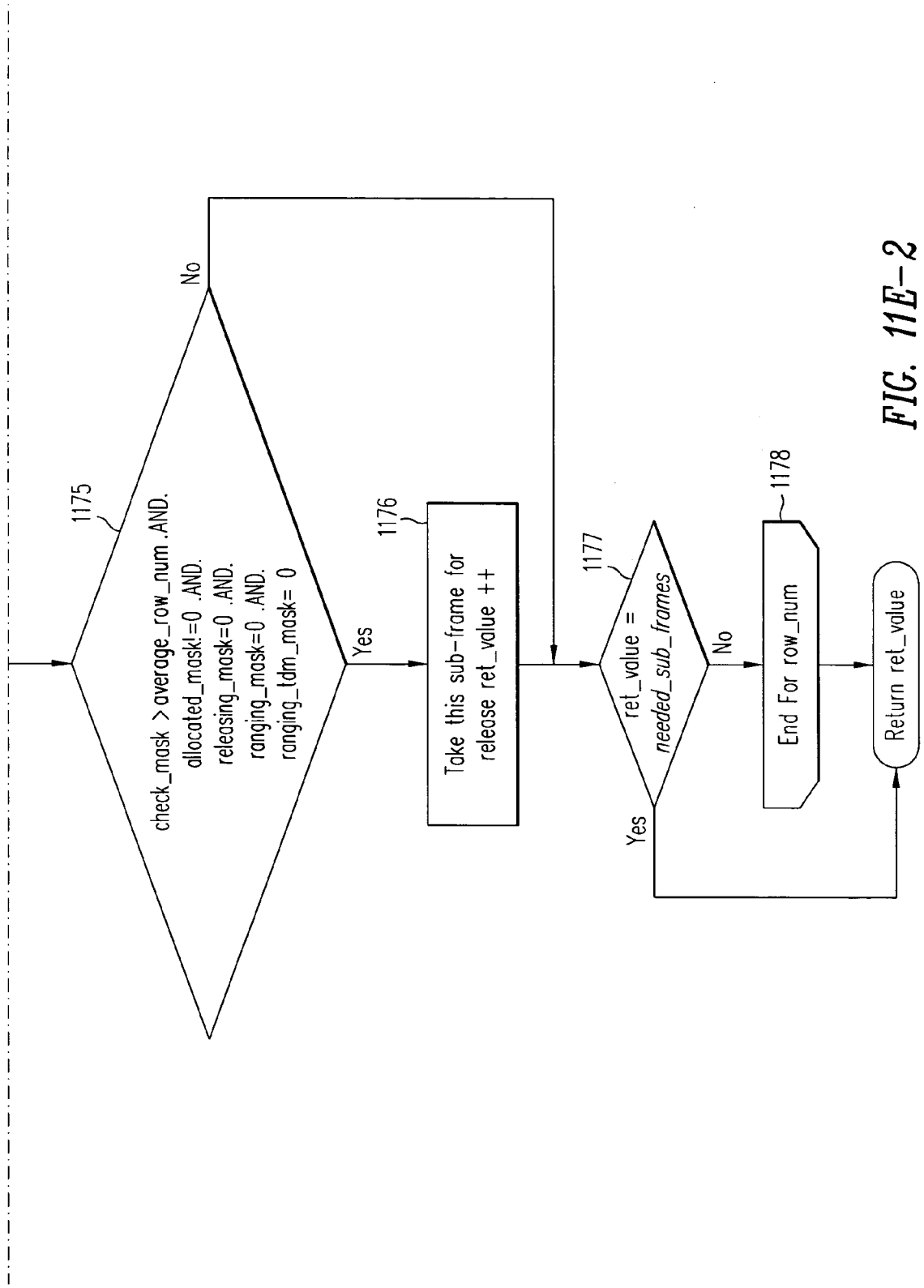

```
    ELSE
        Save partial_bw (FIG. 11D 1154)
        return success
    ENDIF
            releaseNodesByColumn (refer to FIG. 11E)
/************************************/
  FUNC: releaseNodesByColumn
/************************************/
FOR row from 15 to 0 (see FIG. 11E, act 1171)
    Get shift_mask (see FIG. 11E, act 1172)
```

```
    Get check_mask, to get how many sub-frames already allocated in this row (see
FIG. 11E, act 1174)
    Get allocated_mask, to check the sub-frame is reserved by allocation (see FIG.
11E, act 1173A)
    Get releasing_mask, to check the sub-frame is reserved by other processing (see
FIG. 11E, act 1173B)
    Get ranging_mask, to check the sub-frame is reserved by ranging (see FIG. 11E,
act 1173C)
    Get ranging_tdm_mask, to check the sub-frame is reserved by ranging_tdm (see
FIG. 11E, act 1173D)
    IF (check_mask > average_row_num .AND.
        allocated_mask != 0 .AND.
        configuring_mask = 0 .AND.
        ranging_mask = 0 .AND.
        ranging_tdm_mask = 0) (see FIG. 11E, act 1175)
        It passes all validation, release this sub-frame, ret_value ++ (see FIG. 11E, act
1176)
    ENDIF
    IF ret_value reach the needed_sub_frames (see FIG. 11E, act 1177)
        return ret_value
    ENDIF
ENDFOR (see FIG. 11E, act 1178)
```

Figure 12:
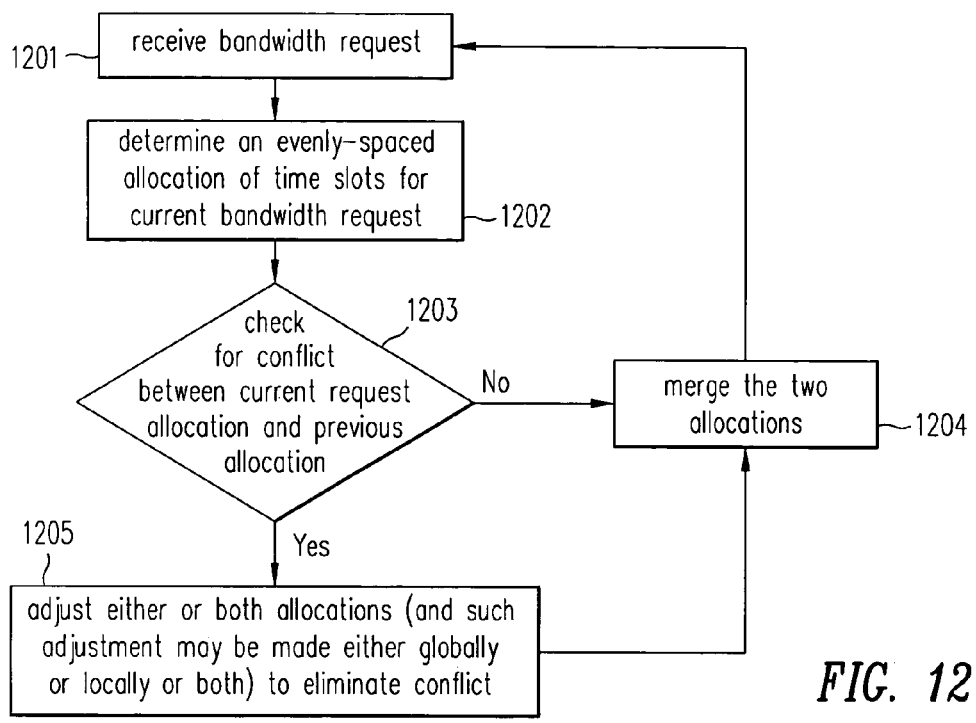
FIG. 12 illustrates, in a flow chart, acts performed in some embodiments to allocate bandwidth in response to a request.

In certain embodiments, on receipt of a bandwidth request, e.g. in act 1201 as illustrated in FIG. 12, the optical line terminal (OLT) determines (as per act 1202) an allocation of time slots for the request regardless of allocations that may have been already made in a superframe. Next, the optical line terminal (OLT) checks (as per act 1203) if there is a conflict in the just-made allocation (also called "current request allocation") for the current request and an allocation that is currently in use in the superframe (also called "previous allocation"). A conflict exists if the same time slot is allocated in both the current request allocation and in the previous allocation. In act 1203, if there is no conflict, the optical line terminal (OLT) merges the two allocations (as per act 1204), and uses the merged allocation for the next superframe. If there is a conflict in act 1203, then the optical line terminal (OLT) goes to act 1205 to make adjustments to either or both allocations.

Figure 13:
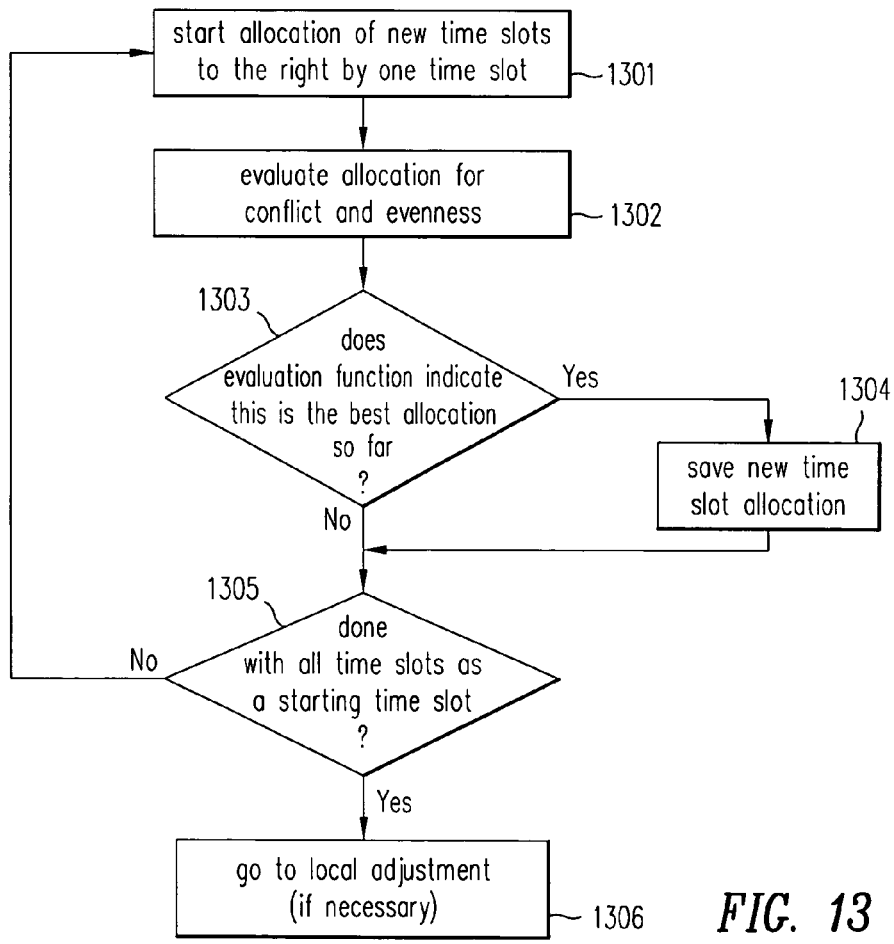
FIG. 13 illustrates, in a flow chart, a method for globally adjusting the allocations to eliminate conflict between a previous allocation and an allocation proposed in response to the request.
Figure 16:
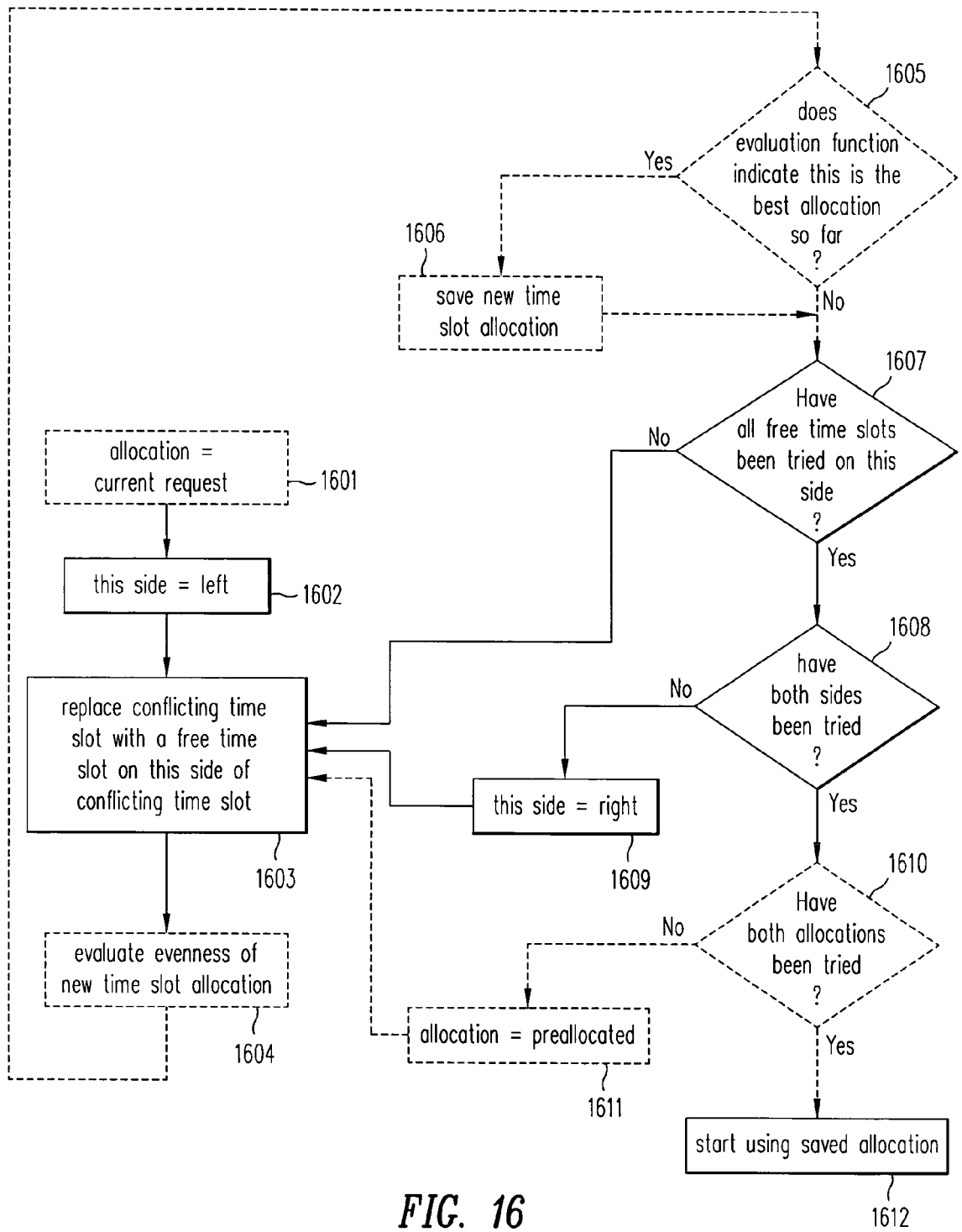
FIG. 16 illustrates, in a flow chart, a local adjustment mechanism for reducing or eliminating conflicts.

Such adjustments can be either global (meaning most of the time slot allocations are changed) as illustrated in FIG. 13 or local (meaning most of the time slot allocations are unchanged) as illustrated in FIG. 16 or both, as described next. These adjustments are made to eliminate conflicts in the two allocations, and at the same time avoiding any new conflicts that may arise from making the adjustments.

Specifically, in some embodiments, during global adjustment, a number of allocations for time slots are identified and evaluated. In some embodiments, one time slot allocation is obtained by starting with a time slot in the superframe that is same as the identity of the optical network unit (ONU) as the first time slot that is to be allocated for the current bandwidth request. In addition, additional allocations of time slots for the current bandwidth request are obtained by starting from a number of other time slots in the superframe. For example, it is possible to start the time slot allocation with another time slot that is to the right, as per act 1301, which results in another time slot allocation (which is simply the current time slot allocation shifted to the right by one column, and the last column to the right wraps around to the left of the superframe). Next, as per act 1302, this new allocation is evaluated for conflict. In the embodiment illustrated in FIG. 13, each allocation may be also evaluated for evenness by use of an evaluation function (discussed next), depending on the embodiment. Note that simpler embodiments may simply look for, and find a non-conflicting allocation, whereas more complex embodiments go farther by evaluating evenness and selecting an allocation that is most even.

A distance accumulation function may be computed in some embodiments as follows for one ONU. Suppose an ONU occupies N+1 slots in the bandwidth allocation bit map.

DA (Distance Accumulation)=$\Sigma di$, I=0, 1, . . . N
  di is the difference in indexes of each pair of adjacent slots [slot (i+1) and slot i] that are allocated to this ONU (e.g. if slot 10 and slot 1 are allocated to this ONU then a first difference d0 is 9).
AD (Average Distance)=DA/N
Distance Variation (DV)=$\Sigma |Idxi-(d0+AD*I)/N|$, I=0, 1, . . . N
  Idxi is the slot index for I's slot.

Figure 14:
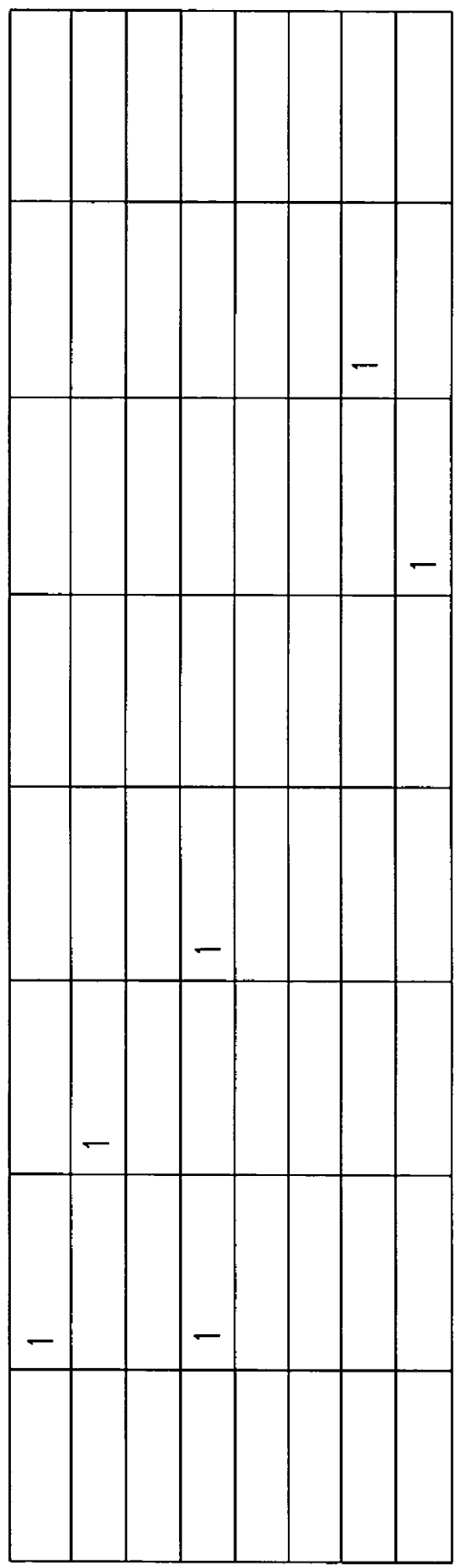
FIG. 14 illustrates one example of bandwidth allocation which is used in explaining an evaluation function of the type used in FIG. 13.

In one example illustrated in FIG. 14, a superframe has 64 time slots arranged in a 8×8 array, and the time slots to be allocated are marked with "1". The allocated slots' index for this ONU is {1, 10,25,27,54,61}. In this example, the distance accumulation for the ONU is calculated as follows.

$$DA=(10-1)+(25-10)+(27-25)+(54-27)+(61-54)+(64+1-61)=64$$

$$AD=DA/N=64/6=10.67 \text{ because } N=6$$

$$DV=\{|1-1|+|10.67-10|+|25-10*2|+|27-10*3|+|54-10*4|+|61-10*5|\}/6=5.6$$

In the above example, the value of d0 is 0, although d0 can be 1, 2, 3, ... (MAX_ROW*MAX_COL-1). Moreover, DV represents the average "variation from the evenly allocated slot" of each slot.

Next, an evaluation function that is designed to give a numerical evaluation about how well the bandwidth allocation method works may be computed in some embodiments as follows. Suppose there are M number of ONUs in a PON system, and each ONU has its DV determined as discussed above. Then the evaluation function for an allocation of time slots to the ONL is computed as follows:

$$\psi = \Sigma DV_j, j=0, 1 \quad (M-1)$$

Depending on the embodiment, other evaluation functions may be used. For example, in some embodiments, each of the time slots belongs to a class which one of a number of classes of services, and the evaluation function is based on the class. In one such example, an ONU needs 10 slots of bandwidth as follows: 2 slots for "constant bit rate service", and 8 slots for best effort service, and another ONU needs 10 slots of bandwidth as follows: 1 slot for "constant bit rate servcie", and 9 slots for best effort service. Even though these two ONUs require the same amount of bandwidth, the first ONU needs more evenly spaced allocation then the second ONU. So in some embodiments, the evaluation function gives the first ONU bigger weight. An example of a modified evaluation function is:

Evaluation Function =Total of $(W_j DV_j)$, j=0, 1, ... (M-1) where $W_j$ is the weight giving to each ONU.

Note that although some examples have been provided of the evaluation function, other embodiments may use other examples, e.g. to accommodate other factors present in a passive optical network.

Referring back to FIG. 13, in act 1303 the OLT determines if the value obtained from evaluation is the best so far, and if so, saves the current time slot allocation for future use (as per act 1304). In both cases, the OLT next goes to act 1305 to check if it has tried all time slots that can serve as a starting point for bandwidth allocation for the current request, and if not returns to act 1301 (described above). If global adjustment has been completed (by trying all possible time slots), the OLT may perform local adjustment if a conflict still remains (as per act 1306).

Figure 15A:
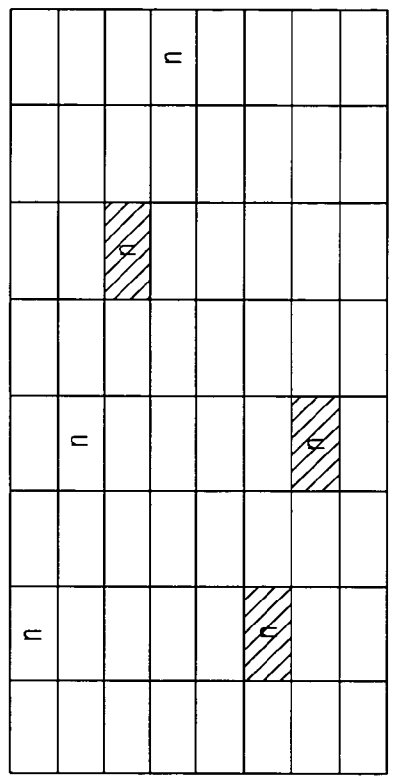
FIGS. 15A–15D illustrate, in one example, operation of a global adjustment mechanism of the type illustrated in FIG. 13.
Figure 15C:
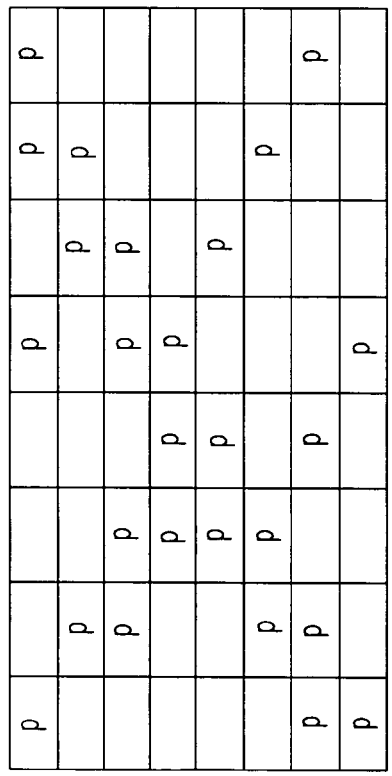
Figure 15B:
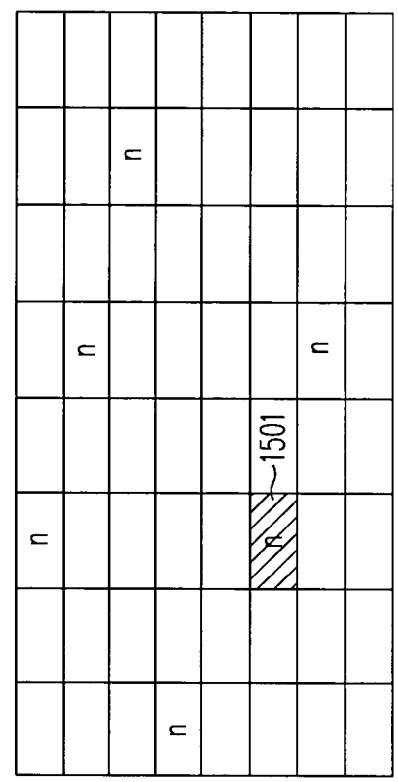

An illustration of the just-described global adjustment mechanism is shown by way of an example of the 8×8 superframe in FIGS. 15A–5D, wherein FIG. 15A represents a previous allocation that is currently being used in a superframe, and FIG. 15B represents a new allocation that is proposed for the current request. In the example illustrated in FIG. 15B, a new allocation (e.g. of 6 time slots across a 64 time slot superframe) is started with a time slot that is selected based on the identity of the ONU that generated the current request, e.g. if the first ONU, namely ONU_1 has originated the current request, then the very first time slot in the superframe is selected as the starting time slot (so that if ONU_I had originated the current request, then time slot I would have been the starting time slot).

Figure 15D:
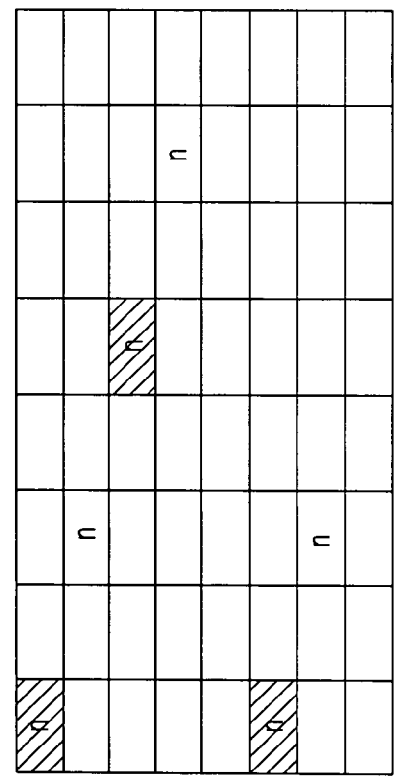

To provide an even distribution of six time slots across a superframe of 64 time slots requires that every $10^{th}$ time slot be allocated for the current request (i.e. there are 9 intervening time slots between any two time slots that are allocated). The new allocation (FIG. 15B) would cause three conflicts with time slots that are previously allocated (FIG. 15A), and therefore the new allocation cannot be used without adjustment. An adjustment can be made either in the previous allocation of FIG. 15A or in the new allocation of FIG. 15B depending on the embodiment. In some embodiments that implement the flow chart of FIG. 13, as noted above, the adjustment is made on the new allocation as follows: the new allocation is started in a timeslot to the right of the starting time slot. In the example of FIG. 15B, an alternative new allocation is started with the second time slot of the superframe (as illustrated in FIG. 15C), and if there is a conflict yet another new allocation is started in the third time slot (as illustrated in FIG. 15D). It is seen that in the third new allocation (illustrated in FIG. 15D) there is only one conflict. In this manner, the global adjustment mechanism creates a number of new allocations (FIGS. 15B–15D), and then selects from among them an allocation that has the least number of conflicts (preferably no conflicts).

In creating such new allocations, a global adjustment mechanism of some embodiments starts with a different time slot each time, and depending on the embodiment, it may create a new allocation with each time slot in the entire superframe (e.g. by wrapping around at the end of the superframe if going only towards the right of the current time slot in picking a starting slot for the next new allocation). Therefore, some embodiments may generate as many new allocations as the number of time slots in the superframe. Alternatively, in other embodiments, a global adjustment mechanism may start with only time slots that are known to be empty. Moreover, in some embodiments, the global adjustment mechanism may create a number of new allocations by alternately starting with a slot on the right and a slot on the left. Many such embodiments will be apparent to the skilled artisan in view of this disclosure.

After global adjustment, some embodiments make a local adjustment as follows either to eliminate one or more conflicts that remain in the new allocation or to improve evenness of the new allocation. Note that other embodiments may not make a local adjustment at all, or may make a different local adjustment than those described herein.

Figure 17A:
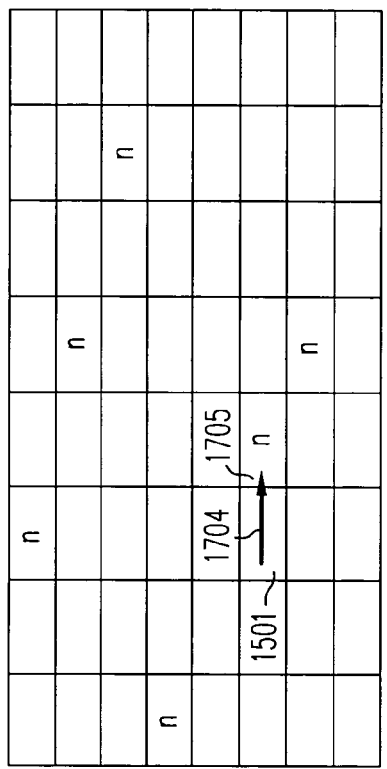
FIGS. 17A–17D illustrate, in one example, operation of a local adjustment mechanism of the type illustrated in FIG. 16.
Figure 17B:
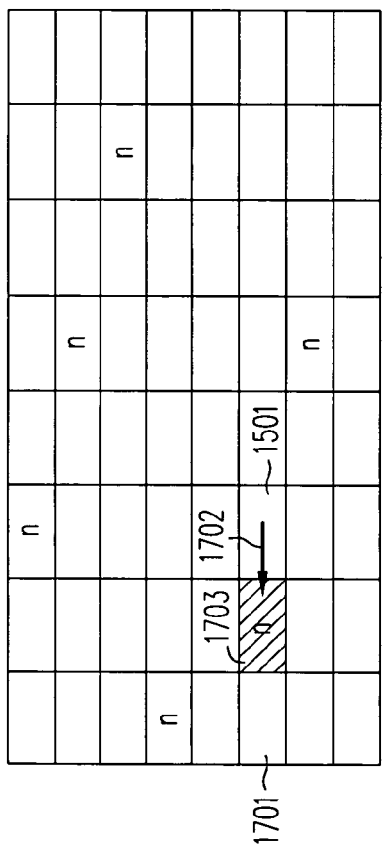

In certain embodiments, a conflicted slot 1501 (FIG. 15D) in a new allocation that is proposed for the current request is initially moved to the left as per act 1602 (FIG. 16) and moved to the right (as per act 1609) in an attempt to avoid conflict, to find an empty slot anywhere in the entire superframe. Therefore, a conflicted time slot 1501 (FIG. 17A) may be replaced (as per act 1603) with a time slot 1703 by moving in the left direction 1702. In this particular example, slot 1703 is also conflicted, and therefore the new allocation is no better (both allocations have one conflicted slot). Depending on the embodiment, the local adjustment mechanism may next either try another slot 1701 that is further away but in the same left direction 1702, or alternatively try a slot 1705 which is located to the right in the direction 1704 (FIG. 17B). In this example, slot 1705 is not conflicted, and therefore, one embodiment of the local adjustment mechanism stops at this stage because a new allocation without conflict has been found.

In some embodiments, a possible slot substitutions in the entire superframe are tried. For example, all slots to the left of the conflicted slot may be tried up to the beginning of the superframe (i.e. the very first slot) as illustrated by act 1607

(which may be performed immediately after the slot replacement act 1603), followed by trying all slots to the right of the conflicted slot up to the end of the superframe as illustrated by acts 1608 and 1609. In this manner, if there is any slot in the entire superframe that does not cause a conflict, that slot is found. In an alternative embodiment, instead of stopping at the boundary of the superframe, the search may simply wrap around the superframe boundary, e.g. if the search is in the left direction then on reaching the start of the superframe (the very first slot), the search continues in the left direction from the end of the superframe (the very last slot) until the conflicted slot is reached. Moreover, in another alternative embodiment, instead of searching in the left and/or right directions, the search is performed in the up and/or down directions, in a similar manner.

Figure 17C:
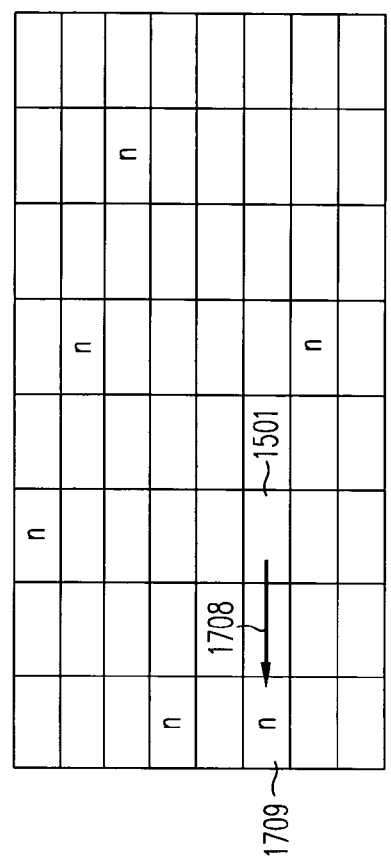
Figure 17D:
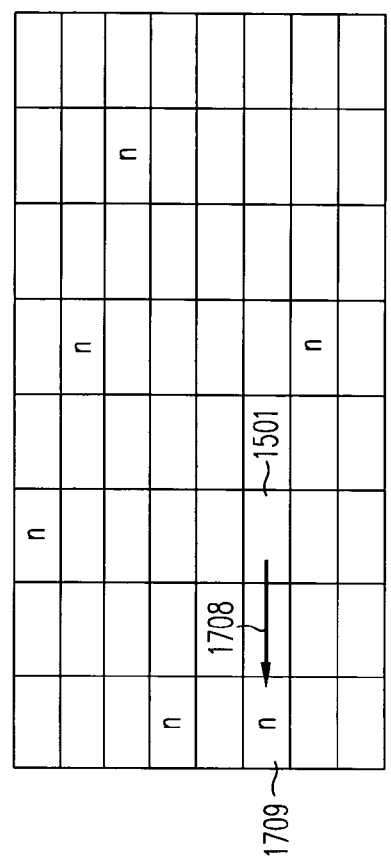

Moreover, in complex embodiments, instead of stopping on finding a non-conflicting slot, the search is continued to find a number of non-conflicting slots (e.g. slots 1705, 1707 and 1708 in FIGS. 17B, 17C and 17D), and each allocation resulting from use of the non-conflicting slots is evaluated. For example, an evaluation function is used (of the type described above) to determine the evenness of each of the new slot allocations. In such embodiments, a new allocation obtained by replacing a conflicting slot (as per act 1603) may be evaluated (as per act 1604), and the evaluation function is checked to see if the result is the best so far (as per act 1605), and if so the new allocation and the result of the evaluation function are both saved (as per act 1606) for future use. Next, in act 1607 even a complex version of the local adjustment mechanism may check if all free time slots have been tried on this side (e.g. all free time slots in the superframe (regardless of row boundaries) that are on the right side of the conflicted slot are tried for substitution one at a time, and each such new allocation is evaluated for evenness). If not, then the conflicted slot is replaced with the next free slot (as per act 1603), and the resulting allocation is again evaluated (as per act 1604), and if better it is saved (as per act 1606).

In this manner, all free slots to the right side of a conflicted slot 1501 are evaluated in the embodiment illustrated in FIG. 16, to find the best allocation (on the right side). After all slots on the right have been tried, then the side is changed to the left side (as per act 1609), and the above-described process is repeated on the left side of the conflicted slot 1501, e.g. by returning to act 1603. When all slots on both sides of the conflicted slot have been tried (as per act 1608), the saved allocation represents the best allocation possible (assuming there is at least one free slot to which the conflicted slot can be moved), and therefore the saved allocation is used (i.e. act 1613 is performed if the answer is "yes" in act 1608).

If there is no free slot at all available in the entire superframe, then there is no need to perform local adjustment of the type illustrated in FIG. 16, and a test to confirm the existence of free slots may be performed before invoking the local adjustment mechanism. In some embodiments, a more exhaustive search may be performed, e.g. by performing local adjustment on multiple allocations, e.g. on one or more new allocations that may be obtained from global adjustment and/or on the previous allocation. For example, an optional act 1610 may be performed after act 1608 to check if a local adjustment had been performed on the previous allocation and if not, then as per optional act 1611, the local adjustment is performed in the manner described above.

Certain embodiments of the invention may be implemented as illustrated in the following pseudo-code.

```
Memory (addressed by Data Structures):
  int bw_req[MAX_ONU]; /* ONU i needs bw_req[i] number of
  slots */
  int num_onu;
  int bit_map[MAX_ROW*MAX_COL]; /* Each slot is 1 unit of
  bandwidth slice. */
  int bit_map_temp[MAX_ROW*MAX_COL];
  int bit_map_select[MAX_ROW*MAX_COL];
Logic for Bandwidth Allocation Method:
void alloc_bit_map( ) {
  int i,j,k,m,n;
  int distance;
  /* init all bits to be 0, i.e. valid */
  init_bw_map( );
  /* sort the bandwidth requirement for each ONU in descending
  order */
  sort_bw_req( );      [as illustrated in FIG. 12 by act 1201]
  for (i = 0; i < num_onu;i++) {
    /* allocate slots for ONU i in the exising bit map */
    min_conflicts = MAX_CONFLICTS;
    for (j = 0; j < MAX_ROW*MAX_COL;j++) {
      /* Init the temporary bit map */
      for (k = 0; k < MAX_ROW*MAX_COL;k++) {
        bit_map_temp[k] = 0;
      }
      /* Create a temporary bit map for ONU i, with slots
       * evenly distributed for ONU i.
       * The first slot starts with j,
       * slot distance is (MAX_ROW*MAX_COL)/bw_req[i].
       */
      distance = (MAX_ROW*MAX_COL)/bw_req[i];
      for (k = 0; k < bw_req[i]; k++) { [as illustrated in
      FIG. 12 by act 1202]
        bit_map_temp[j+k*distance] = 1;
      }
      /* Compare this temporary bit map for ONU i with
       * existing bit_map for onu (0,.. i-1).
       * Count the number of conflicts slot.
       */
      conflicts = 0;
      for (k = 0; k < MAX_ROW*MAX_COL;k++) {
        if ((bit_map[k] == 1) && (bit_map_temp[i] == 1)) {
          conflicts ++;     [as illustrated in FIG. 12 by act 1203]
        }
      }
      if (conflicts < min_conflicts) {
        /* remember this temporary bit map */
        copy_bit_map( );
        min_conflicts = conflicts;
      }
    }
    /* Merge the existing bit map with select bit map for ONU i
     * Resolve the conflicts by relocating the conflicted
     * slot to next available slot in existing bit map.
     */
    merge_bit_map( ); [as illustrated in FIG. 12 by acts 1204
    and 1205]
  }
}
void copy_bit_map( )
{
  int i;
  for (i = 0; i < MAX_ROW*MAX_COL;i++) {
    bit_map_select[i] = bit_map_temp[i];
  }
}
void merge_bit_map( )
{
  int i;
  for (i = 0; i < MAX_ROW*MAX_COL;i++) {
    /* skip slot that is not allocated in the bit_map_select */
    if (bit_map_select[i] == 0) {
      continue;
    }
    /* if the slot is not used yet in bit_map, mark it as used */
    if (bit_map[i] == 0) {
      bit_map[i] = 1;
      continue; [as illustrated in FIG. 12 by act 1204]
    }
```

```
        /* if the slot is used in bit_map, try to resolve conflicts by
         * adjustment
         */
        adjust(i); [as illustrated in FIG. 12 by act 1205]
      }
    }
    void adjust(pos)
    {
      /* do adjust_temp if we only adjust bit_map_select */
      if (adjust_select_flag) {
         adjust_select(pos);
      } else {
         /* adjust global bit_map */
         adjust_global(pos);
      }
      /* or better yet, do both adjust_select and adjust_global, use
       * evaluation function to decide which one is better.
       */
      adjust_select_and_global(pos); [as illustrated in FIG. 13 by acts
    1302 and 1303]
    }
    void adjust_select(int pos)
    {
      int new_pos,shift_num = 1; [refer 1301]
      boolean finish = FALSE;
      /* adjustment will always be successful, as we assume after
      maximum
    MAX_ROW*MAX_COL search,
       * there is always available slot in bit_map */
      while (!finish) { [as illustrated in FIG. 13 by act 1305]
         /* left shift */
         new_pos = left_shift(pos,shift_num);
         if (bit_map[new_pos] == 0) {
           finish = TRUE;
           /* assign the slot at left side to the onu */
           bit_map[new_pos] = 1;
           /* adjust bit map for this onu */
           bit_map_select[pos] = 0;
           bit_map_select[new_pos] = 1; [as illustrated in FIG. 13 by
    act 1304]
           break;
         }
         /* right shift */
         new_pos = right_shift(pos,shift_num);
         if (bit_map[new_pos] == 0) {
           finish = TRUE;
           /* assign the slot at right side to the onu */
           bit_map[new_pos] = 1;
           /* adjust bit map for this onu */
           bit_map_select[pos] = 0;
           bit_map_select[new_pos] = 1; [as illustrated in FIG. 13 by
    act 1304]
           break;
         }
         /* need to shift more */
         shift_num ++;
      }
    }
    void adjust_global(int pos)
    {
      int new_pos,shift_num = 1;
      boolean finish = FALSE;
      /* adjustment will always be successful, as we assume after
      maximum
    MAX_ROW*MAX_COL search,
       * there is always available slot in bit_map */
      while (!finish) { [as illustrated in FIG. 16 by acts 1608 and 1610]
         /* left shift */ [as illustrated in FIG. 16 by acts 1601 and 1602]
         new_pos = left_shift(pos,shift_num);
         if (bit_map[new_pos] == 0) {
           finish = TRUE;
           /* assign the slot at left side to the previous onu */
           bit_map[new_pos] = 1;
           /* notify the previous onu that uses slot pos to move to
           new_pos */
           adjust_previous_onu(pos,new_pos); [as illustrated in
    FIG. 16 by act 1603]
           break;
         }
         /* right shift */
         new_pos = right_shift(pos,shift_num); [as illustrated in
    FIG. 16 by act 1609]
         if (bit_map[new_pos] == 0) {
           finish = TRUE;
           /* assign the slot at right side to the previous onu */
           bit_map[new_pos] = 1;
           /* notify the previous onu that uses slot pos to move to
           new_pos */
           adjust_previous_onu(pos,new_pos);
           break;
         }
         /* need to shift more */
         shift_num ++; [as illustrated in FIG. 12 by act 1607]
      }
    }
    /* shift left b slot from a position.
     * if b is bigger than a, then wrap around to the end */
    int left_shift(a,b)
    {
      if (b <= a) {
         return (a−b);
      } else {
         return (MAX_ROW*MAX_COL —(b−a));
      }
    }
    /* shift right b slot from a position.
     * wrap around if exceed the end */
    int right_shift(a,b)
    {
      if ((a+b) < MAX_ROW*MAX_COL) {
         return (a+b);
      } else {
         return (a+b−MAX_ROW*MAX_COL);
      }
    }
    void init_bw_map( ) {
     int i;
     for (i = 0; i < MAX_ROW*MAX_COL;i++) {
        bit_map[i] = 0;
     }
    }
    void sort_bw_req( ) {
     int i,j;
     int bw_req_temp[MAX_ONU];
     int ith_biggest = 0;
     int ith_biggest_idx = 0;
     /* copy bw_req to bw_req_temp */
     for (i = 0; i < MAX_ONU; i++) {
        bw_req_temp[i] = bit_req[i];
        /* init the bw_req to be all zero */
        bw_req[i] = 0;
     }
     /* sort the bandwidth request in descending order */
     for (i = 0; i < MAX_ONU; i++) {
        /* choose the ith biggest one */
        ith_biggest = 0;
        ith_biggest_idx = 0;
        for (j = 0; j < MAX_ONU; j++) {
          if (bw_req_temp[j] > ith_biggest) {
            ith_biggest = bw_req_temp[j];
            ith_biggest_idx = j;
          }
        }
        /* pick the ith biggest to the bw_req array */
        bw_req[i] = bw_req[ith_biggest_idx];
        /* fill the ith biggest to be 0, because it's been choosen
        already */
        bw_req[ith_biggest_idx] = 0;
     }
    }
```

Numerous modifications and adaptations of the embodiments, illustrations and examples described herein will be apparent to the skilled artisan in view of the disclosure.

For example, in some embodiments, a network unit NU that is allocated certain time slots (e.g. time slots 411A–411I in FIG. 4A) uses them indefinitely, in each of a number of successive superframes, until one or more of these time slots are deallocated (i.e. freed up), typically only in response to an indication from the network unit NU.

Alternatively, in other embodiments, allocation of time slots in the manner described above may be performed dynamically, e.g. only for S superframes wherein S is a small number, such as 10, after which time another bandwidth request must be generated by network unit NU. In response, the same time slots or other time slots may be allocated, depending on the current traffic and available time slots. Such a quasi-static method reduces the likelihood that one or more network units will monopolize the use of time slots while other network units are indefinitely kept waiting for bandwidth to be freed up.

Moreover, any of the above-described embodiments may be used as is, or with minor modifications, in the dynamic allocation of slots in a superframe, depending on the speed with which such allocation can be done and the length of the superframe. For example, requests from network units that are received in a current superframe may be granted in the next superframe, if the superframe is long enough and if the round trip delay is small enough. In such a case, slots may be dynamically allocated, i.e. the allocation may change in every superframe.

Note that instead of just one ONU using two time slots for ranging in each frame, two (or more) ONUs may take turns at using these same two time slots for ranging (in alternate superframes). Moreover, in other embodiments, two or more successive subframes near any predetermined contour relative to the superframe (which may not be in a diagonal direction) may be allocated for ranging.

Furthermore, although described in terms of an Ethernet Passive Optical Network (EPON), methods and structures of the type described herein can be used to allocate bandwidth in other types of networks. For example, if a number of ATM cells are grouped and transmitted in a passive optical network (PON), then bandwidth in such a network may be allocated in the manner described herein. Moreover, methods and structures of the type described herein may be used in some embodiments that are based on networks other than PONs.

Also, although in some embodiments the columns of a superframe are visited consecutively one after another in allocation of time slots in response to a bandwidth request as described above in reference to FIGS. 6 and 8, other embodiments may use other schemes. For example, certain embodiments may make non-adjacent two or more time slots that are allocated in the same frame, e.g. by visiting every other column instead of adjacent columns (so that after all time slots in column 601 are allocated, one such embodiment skips column 602 and goes to column 603 to allocate additional time slots, if required by a bandwidth request).

Furthermore, although the allocation of bandwidth is stored in bitmaps in some embodiments, other data structures may be used. For example, an array or linked list of one byte for each time slot in a superframe may be used, and alternatively the allocation may be encoded by use of a function (e.g. a compression function) if the allocation is mostly empty (which depends on the specific neighborhood in which the passive optical network is implemented).

Moreover, although certain acts are described above in a certain sequence for some embodiments, other embodiments may perform the same acts in a different sequence and may omit some of these acts or perform other acts instead. Note also that allocation bitmaps that are merged may be selected based on a number of different conflict resolution methods which may be used to minimize the value obtained during evaluation.

Furthermore, previously allocated bitmaps may also be adjusted depending on the embodiment (e.g. the global adjustment may be performed on the new allocation and local adjustment on the previous allocation). As would be apparent to the skilled artisan, if a previous allocation is in fact changed, that change needs to be communicated to and implemented by the ONU that is impacted by the change.

Numerous such modifications and adaptations of the embodiments described herein are encompassed by the attached claims.

The descriptions in following addendums A and B refer to certain specific embodiments, and these descriptions are meant to be illustrative of the invention. Moreover, various embodiments of the type described herein can be used as described in addendum C. Furthermore, in some embodiments, link level operation, administration, management and provisioning (OAMP) are performed as described in Addendum D for transfer of information related to bandwidth allocation.

Addendum A

In certain embodiments, since multiple ONUs attached to a single OLC use the shared media (single fiber between PON splitter and OLC) to transmit data in the upstream direction, time-division multiplexing method is used to assign one or more specified time-slots for each ONU to transmit data in order to avoid possible up stream transmission interference from one another. The upstream PON bandwidth allocation scheme and operation are introduced to assign the time-slots (sub-frames) to the ONU based on the bandwidth allocation request. The bandwidth allocation to the ONUs consists of static and dynamic allocations. The static bandwidth is guaranteed bandwidth and it is allocated via provisioning (setting the up_bw attribute on the ONU).

The PON up stream super frame format consists of N*N sub-frames. The data portion of each sub-frame of the upstream super frame can be divided into two categories. The sub-frames in the first category are assigned to the particular ONUs based on the ranging considerations. The sub-frames in the second category are assigned dynamically to any ONU based on the bandwidth allocation request. Once the amount of the bandwidth assigned to an ONU has been decided, the bandwidth allocation scheme calculates how many sub-frames are need for the request, and assigns the sub-frames as evenly as possible over the upstream super frame. In doing so, such embodiments reduce the chance of buffer overflow of an ONU and have a lower delay variation in transmission.

Figure 18:
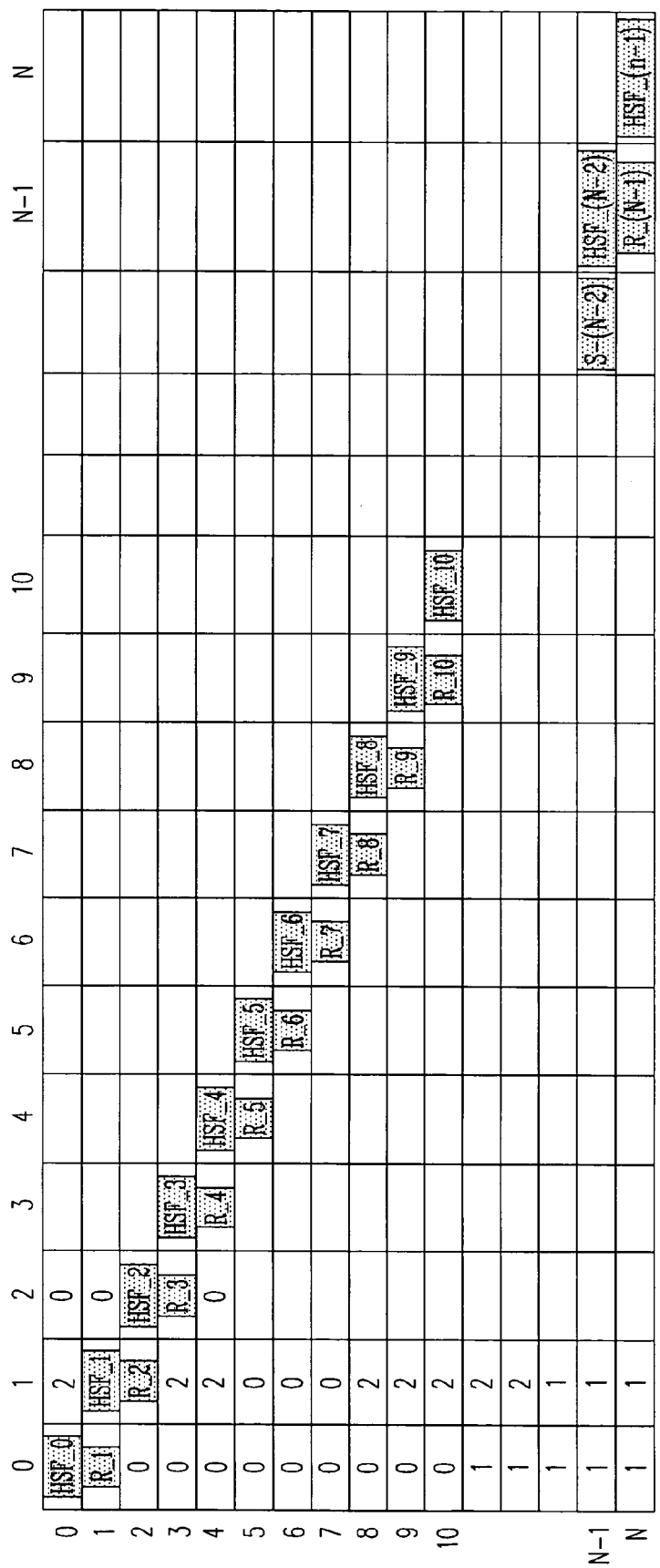
FIG. 18 illustrates one specific example of allocation of subframes, starting with the left column and proceeding towards the right as illustrated in FIG. 9.

FIG. 18 shows a bandwidth allocation example for 3 ONUs assuming 1:N split ratio is support for the PON. The general bandwidth allocation rule in some embodiments is to allocate the sub-frames column by column in left to right fashion. For a column, the sub-frame is allocated from the top to the bottom. When all the sub-frames in the previous column are fully allocated, the sub-frame in the next column is allocated in the top to the bottom fashion. The bandwidth allocation requests from each ONU are teated as equal and processed on first come first serve basis.

When the ith ONU, namely ONU_i is provisioned and has been ranged, the HFS_i is assigned to the ONU_i to transmit the ranging and other management information. Therefore, the ith header subframe (HFS) is dedicated to ONU_i and is not assigned by the bandwidth allocation scheme. The first sub-frame to be assigned to ONU_i is R_i (i!=0) which is the sub-frame in the ith row and the (i-1)th column in the super frame structure. The reason for this consideration is that both R_i and HSF_i are used by ONU_i for its initial ranging process and they must be assigned to the same ONU. The sub-frame R_i is not assigned to other ONUs. After the R_i subframe has been fully allocated, the additional bandwidth allocation will follow the general bandwidth allocation rule. The initial ranging process for ONU_0 uses the HSF_15 (R_0 in a sense) and HSF_0. This consideration requires that each ONU be ranged in every other super frame in such embodiments. The ONUs with even numbers are ranged in one super frame and the ONUs with odd numbers are ranged in another super frame. Since there is no R_0, the bandwidth allocation for ONU_0 starts with the general bandwidth allocation rule.

A whole sub-frame may be assigned only to one ONU for data transmission in many embodiments of the invention. If bandwidth to sub-frame calculation requires a partial sub-frame (say 40% of the sub-frame) to be allocated to an ONU, the whole sub-frame is assigned to the ONU for data transmission. The bandwidth allocation method keeps track of the unused portion of the sub-frame (60% of the sub-frame) and counts this portion for the next bandwidth allocation to the same ONU. In the bandwidth release operation, the bandwidth allocation scheme calculates how many sub-frames need to be released based on the request. The sub-frame(s), which have been allocated last for an ONU, are released first. If the last allocated sub-frame is a partially allocated sub-frame, the released bandwidth only counts the used portion even if the whole sub-frame needs to be released. The OLC is responsible for assigning the PON bandwidth to individual ONUs. It keeps the master copy of the PON bandwidth usage and one copy each for each provisioned ONU for the bandwidth allocated for that ONU.

When a bandwidth allocation request for an ONU has been received, the bandwidth management scheme checks whether the unused PON bandwidth will be enough to accommodate the request. If there is not enough PON bandwidth, the allocation request is rejected. Otherwise, the bandwidth allocation scheme calculates how many sub-frames are need for the request and assign the sub-frame to particular locations within the upstream super-frame. The message carries the information of the newly allocated sub-frames sent to the ONU via a Link Operation Administration Management (OAM) message. If the ONU replies with confirmation, the OLC updates the master copy of PON bandwidth usage and the bandwidth usage for that particular ONU. The ONU sends data according to the new up stream bandwidth allocated to it. If ONU replies with rejection, the OLC does not update the master copy of PON bandwidth usage and the bandwidth usage for that particular ONU. The bandwidth allocation failure is reported.

When a bandwidth release request for an ONU has been received, the bandwidth allocation scheme calculates how many sub-frames are needed to be released and locates them in the upstream super-frame. The message carries the information of the newly released sub-frames to the ONU via a Link OAM message. If the ONU replies with confirmation, the OLC updates the master copy of PON bandwidth usage and the bandwidth usage for that particular ONU. If ONU replies with a rejection, the OLC does not update the master copy of PON bandwidth usage and the bandwidth usage for that particular ONU. A bandwidth release failure is reported.

Addendum B

Some embodiments are related to Ethernet Passive Optical Network(EPON), QoS and SLA. Such embodiments may discover the traffic behavior of an EPON using TDMA based bandwidth allocation for upstream transmission of data to an OLT. Some rules for bandwidth allocation and a method are proposed for such embodiments to solve inherent problems caused by random allocation method. Random allocation method of PON uplink bandwidth bit map in burst mode cause problems including long delay, big jitter, big packet drop rate, low uplink bandwidth utilization and uneven dramatic change of packet queue size.

Several embodiments (1) discover the user traffic behavior of EPON ONUs under burst transmission mode, (2) show the worst case scenarios of traffic characteristic under randomly allocated burst bit pattern, and (3) propose rules and methods for burst mode bandwidth bit pattern allocation.

Figure 19:
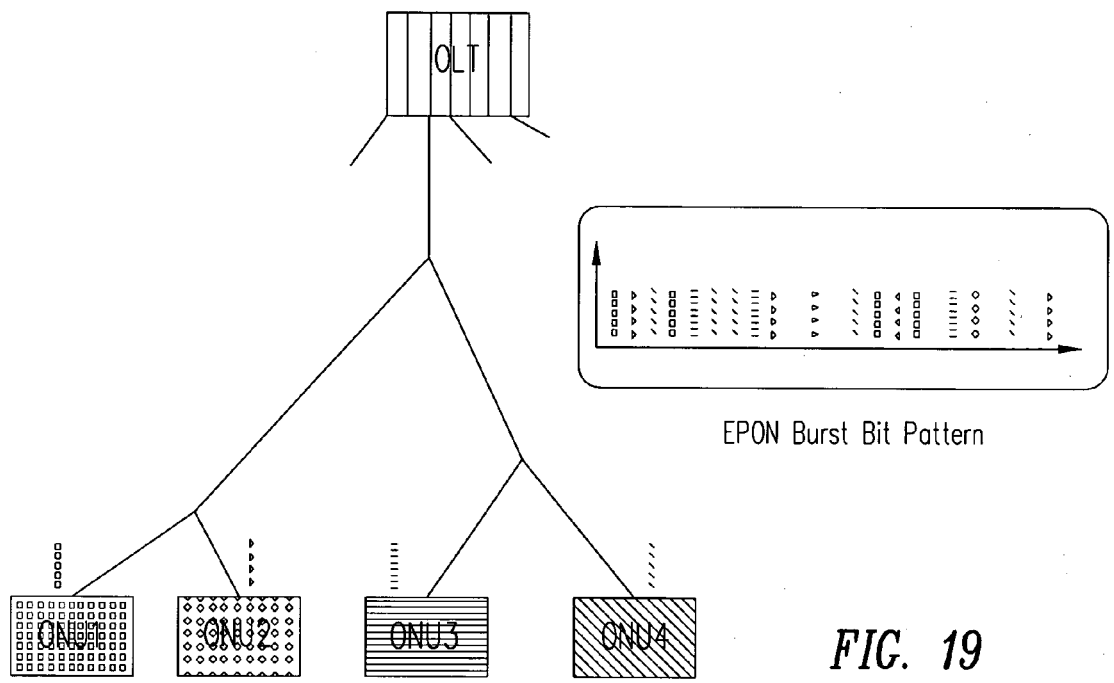
FIG. 19 shows EPON upstream using TDMA bandwidth allocation in some embodiments.

FIG. 19 shows EPON upstream using TDMA bandwidth allocation. A burst bit pattern is used by the EPON hardware to control the emission of the uplink for ONUs.

Figure 20:
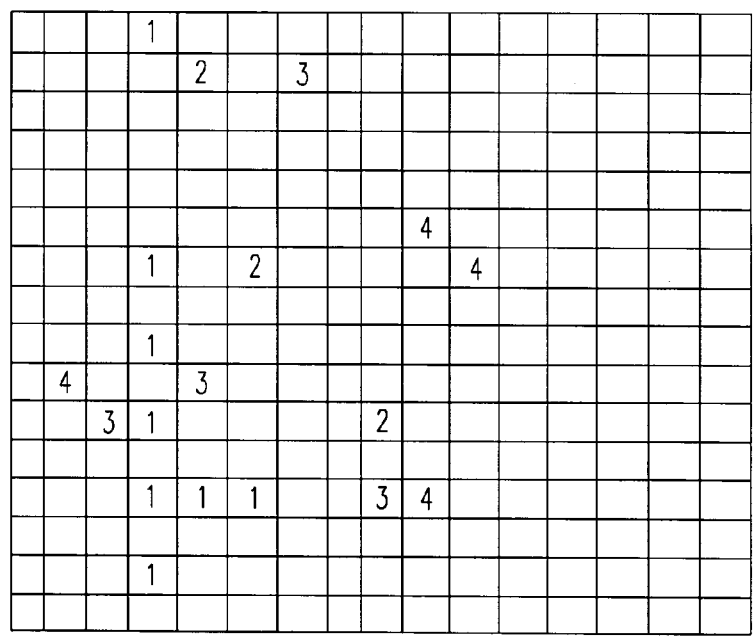
FIG. 20 shows a bit pattern with 4 ONUs. ONU1 subscribes 32 Mbps using 8 time slots, ONU2 subscribes 12 Mbps using 3 time slots, ONU3 and ONU4 subscribe 16 Mbps by occupying 4 time slots respectively.

FIG. 20 shows a bit pattern with 4 ONUs. ONU 1 subscribes 32 Mbps using 8 time slots, ONU 2 subscribes 12 Mbps using 3 time slots, ONU 3 and ONU 4 subscribe 16 Mbps by occupying 4 time slots respectively.

Figure 21:
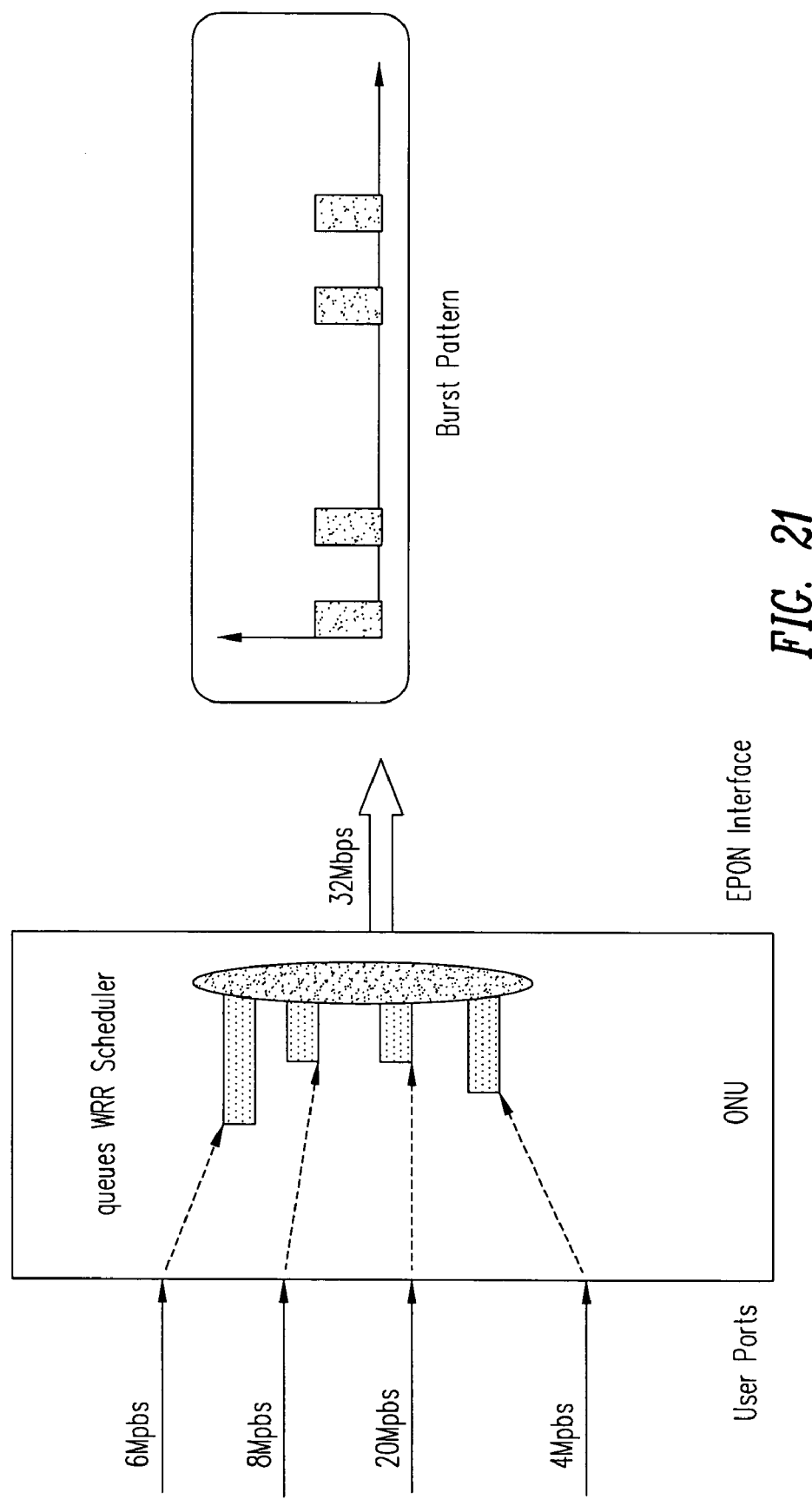
FIG. 21 shows EPONs "stop and go" burst transmission mode of one ONU.

FIG. 21 shows EPONs "stop and go" burst transmission mode of one ONU. Users' packets would be queued at the egress EPON interface. Normally Weighted Round Robin (WRR) scheduler at the EPON interface is used to schedule the queues when the burst turns on. After one time slot, EPON transmission turns off. While users packets still keep coming in, they are buffered in the queue to wait for the next burst time slot.

The following problems could rise under the above unevenly distributed burst pattern:

(1) Long Delay—Too far away slots results in long queues and long delay.

(2) High Drop Rate—Since delays are too long between some slots, queues buffer could overflow and packets drop rate will be high.

(3) Low Utilization of PON Bandwidth—Too close slots results in the problem that there may not be enough packets accumulated in the queues. The queues could under-run in short time period and PON bandwidth is wasted.

(4) Big Jitter—Unevenly distributed burst slot bit map results in non-consistent delay, thus big jitters.

(5) Uneven Queue Size—It would be difficult to setup the queue size for each flow to do any type of admission control, traffic policy and traffic shaping, because the uplink traffic output behavior is irregular.

Such problems are minimized or even avoided in some embodiments by use of a bandwidth allocation method of the type described herein.

Addendum C

Some embodiments of the type described above can be used to implement a bandwidth allocation mechanism in Ethernet PON that is on demand. It is one type of dynamic bandwidth allocation methods that is adaptive to real time traffic. The advantages include maximization of PON bandwidth utilization, improvement of traffic characteristics, and enabler of deployment of more flexible, value added service models such as self provisioning and usage based service level agreement (SLA). The following description provides a view about ways to achieve the just-described goal. It depicts the scenario of usages, identifies the elements for standardization, works out proposal for relevant mechanisms and algorithms.

Figure 22:
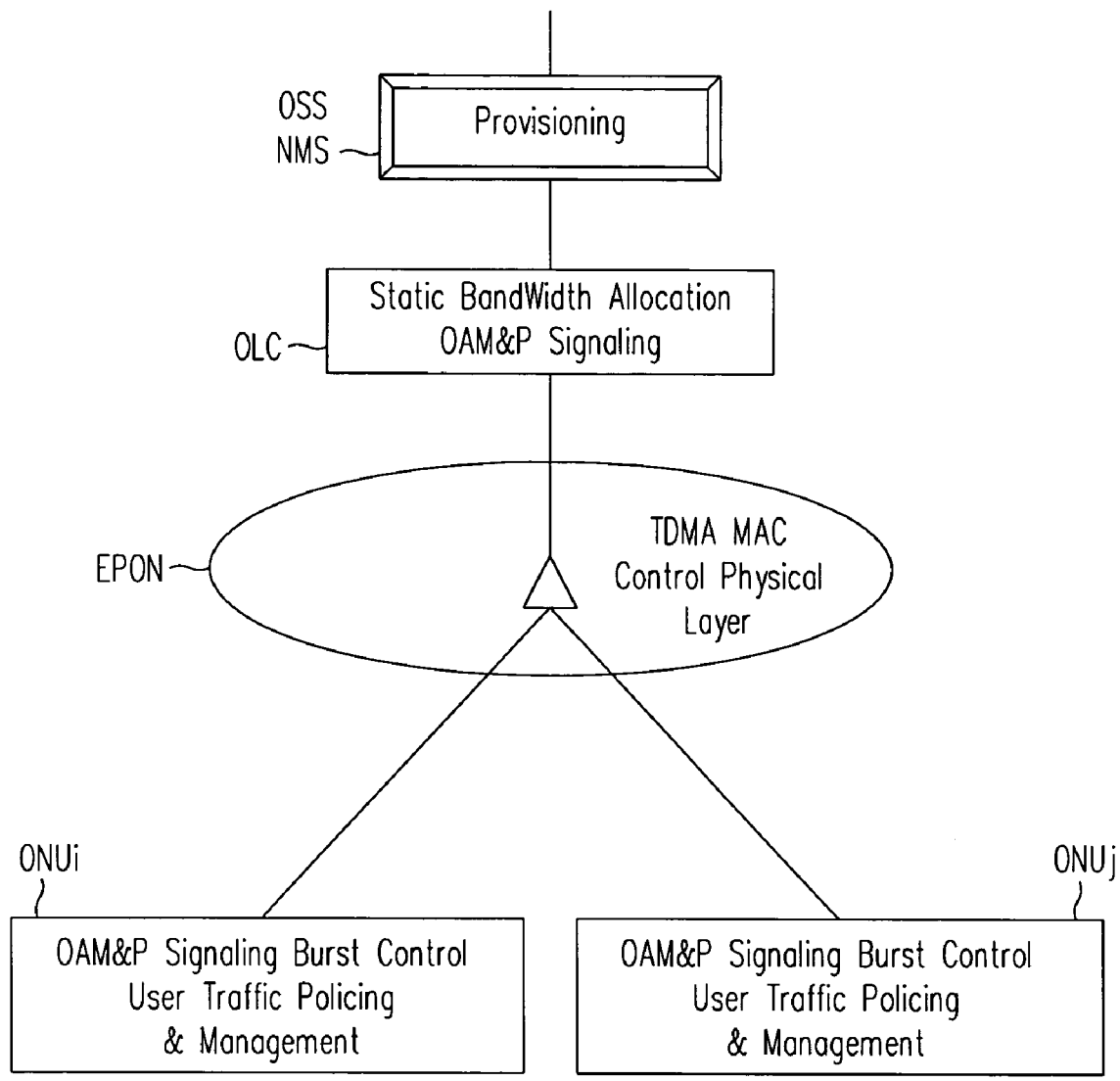
FIGS. 22–27 illustrate use of methods of the type described herein in an Ethernet PON.

FIG. 22 shows the static bandwidth allocation method in EPON. OSS/NMS provisioning systems instruct the OLC about the subscriber information and system parameters such as oversubscribe ratio, drop rate, etc.OLC works out the bandwidth allocation then distributes the allocation bit map to ONUs. Change to bandwidth allocation is through provisioning system in the timescale of hours.

Figure 23:
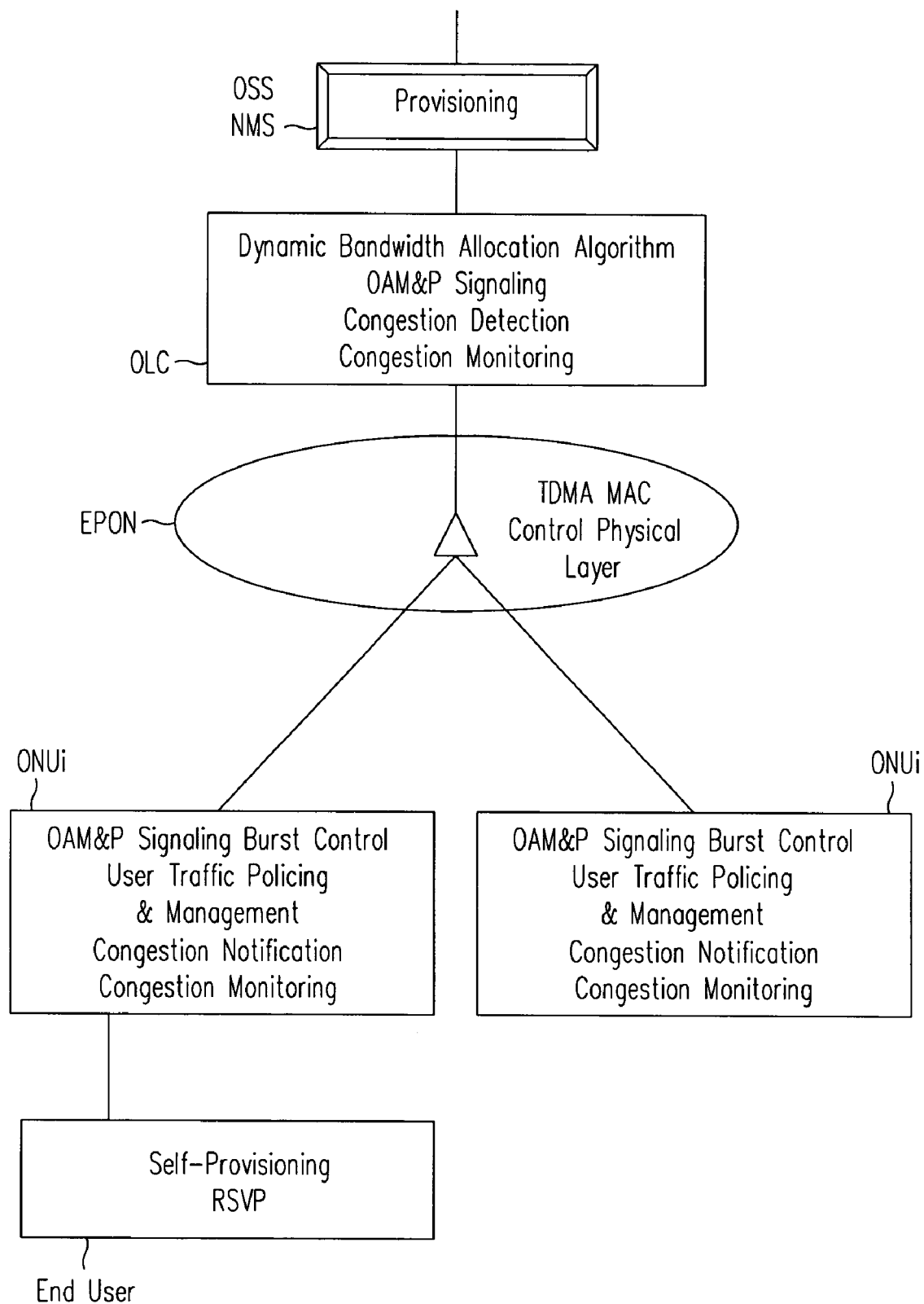

FIG. 23 shows the on demand bandwidth allocation method in EPON.

Figure 24:
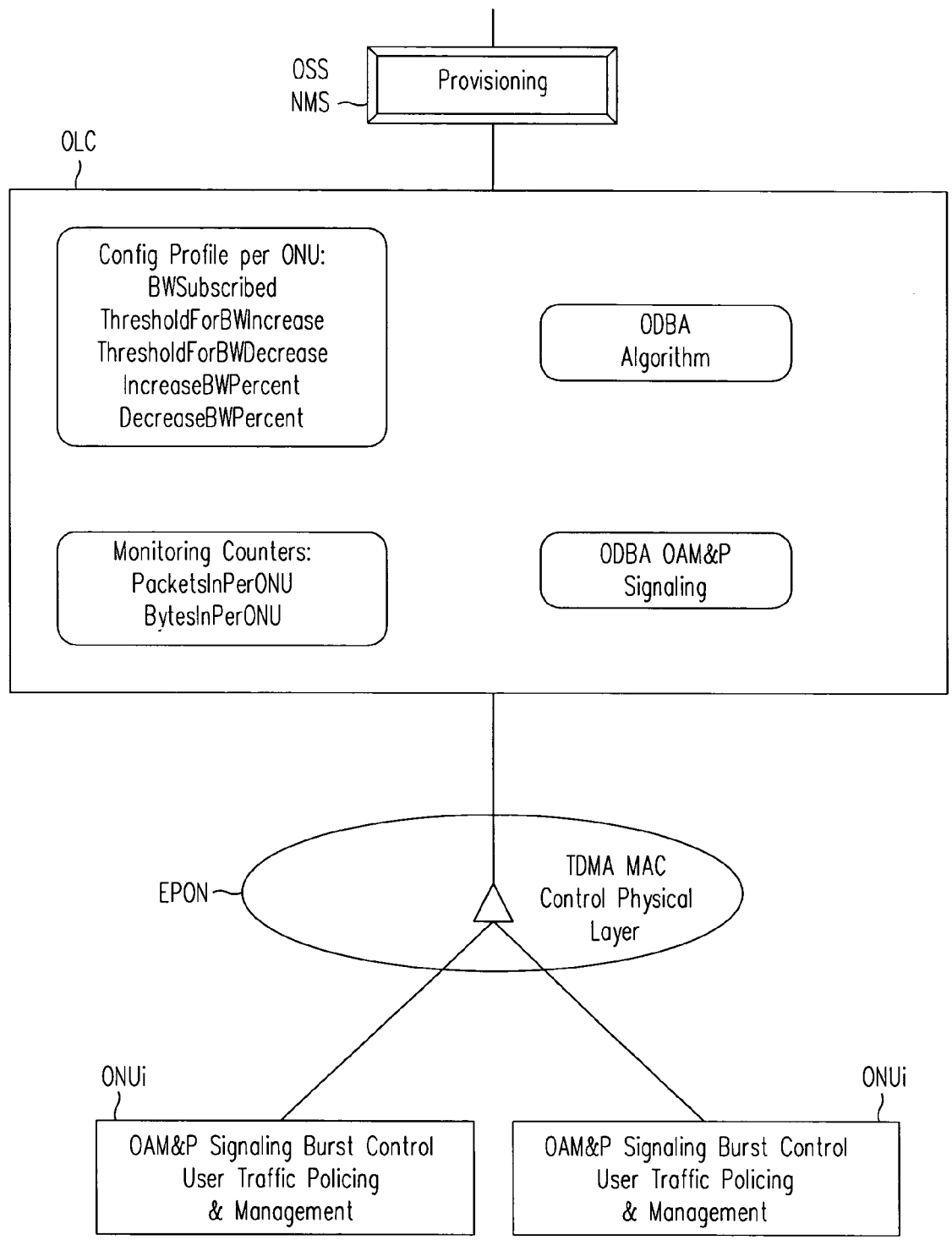

FIG. 24 shows OLC has the complete intelligence of ODBA. It monitors the bandwidth utilization for each ONU, uses an algorithm to dynamically increase/decrease bandwidth in real time at timescale of couple of millisecond or tens of millisecond. This is a simple and robust mechanism.

Figure 25:
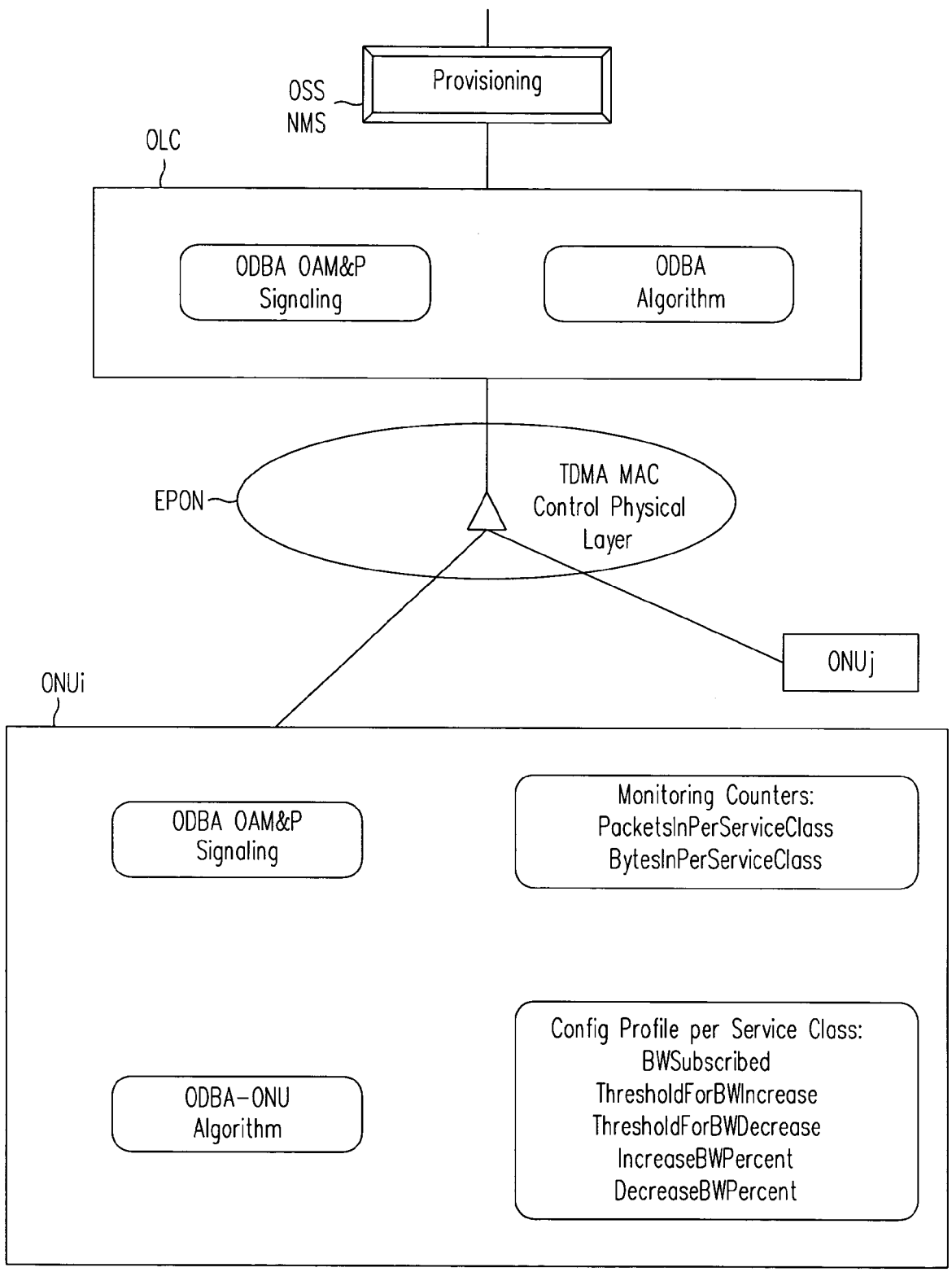

FIG. 25 shows ONU initiates the ODBA request by monitoring its own traffic. This method requires several round of signaling messages. It takes tens of millisecond to hundreds of millisecond, which is slower than FIG. 24's OLC initiated method. However, it is more intelligent and proactive.

Figure 26:
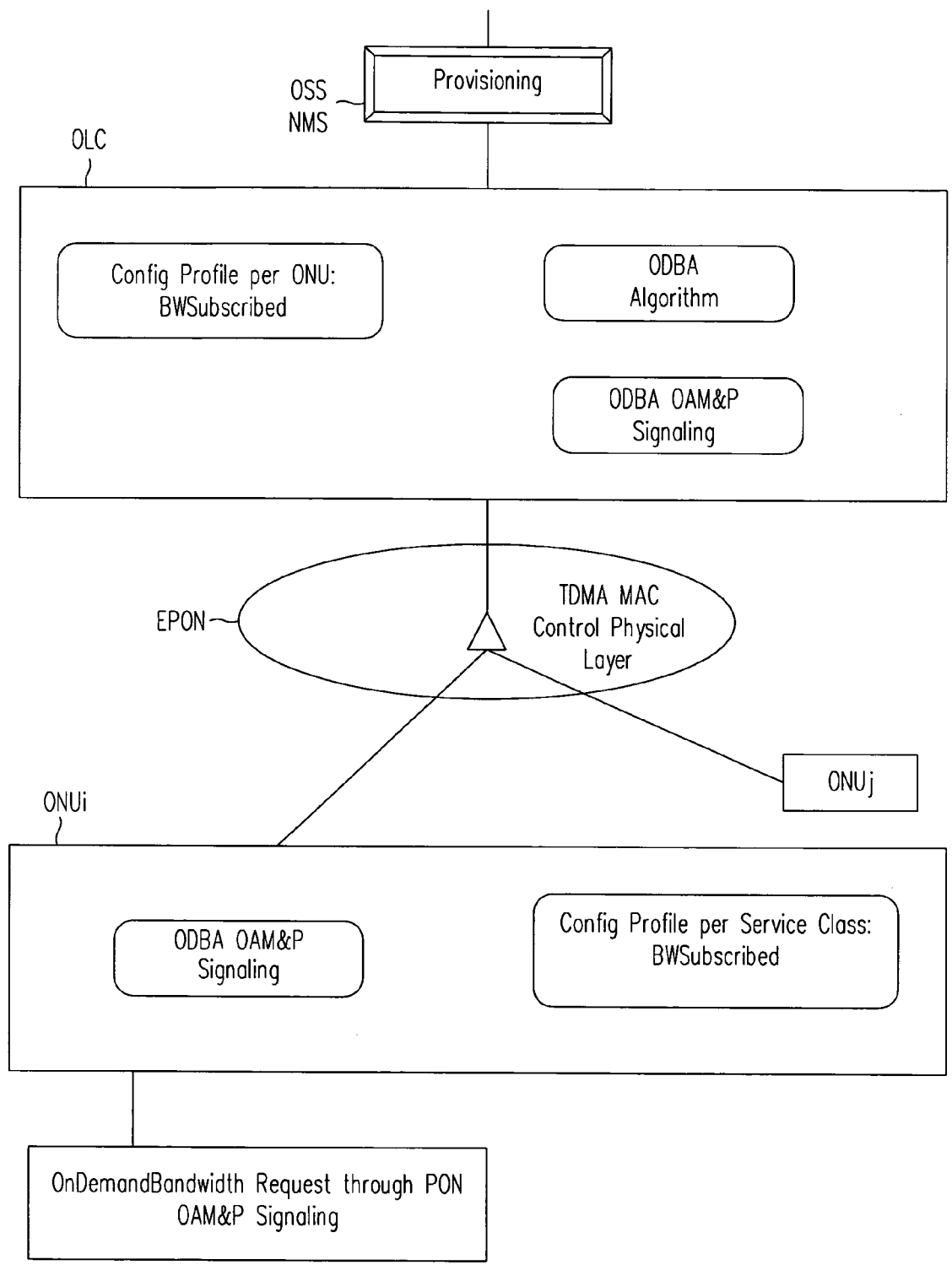

FIG. 26 shows user initiated ODBA. It usually takes longer time (a couple of minutes) to complete, as the user requests go through ONU to OLC, and ack comes back long way. The advantage of this approach is that it gives the end user the ultimate decision authority to manage their bandwidth usage.

Figure 27:
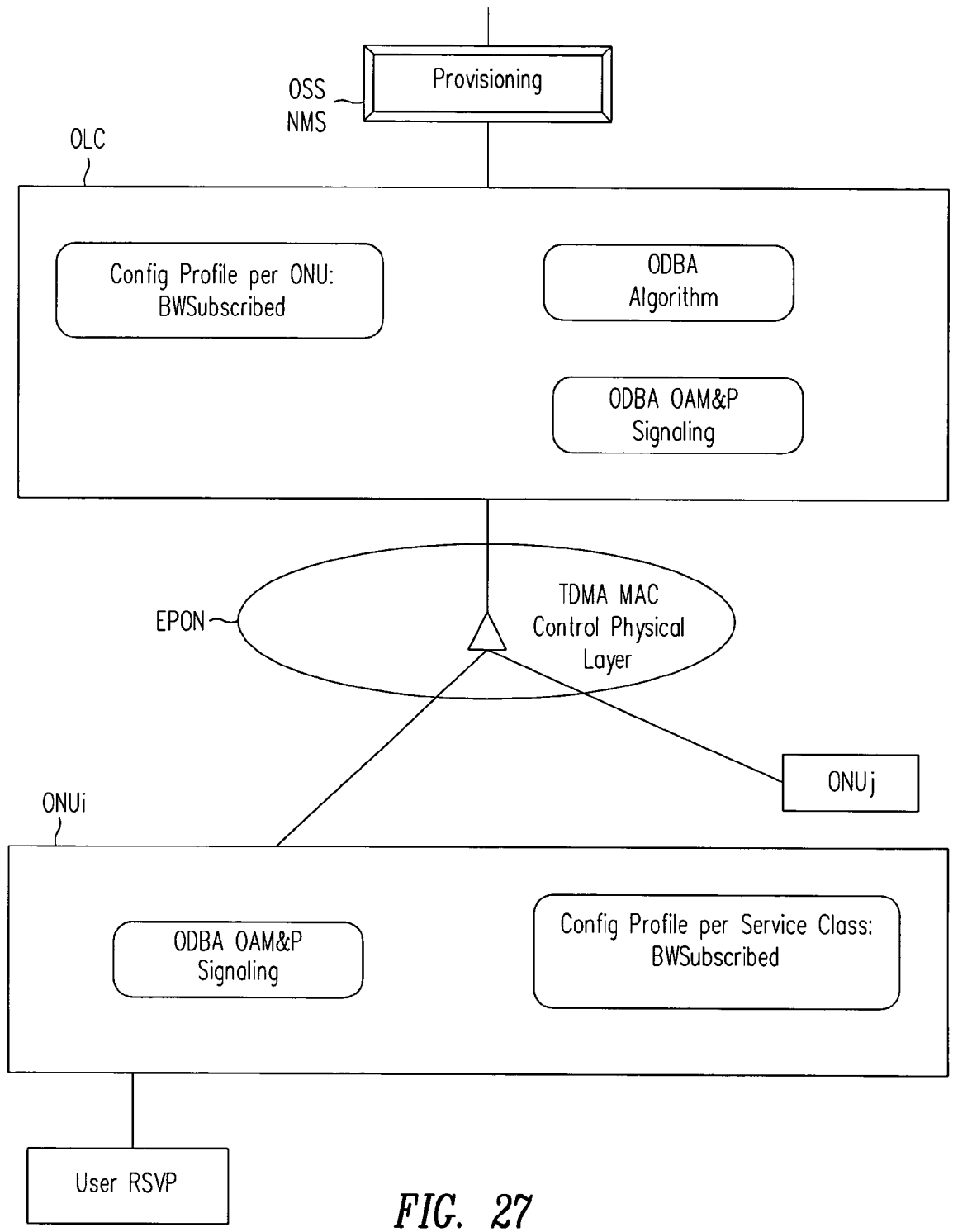
Figure 28:
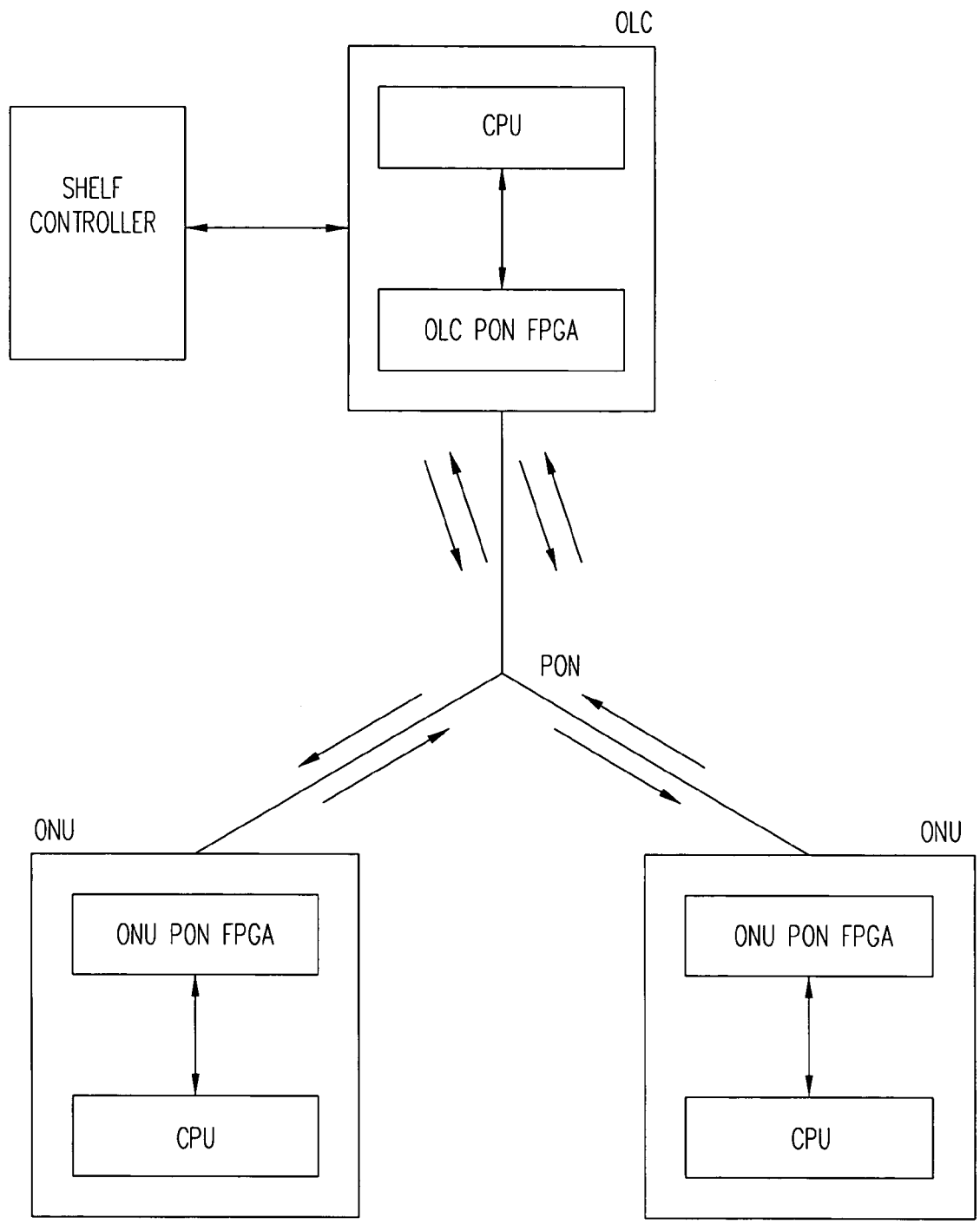
FIG. 28 illustrates, in a high level block diagram, a PON in accordance with the invention.

FIG. 27 shows RSVP initiated ODBA. It is a refined application automation version of FIG. 26. Beyond that, it can convey through the whole network, to achieve real end to end QoS.

OLT monitoring could be per ONU based, or per Customer Port Based, or per Service Class Per Customer Port based. The complexity increases in that order. Per ONU based OLT monitoring requires two monitoring counters only, i.e. PacketsInPerONU and BytesInPerONU. Per Customer Port Based OLT monitoring requires two monitoring counters per customer, i.e. PacketInPerCustomerPerONU and BytesInPerCustomerPerONU. The last form that takes service class into consideration needs a pair of counter for each service class each customer. In the second and third method, to reduce the complexity of OLT, tagging is used to tag each packet with <customer port#> <service class#>. This avoids OLT redo the classification, which is tremendously costly.

ONU monitoring could be per ONU, or per customer port, or per service class per customer port. The counters needed are similar to that in OLT monitoring. However, the monitoring is distributed in ONU, instead of OLT centralized monitoring. ODBA Signaling and Fast ODBA Signaling is required for ONU initiated, Self-provisioning, RSVP initiated ODBA. Different signaling mechanism could be used. Self-provisioning and RSVP initiated ODBA require signaling in second/minute level, so a slow signaling mechanism suffices the need. ONU initiated ODBA requires very fast signaling to reflect the real time traffic amount and make instantaneous bandwidth adjustment decision. Normally specific hardware or network processor level assistance is needed. ODBA algorithm is conduced on OLT to relocate bandwidth needs for each ONU in the PON domain. Similar to ODBA signaling, ONU initiated ODBA requires very fast ODBA algorithm which needs network processor or special hardware assistance. Self-provisioning based or RSVP based can use a slower algorithm. Inter-work with Self-Provisioning: Enhancement to provisioning MIB or other user interface may be implemented. Inter-work with RSVP: OLT may terminate/translate RSVP messages, and setup the virtual bandwidth pipe required by RSVP.

The following table lists the different criteria in comparing the various ODBA mechanisms, and provides a comparison matrix for the proposed ODBA methods.

| Criteria | OLT Initiated ODBA | ONU Initiated ODBA | End User Self-Provisioning Initiated ODBA | RSVP Initiated ODBA |
| --- | --- | --- | --- | --- |
| Elements | OLT Monitoring | ONU Monitoring | Provisioning MIB | RSVP |
|  | Fast ODBA Algorithm on OLT | ODBA Signaling | Provisioning Signaling | RSVP Inter-op |
|  | Config Profile on OLT | Fast ODBA Algorithm on OLT | Relatively Slow ODBA Algorithm on OLT | ODBA Signaling |
|  |  | Complex Config Profile on ONU | Minimum ONU/OLT Config | Relatively Slow ODBA Algorithm on OLT |
|  |  | Minimum Config Profile on OLT |  | Minimum ONU/OLT Config |
| Time Scale | 2 ms | 50 ms | Minutes | Seconds |
| Accuracy | Accurate | Very Accurate | Accurate | Accurate |
| Robustness | High | Medium | Very High | High |
| Complexity | Low | Medium-High | Medium | High |
| PON Bandwidth Overhead | None | Medium to Large | Small | Small to Medium |
| Impact to WAN/MAN Network | Minimum | Low | Low | High |
| Operation/Maintenance | Small | High | Small | Small |
| Standardization Needs | Minimum | Needs ODBA Signaling Standard | Needs ODBA Provisioning Standard | Needs RSVP Inter-op Standard |

-continued

| Criteria | OLT Initiated ODBA | ONU Initiated ODBA | End User Self-Provisioning Initiated ODBA | RSVP Initiated ODBA |
|---|---|---|---|---|
| Interoperability in Multi-Vendor Environment | Good | Needs Work | Needs Minimum Work | Needs Minimum Work |
| Cost Effective | Very Low | Medium to High | Low | Medium |

Addendum D

The bandwidth allocation within a PON of the type described herein is essential to its operation. It is determined that the bandwidth management information is stored as the fixed-length overhead bit pattern in the header sub-frames. The following abbreviations are used.

| | |
|---|---|
| FE | Fast Ethernet |
| HSF | Header Sub-Frame |
| OAM&P | Operation, Administration, Management and Provisioning |
| OLC | Optical Line Card |
| ONU | Optical Network Unit |
| PON | Passive Optical Network |
| SC | Shelf Controller |

FIG. 18 illustrates the super frame format consisting of N*M (N T1/E1 per ONU) TDM bursts and M*M data bursts as defined in the frame structure. The bitmap method is used to represent burst opportunities. For data bursts, each bit represents one sub-frame. It will take M*M/8 to represent all sub-frames in the super frame. Similarly, there will be up to N T1/E1 per ONU. The T1/E1 bursts of one ONU will be represented by N bits. The whole PON bandwidth can be represented by D=M*M/8 bytes for data bursts plus N bits for TDM traffic per ONU. Once the amount of the bandwidth assigned to an ONU has been decided, the bandwidth allocation software should assign the bursts as evenly as possible over the super frame. Doing so reduces the chance of buffer overflow of an ONU and to have a lower delay variation. The OLC will communicate the up stream bandwidth allocation information to each ONU. The ONU will send the data and TDM bursts according to the up stream bandwidth allocated to it.

Different types of bandwidth management related messages are described next. The following link layer OAM message is defined for bandwidth management:

| Message group and ID | Length | Command specific attributes (more than 1 byte) | Crc 8 |
|---|---|---|---|
| Group (2 bit) Command (6 bit) | 8 bit | Variable | 8 bit |

Specifically the bandwidth allocation-related messages will occupy group 11b (the values of group bits will be 11in binary) and the command field (6 bit) will be used as protocol version in this message group. The exact format will look like:

Protocol Version (6 bit): This field is used to identify the version of bandwidth management protocol being used.

Message type (1 byte): This field is used to identify the type of the messages.

Message Length (1 byte): This field contains the length of the message.

Sequence Id (1 byte): This field uniquely identifies the signaling message.

ONU Id (1 byte): This field indicates which ONU the message is sent to or received from.

Port Id (1 byte): This field indicates which edge facility port to be configured or de-configured.

TDM mask (N bits): This field indicates the TDM bursts allocation to the specified ONU.

Cause (1 byte): This field is used for error indication.

Up BW (4 bytes): This field indicates the bandwidth to be allocated or released in the up stream direction (unit is in kbps).

Down BW (4 bytes): This field indicates the bandwidth to be allocated or released in the down stream direction (unit is in kbps).

PON burst mask (D bytes): This field indicates the Ethernet bursts allocation in up stream super frame to the specified ONU.

PON filler mask (D bytes): This field indicates the filler bursts allocation in up stream super frame to the specified ONU.

CRC ( ): Cyclic Redundancy Check.

Note that this is a generic message format; some of the management messages may not require all fields defined. In such cases, the values in unused fields are don't-care.

Bandwidth Management Message Types are described next. Specifically, the first 4 bits of the message type value is used to indicate the destination of the message:

| | |
|---|---|
| ONU | 0x2 |
| OLC | 0x3 |

The following table shows the different message types and the associated functions.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | 4 bytes | 4 bytes | D bytes | D bytes | 8 |

| Message Type | Message Function | Value |
|---|---|---|
| Allocation Request | Sent by the OLC to the ONU with B/W allocation information | 0x21 |
| Allocation Granted | Acknowledgement sent by the ONU to the OLC upon successful B/W Allocation Request | 0x32 |
| Allocation Denied | Acknowledgement unsuccessful B/W Allocation Request. | 0x33 |
| Release Request | Sent by the OLC to the ONU to release the allocated B/W | 0x24 |
| Released | Sent by the ONU to the OLC to acknowledge to the B/W released by the ONU | 0x35 |
| Release Denied | Sent by the ONU to the OLC to indicate the bandwidth release request is denied | 0x36 |
| Audit Request | Periodically send by the OLC to the ONU with the PON burst mask assigned to the ONU for verification. | 0x27 |
| Audit Response | Sent by the ONU to the OLC to indicate whether or not the ONU has same B/W allocation as indicated by the PON_burst_mask in the Audit Request message. If the ONU has different B/W allocation, it should allocate B/W according to the PON_burst_mask in the Audit Request and indicate the error via cause code in this message. | 0x38 |
| User Allocation Request | Sent by the ONU to the OLC with B/W allocation information. | 0x39 |
| User Allocation Granted | Acknowledgement sent by the OLC to the ONU if User Allocation Request has been successfully completed. | 0x2A |
| User Allocation Denied | Sent by OLC to ONU when the user bandwidth allocation request is denied | 0x2B |
| User Release Request | Sent by the ONU to the OLC to release the allocated B/W | 0x3C |
| User Released | Sent by the OLC to the ONU to acknowledge the B/W released by the OLC | 0x2D |
| User Release Denied | Sent by the OLC to the ONU to deny the B/W release request | 0x2E |

The following table describes cause codes.

| Cause Code | Value | Message Type | Description |
|---|---|---|---|
| No Error | 0 | All | Error free indication |
| Version Not Supported | 1 | Denied Released | Non supported in-band singling version has been used. |
| Resource Full | 2 | Denied | The ONU has no resource to support the Allocation Request. |
| Invalid BW Request | 3 | Denied | The PON burst mask received by the ONU is not valid. |
| BW Out Of Sync | 4 | Audit Response | The PON burst mask received by the ONU is different than what has been allocated. |
| Invalid ONU Id | 5 | Denied | The ONU Id received is not valid |
| Requested Release | 6 | Release Request | The B/W release is requested via user interface |

Figure 29:
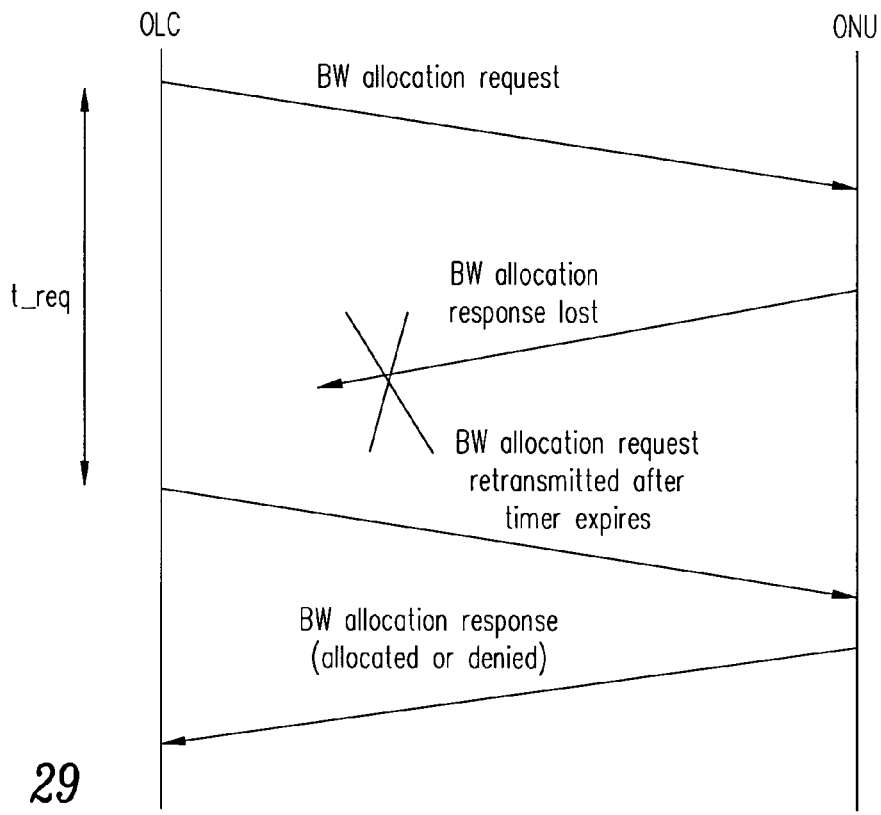
FIGS. 29–33 illustrate a message exchange in support of link level OAMP for bandwidth allocation in certain embodiments.

Next, use cases for management messages are described by illustrating the message exchange under different scenarios. See FIG. 29 for bandwidth allocation use case.

There is a retransmission mechanism should the bandwidth allocation response does not come back with time t_req, which is configurable.

The re-transmission is repeated N number of times before a failure indication is sent to the caller of this request.

Bandwidth allocation request format is described next. OLC sends this allocation request message to each ONU. All the fields will be used.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | 4 bytes | 4 bytes | D bytes | D bytes | 8 |

Bandwidth Allocation Grant is described next. When the bandwidth is granted, this message is merely a "reflection" of the request message.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | 4 bytes | 4 bytes | D bytes | D bytes | 8 |

Bandwidth Allocation Denied is described next.
In the allocation deny message, the following fields are unused:
Up BW
Down BW
PON burst mask
PON filler mask

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | XX | XX | XX | XX | 8 |

Figure 30:
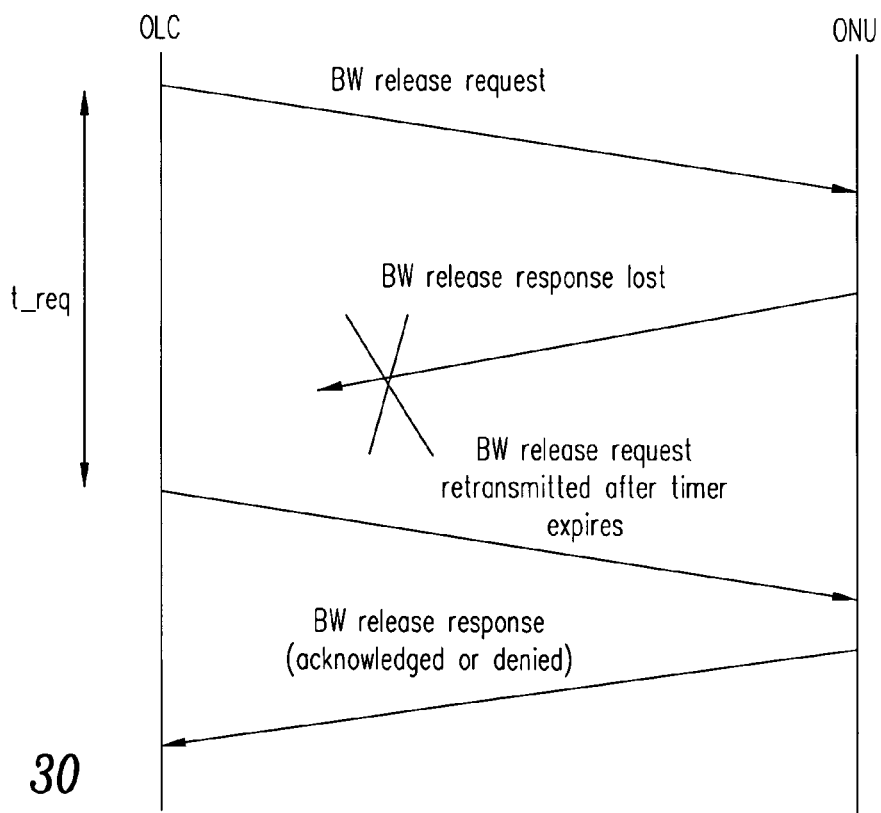

Bandwidth release is described next (see FIG. 30). Bandwidth Release Request is as follows.
In the bandwidth release request, all fields will be used.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | 4 bytes | 4 bytes | D bytes | D bytes | 8 |

Bandwidth Release Reply message is as follows.
In the bandwidth release reply message, the following fields are unused:
Up BW
Down BW
PON burst mask
PON filler mask

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | XX | XX | XX | XX | 8 |

Bandwidth Release Denied message is as follows.
In the bandwidth release denied message, the following fields are unused:
Up BW
Down BW
PON burst mask
PON filler mask

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | XX | XX | XX | XX | 8 |

Bandwidth Audit use case is described next.

Figure 31:
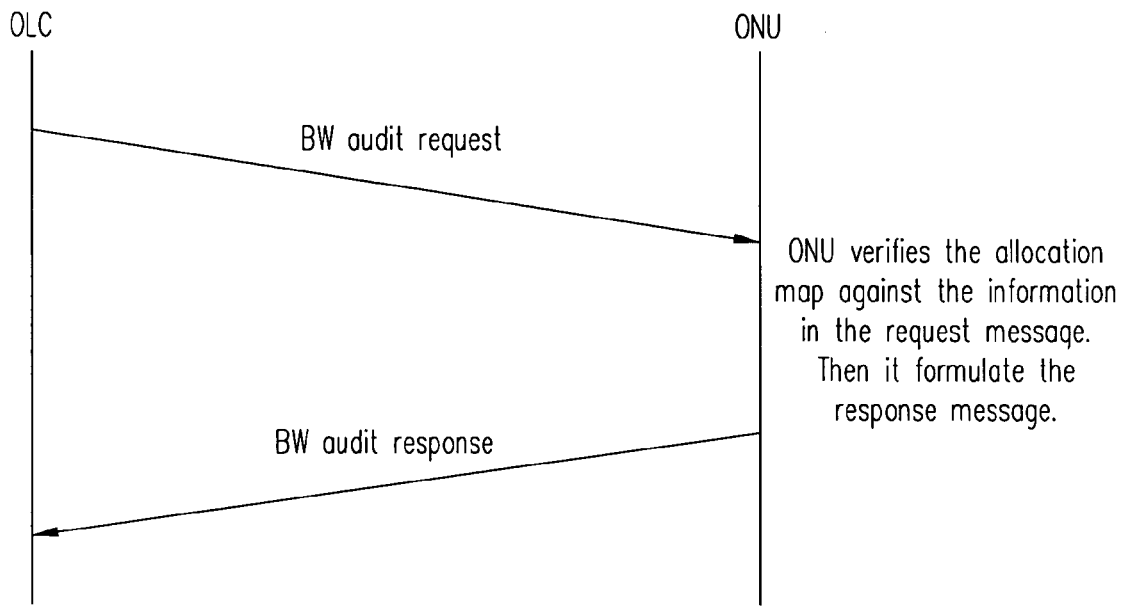

On the OLC there exists a timer with a period of T_audit. Upon expiry an audit request is sent to each ONU to retrieve the bandwidth allocation map. The audit requests to the ONU's may or may not be sent out simultaneously. See FIG. 31.

Retransmission is not needed because of the monitoring nature of this message type. If the audit response is not received at OLC, the request is forgotten and it is left to the caller to wait for the next opportunity to send the next audit request.

Bandwidth Audit Request is as follows.

When OLC sends bandwidth audit request to ONU, it will include the following pieces of information in the request:
  Bandwidth allocated upstream and downstream for the ONU
  ON burst mask
  PON filler mask
  TDM mask The data is provided as the correct reference to the ONU so that it can verify its own copy of allocation map.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | 4 bytes | 4 bytes | D bytes | D bytes | 8 |

Bandwidth Audit Reply

If there is any discrepancy between the information in the audit request and the allocation map on the ONU, the former will be taken as the correct allocation and ONU will update accordingly. The cause code in the reply All fields will be employed in the audit reply message:

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | 4 bytes | 4 bytes | D bytes | D bytes | 8 |

Figure 32:
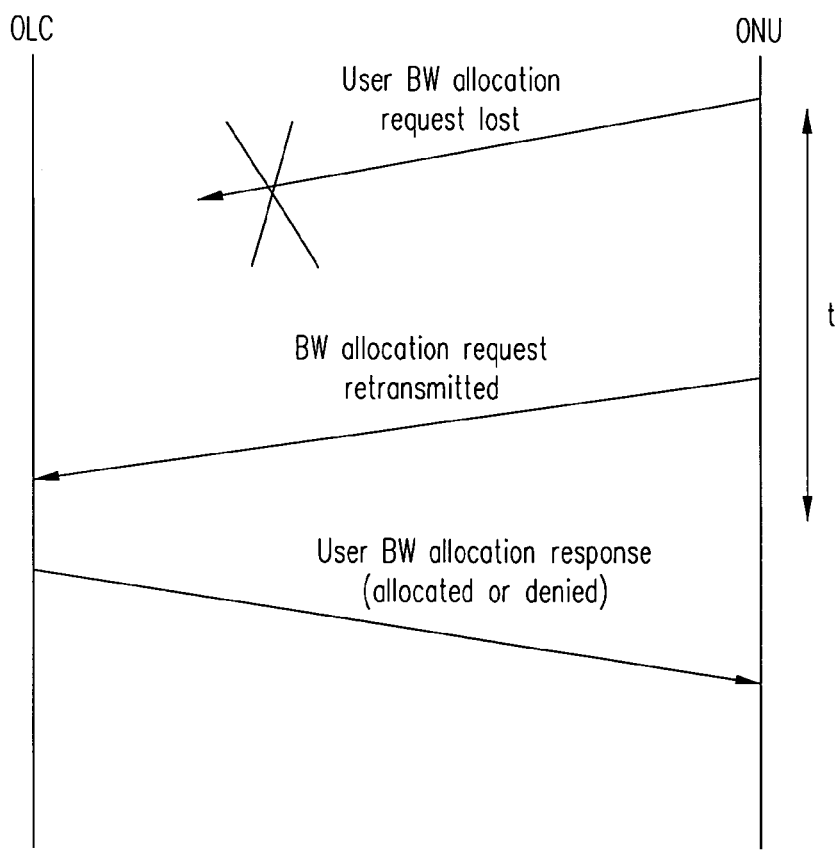

Bandwidth request from User is described next in reference to FIG. 32.

The OLC may grant or deny the bandwidth request sent by ONU, which is stored in the message type field of the message.

User Bandwidth Allocation Request is as follows.

All fields except the TDM mask, PON burst mask and filler mask will be employed in the user allocation request message:

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | XX | 1 byte | 4 bytes | 4 bytes | XX | XX | 8 |

User bandwidth allocation grant is as follows.
The reply message would contain the latest allocation map.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | XX | 1 byte | 4 bytes | 4 bytes | D bytes | D bytes | 8 |

User bandwidth allocation denied message is as follows.
The OLC may deny the user bandwidth request if all available PON bandwidth is fully utilized or for another reason.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | XX | 1 byte | 4 bytes | 4 bytes | XX | XX | 8 |

Figure 33:
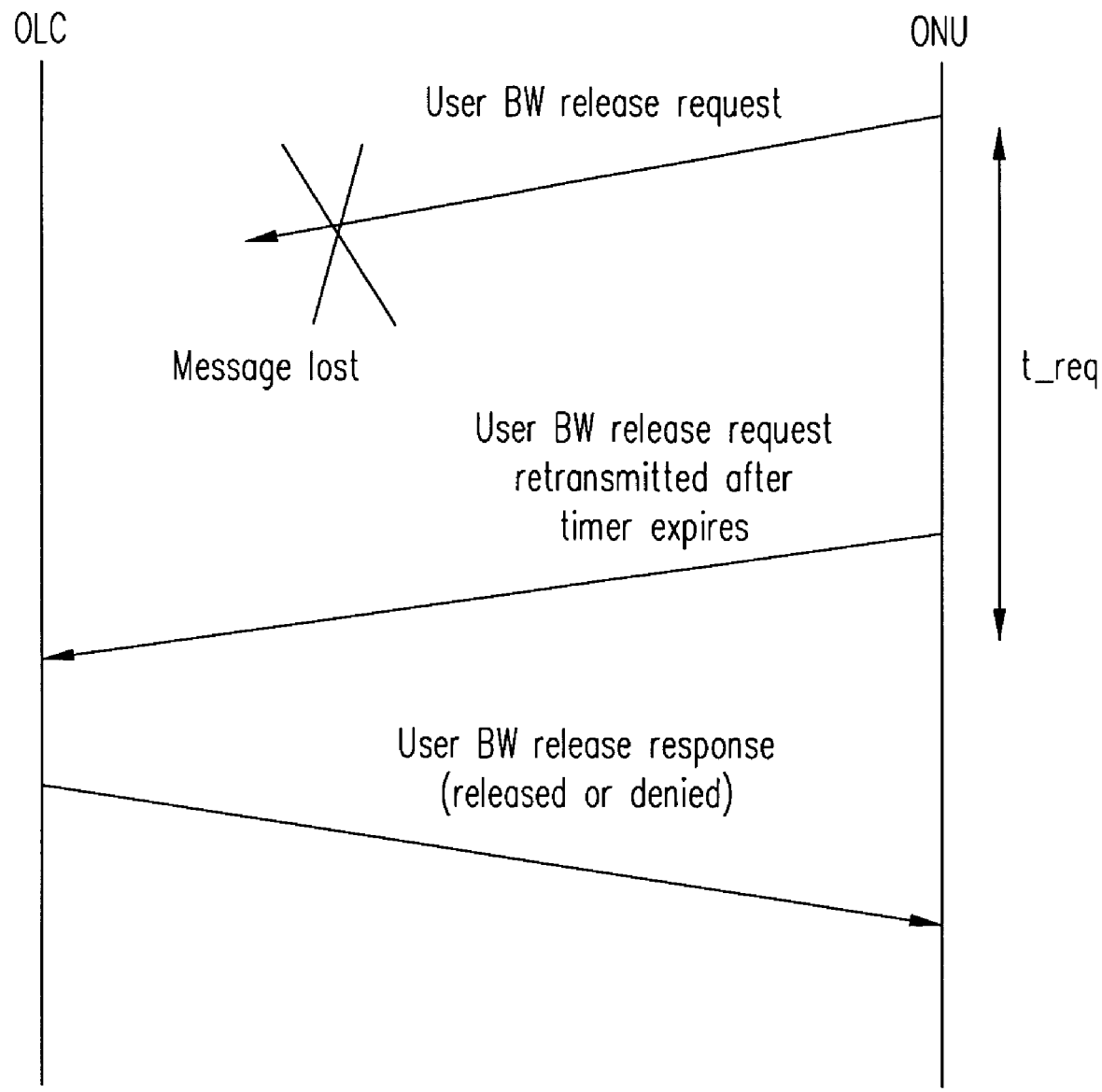

Bandwidth release from User is described next in reference to FIG. 33.
User bandwidth release request is as follows.
ONU will construct the message according to how much bandwidth it wants to de-allocate, thus the TDM mask, PON burst mask and filler mask fields are not used.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | XX | 1 byte | 4 bytes | 4 bytes | XX | XX | 8 |

User bandwidth release grant is as follows.
Upon receiving the bandwidth release request from ONU, OLC will deny the request if the bandwidth indicated does not belong to that ONU at the first place. The reason for denial will then be reflected in the cause code and the message transmitted to ONU.
If OLC approves the release, the new PON burst mask and filler mask become part of the reply message to ONU.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | N bits | 1 byte | 4 bytes | 4 bytes | D bytes | D bytes | 8 |

User bandwidth release denied is as follows.

The OLC may deny the bandwidth release request sent from ONU. This is possible because the bandwidth may not belong to the ONU at the first place (i.e. the allocation data on ONU if out-of-sync with the OLC).

The denied message would contain the correct allocation information when sent to ONU.

| Group | Version | Len | Type | Seq ID | ONU id | Port id | TDM mask | Cause code | Up BW | Down BW | PON burst mask | PON filler mask | CRC8 |
|---|---|---|---|---|---|---|---|---|---|---|---|---|---|
| 2 bit | 6 bit | 1 byte | 1 byte | 1 byte | 1 byte | 1 byte | XX | 1 byte | 4 bytes | 4 bytes | XX | XX | 8 |

What is claimed is:

1. A method of time division multiplexing a use of a communication medium in a passive optical network among a plurality of optical network units, the method comprising:

receiving information at an optical line terminal in the passive optical network from the plurality of optical network units in a time division multiplexed manner, wherein time slots occur sequentially one after another in each frame of a superframe, and a plurality of frames occur sequentially one after another in the superframe, and each frame in the superframe has an identical number of time slots, and wherein the superframe thereby has a structure of a two-dimensional array, with each frame representing a row and an identical time slot in each frame representing a column; and receiving a request at the optical line terminal from a given one of the optical network units for an amount of bandwidth; and allocating to said given optical network unit, based upon the amount of bandwidth requested, a first group of time slots located in a first column of the two-dimensional array, if each time slot in the first group is available; and if the first group of time slots does not satisfy the requested amount of bandwidth, allocating to said optical network unit a second group of time slots located in a second column if each time slot in the second group is available.

2. The method of claim 1 wherein:

the second column is adjacent the first column.

3. The method of claim 1 wherein:

said first column is selected to be closest to the a beginning of the frame.

4. The meted of claim 1 wherein:

at least two time slots in each column that are located adjacent to a diagonal of the two dimensional array are preallocated for a ranging determination.

5. The method of claim 4 wherein:

at least one time slot in said two time slots is initially preallocated for ranging to said given optical network unit, and subsequent to the ranging determination said at least one time slot is used to carry at least a portion of said amount of bandwidth.

6. The method of claim 1 wherein:

the amount of bandwidth requested by said given optical network unit when divided by bandwidth available in a time slot indicates a need for allocation of said plurality of time slots, wherein only a fraction of one time slot in the plurality of time slots is needed to satisfy the request; and the method further comprising allocating a remaining fraction of said time slot towards a next request for bandwidth from said given ontical network unit.

7. The method of claim 6 fhrther comprising:

staring in memory an indication of the remaining fraction that is overallocated to said given optical network unit;

servicing a plurality of requests from a corresponding plurality of optical network units other than said given optical network unit; and retrieving the remaining fraction from memory on receipt of another request from said given optical network unit.

8. A method of time division multiplexing a use of a communication medium among a plurality of network units, the method comprising:

receiving information from the plurality of network units in a time division multiplexed manner, wherein time slots occur sequentially one after another in each frame of a superframe, and a plurality of frames occur sequentially one after another in the superframe, and each frame in the superftame has an identical number of time slots, and wherein the superframe has a structure of a two-dimensional array, with each frame representinwa row and an identical time slot in each frame representing a column;

configuring each network unit to transmit in a plurality of time slots that are each located in a different row of the two-dimensional array, wherein:

if the number of time slots transmitted by a network unit is smaller than or equal to the number of rows in said two-dimensional array, then a majority of said time slots are located in a single column of said two-dimensional array; and if the number of time slots transmitted by a network unit is larger than the number of rows in said two-dimensional array, then a majority of time slots are located in a plurality of adjacent columns, in said two-dimensional array.

9. The method of claim 8 wherein during the configuring of each network unit:

each network unit is configured to transmit in time slots in different rows of the two-dimensional array only for time slots to be used for data transmission; and at least one network unit is configured to transmit in at least two adjacent time slots in a single frame for transmission of control signals.

10. The method of claim wherein:

the control signals comprise ranging information; and each network unit is configured to transmit in least two time slots in said superframe for ranging.

11. The method of claim 8 wherein:

each row has an identical number of time slots.

* * * * *